US012657885B2

(12) United States Patent
Nguyen et al.

(10) Patent No.: US 12,657,885 B2
(45) Date of Patent: Jun. 16, 2026

(54) IMAGE REPRESENTATION LEARNING IN DIGITAL PATHOLOGY

(71) Applicants:Genentech, Inc., South San Francisco, CA (US); Hoffmann-La Roche Inc., Little Falls, NJ (US)

(72) Inventors: Trung Kien Nguyen, Chelsea, MI (US); Samaneh Abbasi-Sureshjani, Basel (CH); Jacob Gildenblat, Holon (IL); Paul MB Dhalluin, Riedisheim (FR); Zijun Gao, Ann Arbor, MI (US)

(73) Assignees: Genentech, Inc., South San Francisco, CA (US); Hoffmann-La Roche Inc., Little Falls, NJ (US)

( * ) Notice: Subject to any disclaimer, the term of this patent is extended or adjusted under 35 U.S.C. 154(b) by 532 days.

(21) Appl. No.: 17/856,912

(22) Filed: Jul. 1, 2022

(65) Prior Publication Data

US 2023/0016472 A1     Jan. 19, 2023

Related U.S. Application Data

(60) Provisional application No. 63/218,165, filed on Jul. 2, 2021.

(51) Int. Cl.
*G06V 10/774* (2022.01)
*G06T 7/00* (2017.01)
*G06V 10/82* (2022.01)

(52) U.S. Cl.
CPC ........ *G06V 10/7747* (2022.01); *G06T 7/0014* (2013.01); *G06V 10/82* (2022.01); *G06T 2207/10064* (2013.01)

(58) Field of Classification Search
CPC ........ G06V 10/774; G06T 2207/20021; G06T 7/0014
See application file for complete search history.

(56) References Cited

U.S. PATENT DOCUMENTS

| | | | |
|---|---|---|---|
| 11,276,172 B2 * | 3/2022 | Hosseini | G06F 18/24323 |
| 11,455,753 B1 * | 9/2022 | Alemi | G06T 7/11 |

(Continued)

OTHER PUBLICATIONS

T. Li, M. Feng, Y. Wang and K. Xu, "Whole Slide Images Based Cervical Cancer Classification Using Self-supervised Learning and Multiple Instance Learning," IEEE, Mar. 26-28, 2021 (Year: 2021).*

(Continued)

*Primary Examiner* — Ian L Lemieux
(74) *Attorney, Agent, or Firm* — MORRISON & FOERSTER LLP

(57) ABSTRACT

Described herein are systems, methods, and programming for analyzing and classifying digital pathology images. Some embodiments include receiving whole slide images (WSIs) and dividing each of the WSIs into tiles. For each WSI, a random subset of the tiles may be selected and augmented views of each of the selected tiles may be generated. For each of the selected tiles, a first convolutional neural network (CNN) may be trained to: generate, using a first one of the augmented views corresponding to the selected tile, a first representation of the selected tile, and predict a second representation of the selected tile to be generated by a second CNN, wherein the second representation is generated based on a second one of the augmented views of the selected tile.

18 Claims, 79 Drawing Sheets
(72 of 79 Drawing Sheet(s) Filed in Color)

200

(56) References Cited

U.S. PATENT DOCUMENTS

| | | | |
|---|---|---|---|
| 11,954,596 B2 * | 4/2024 | Song | G06V 10/766 |
| 12,346,410 B2 * | 7/2025 | Bhargava | G16H 30/40 |
| 2020/0250398 A1 * | 8/2020 | Courtiol | G06V 10/82 |
| 2020/0279126 A1 * | 9/2020 | Nie | G06V 20/698 |
| 2021/0019342 A1 * | 1/2021 | Peng | G06F 16/5854 |
| 2022/0180518 A1 * | 6/2022 | Agus | G16H 50/70 |
| 2022/0319000 A1 * | 10/2022 | Teichmann | G06T 7/11 |
| 2024/0020958 A1 * | 1/2024 | Dehaene | G06V 10/7715 |
| 2024/0233416 A1 * | 7/2024 | Zhang | G06V 10/772 |

OTHER PUBLICATIONS

J. C. Caicedo, C. McQuin, A. Goodman, S. Singh and A. E. Carpenter, "Weakly Supervised Learning of Single-Cell Feature Embeddings," IEEE, Jun. 18-23, 2018 (Year: 2018).*

Sornapudi S, Brown GT, Xue Z, Long R, Allen L, Antani S. Comparing Deep Learning Models for Multi-cell Classification in Liquid-based Cervical Cytology Image. AMIA Annu Symp Proc. Mar. 4, 2020 (Year: 2020).*

Ting Chen, Simon Kornblith, Mohammad Norouzi, Geoffrey Hinton, "A Simple Framework for Contrastive Learning of Visual Representations", Jul. 2001 (Year: 2020).*

Gildenblat, J., & Klaiman, E. (2019). Self-supervised similarity learning for digital pathology. arXiv preprint arXiv:1905.08139. (Year: 2019).*

Chuang, C. Y., Robinson, J., Lin, Y. C., Torralba, A., & Jegelka, S. (2020). Debiased contrastive learning. Advances in neural information processing systems, 33, 8765-8775. (Year: 2020).*

Lu, M. Y., Chen, R. J., Wang, J., Dillon, D., & Mahmood, F. (2019). Semi-supervised histology classification using deep multiple instance learning and contrastive predictive coding. arXiv preprint arXiv:1910. 10825. (Year: 2019).*

Ciga, O., Xu, T., & Martel, A. L. (2022). Self supervised contrastive learning for digital histopathology. Machine learning with applications, 7, 100198. (Year: 2022).*

Tellez, D., van der Laak, J., & Ciompi, F. (2018). Gigapixel whole-slide image classification using unsupervised image compression and contrastive training. (Year: 2018).*

Robles, W. R. Q., Noree, S., Ko, Y. S., Wong, B., Kim, J., & Yi, M. Y. (2025). Spatial Context-Driven Positive Pair Sampling for Enhanced Histopathology Image Classification. arXiv preprint arXiv:2503. 05170. (Year: 2025).*

Tian, Y., Sun, C., Poole, B., Krishnan, D., Schmid, C., & Isola, P. (2020). What makes for good views for contrastive learning ?. Advances in neural information processing systems, 33, 6827-6839. (Year: 2020).*

Zhang, H., et al. (2023). Self-supervised deep learning for highly efficient spatial immunophenotyping. EBio Medicine, 95. retrieved from https://discovery.ucl.ac.uk/id/eprint/10194375/2/Ledermann_ SANDI_v5.pdf (Year: 2023).*

Michael P. Notter, "Color Engineering for Special Images" (Dec. 2021), retrieved online Nov. 3, 2025, available at <https://miykael. github.io/blog/2021/color_engineering_medmnist/> (Year: 2021).*

Addie Ira Borja Parico, "What is PCA Color Augmentation?", (2018), retrieved online Nov. 3, 2025, available at <https://aparico. github.io/> (Year: 2018).*

Grill, J.-B. et al. (2020). "Bootstrap Your Own Latent: A New Approach to Self-Supervised Learning," 34th Conference on Neural Information Processing Systems, 14 pages.

* cited by examiner

504

604

702

704

706

708

804

808

902

904

906

908

1000

1004

1300

1310

1320

1320A

1320B

1330

1330A

1330B

1400

1550

1500

1640

1620

1950

1900

IMAGE REPRESENTATION LEARNING IN DIGITAL PATHOLOGY

CROSS-REFERENCE TO RELATED APPLICATIONS

The present application claims priority to U.S. Provisional Application No. 63/218,165, filed Jul. 2, 2021, the disclosure of which is hereby incorporated by reference in its entirety.

TECHNICAL FIELD

This disclosure generally relates to tools for analyzing and classifying digital pathology images.

BACKGROUND

As digital scanning technology has improved, many laboratories and other institutions storing preserved tissue specimens on glass slides have been scanning those slides to generate digitized images of the tissue samples. A pathologist or other trained specialist will often evaluate a whole slide image (WSI) for evidence of abnormalities in the depicted tissue. Digitized WSI are often very large, for example 100,000 pixels by 100,000 pixels in each of several color channels, making it difficult to efficiently analyze WSI on a holistic level without applying advanced computational image analysis techniques.

Conventional image analysis techniques typically start by obtaining convolutional neural networks (CNNs) pre-trained on generic natural image sets (e.g., ImageNet) and then applying transfer learning techniques. Such CNNs may be of limited value, however, since the generic natural images typically depict objects that do not appear in WSI and may not be helpful in distinguishing features of interest given the unique and specific aspects of WSI. For example, most structures in hematoxylin and eosin (H&E)-stained slides appear in shades of blue, purple, and pink.

For digital pathology, it is desirable to obtain a CNN that has been pre-trained specifically to extract features from WSIs (e.g., H&E slide images). Unfortunately, however, most large data sets of WSI are not labeled, which makes it difficult to take advantage of supervised learning techniques.

SUMMARY OF PARTICULAR EMBODIMENTS

The BYOL self-supervised image representation learning technique (described in "Bootstrap Your Own Latent: A New Approach to Self-Supervised Learning" by Grill, J. et al.) uses an augmented view of an image to train one network (a.k.a. "online") to predict a target network's representation of the same image in another augmented view. By avoiding reliance on negative pairs (representations of augmented views from different images), the BYOL technique eliminates the cost of contrastive methods while achieving a high level of accuracy.

In preparation for applying the BYOL technique, several pre-processing steps may be performed to customize this self-supervised image representation learning technique for digital pathology. In some embodiments, a set of tiles may be created from a WSI, from which patches may be selected for use as input images. For example, some WSI patches may be 256×256 pixels, at 20× magnification, in various tissue categories. In natural images, obtaining scale-invariant features is desirable since the scales of the objects are unpredictable during the prediction stage. However, in digital pathology, the typical processing workflow is to choose a fixed scale/magnification (or a fixed set of known magnifications) of the WSI to feed to the algorithm. Hence, scale-invariant features are undesirable because the object-size-related features need to be retained to discriminate between different cell types (for example tumor cells are usually larger than immune cells in terms of size). In some embodiments, the particular image augmentations subsequently performed on the WSI patches may be selected for the unique and specific aspects of the WSI. In one example, for H&E images, the selection of augmentations related to color and scale plays an important role in analysis of H&E images since cells with different sizes and colors may have different biological meanings.

As discussed below, comparisons between the first convolutional layer of an example CNN trained on generic natural images (e.g., ResNet18) and that of an example CNN trained on digital pathology images (e.g., PathNet) illustrate that the weights of PathNet are specific to digital pathology and different from the ones trained on natural images.

Described herein is a new technique to perform image augmentation (referred to as AugmentationV2). In some embodiments, a 512×512 pixels patch may be obtained and, starting from the 512×512 pixels patch, two random views of 256×256 pixels may be cropped. These two views may then be augmented using a set of custom augmentations (for example, rotation, limited scaling and color jittering, horizontal and vertical flipping, or other augmentations). The two augmented views may then be input to the BYOL algorithm to perform the model training. One example driver of this new method is that: the two views obtained by this method do not share the exact tissue content as the original method. Rather, the two views only share some common tissue areas. This will force the network to learn the features of the local regions in the patch, rather than the global pixel/color distribution of the entire patch as the original augmentation method. The visualization of the first convolutional layer shows that the features learnt by the new technique described herein (i.e., AugmentationV2) seem to be richer than the ones learnt by the traditional augmentation method.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DESCRIPTION OF EXAMPLE EMBODIMENTS

Figure 1:
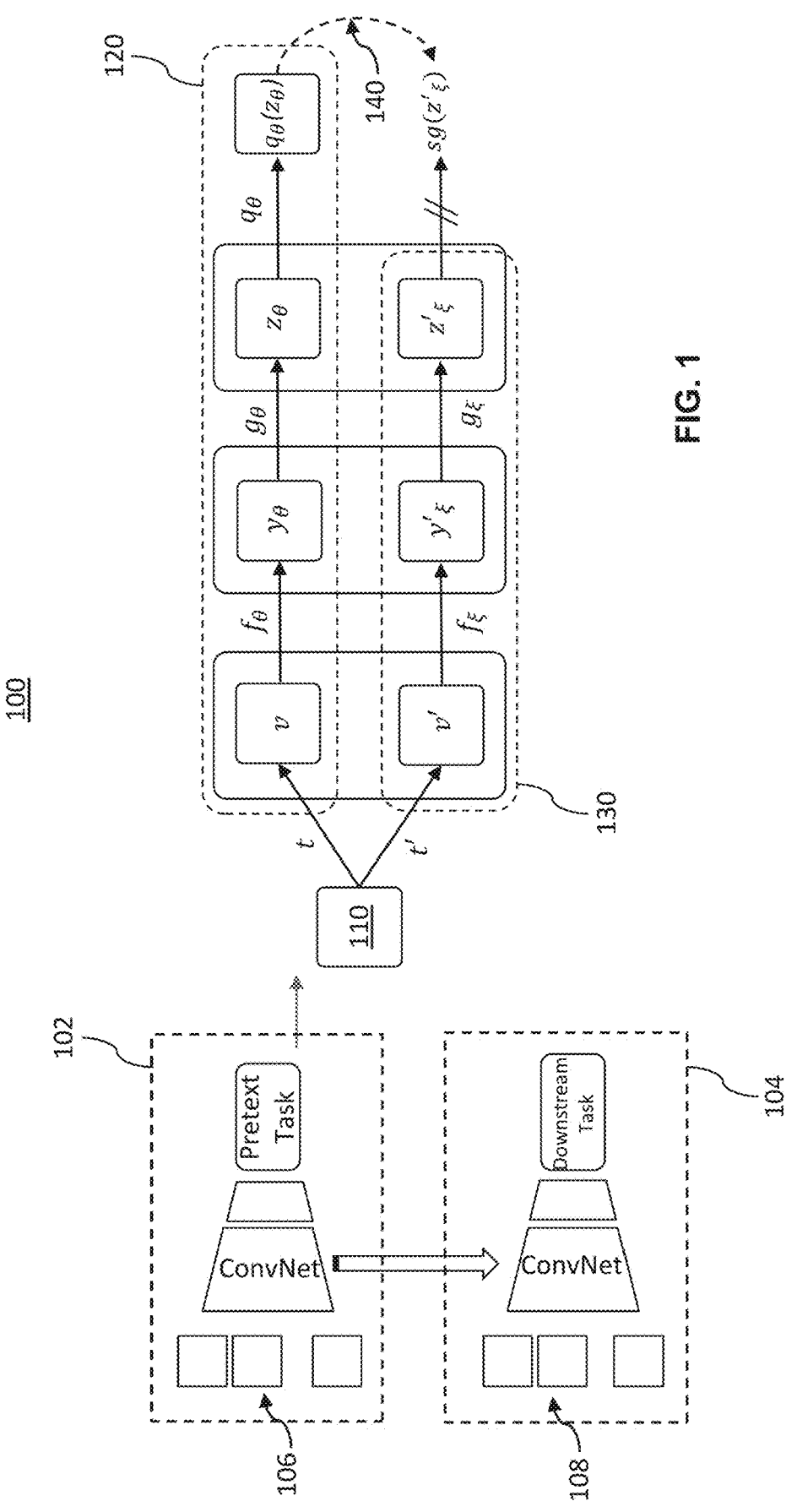
FIG. 1 illustrates an example embodiment of training a CNN to perform feature extraction using the BYOL technique, in accordance with various embodiments.

As described herein, WSIs are extremely large format digital images (e.g., 100,000×100,000 pixels) that can result from digitization of physical slides of biological samples (e.g., tissue) into high-resolution image files or can be output directly by medical scanning devices. WSIs are typically preserved in the highest possible resolution format because of the nature of the images being captured and to avoid the misdiagnosis of tissue depicted in the WSI due to artifacts that ordinarily result from image compression and manipulation. WSIs often include orders of magnitude larger numbers of pixels than typical digital images, and can include resolutions of 100,000 pixels by 100,000 pixels (e.g., 10,000 megapixels) or greater.

Analysis of a WSI is a labor-intensive process that requires highly specialized individuals with the knowledge and dexterity to review the WSI, recognize and identify abnormalities, classify the abnormalities, label the WSI, and potentially render diagnosis of the tissue depicted by the WSI. Additionally, because WSIs are used for a wide array of tissue types, persons with the knowledge and skill to identify abnormalities must be further specialized in order to provide accurate analysis and diagnosis. Tissue abnormalities that can be detected from a WSI include, by way of example only and not limitation, inflammation, pigmentation, degeneration, anisokaryosis, hypertrophy, mitotic increase, mononuclear cell infiltration, inflammatory cell infiltration, inflammatory cell foci, decreased glycogen, glycogen accumulation (diffuse or concentrated), extramedullary myelopoiesis, extramedullary hematopoiesis, extramedullary erythropoiesis, single-cell necrosis, diffuse necrosis, marked necrosis, coagulative necrosis, apoptosis, karyomegaly, peribiliary, increased cellularity, glycogen deposits, lipid deposits, microgranuloma, congestion, Kupffer cell pigmentation, increased hemosiderin, histiocytosis, hyperplasia, or vacuolation, among many others. Therefore, because of the labor- and knowledge-intensive nature of the work, WSIs are considered candidates for automation of certain functions. However, the large size of WSIs renders typical image analysis techniques ineffective, slow, and expensive. It is not practical to perform standard image recognition and deep learning techniques, which require analysis of multiple rounds of many samples of WSIs to increase accuracy. The techniques described herein are directed to solving the problem of automating feature recognition in WSI and enabling the development of novel data analysis and presentation techniques that previously were not optimized for these images (e.g., WSIs) with different characteristics compared to natural images.

The systems disclosed herein can adapt self-supervised learning techniques to train a feature extraction backbone focused on whole slide images (and, in some embodiments, H&E WSI). The BYOL self-supervised image representation learning technique uses an augmented view of an image to train one network (a.k.a. "online") to predict a target network's representation of the same image in another augmented view. By avoiding reliance on negative pairs (representations of augmented views from different images), the BYOL technique eliminates the cost of contrastive methods while achieving a high level of accuracy.

FIG. 1 illustrates an example embodiment of training a CNN to perform feature extraction using the BYOL technique, in accordance with various embodiments. In preparation for applying the BYOL technique, several pre-processing steps may be performed to customize this self-supervised image representation learning technique for application in the digital pathology space.

Computer vision models refer to machine learning models that extract information from an image or set of images (such as, for example, a video). Generally, computer vision models are trained by generating representations of images and tuning parameters of the models such that a distance (e.g., a Euclidean distance) between representations of different augmented views of the same image is minimized while a distance between representations of augmented views of different images is maximized. A technical problem associated with some of these types of computer vision models is the need for large data sets including "negative pairs" of images (e.g., the representations of augmented views of different images).

A technical solution to the aforementioned technical problem is the Bootstrap Your Own Latent (BYOL) model. The BYOL model is a self-supervised image representation learning process. The BYOL architecture includes two neural networks: an "online" neural network and a "target" neural network. The online and target neural networks interact and learn from one another. For instance, for a given image, augmented versions of the image can be created, and the online neural network is trained using a first augmented version of the image to predict the target neural network representation of a second augmented version of the image. The rationale behind this process is that the representation of one augmented view of an image should be predictive of the representation of a different augmented view of that same image. Thus, BYOL process includes training a model to generate an enhanced representation by predicting a target representation using a target model.

In FIG. 1, a BYOL training and validation system 100 is presented. In some embodiments, system 100 is configured to learn a representation $y_\theta$ (for example, for classifying images). As seen in FIG. 1, system 100 includes a first neural network 120 and a second neural network 130. First neural network 120 and second neural network 130 are referred to herein interchangeable as "online neural network 120" and "target neural network 130." In some embodiments, first neural network 120 and/or second neural network 130 may be convolutional neural networks.

First neural network 120 may be defined by a set of weights $\theta$, and may include a first stage, encoding $f_\theta$, a second stage, projecting $g_\theta$, and a third stage, predicting $g_\theta$. Second neural network 130 may be defined by another set of weights $\xi$, and may include similar first and second stages, encoding $f_\xi$ and projecting $g_\xi$. Second neural network 130 is configured to train first neural network 120, where weights $\xi$ are an exponential moving average of weights $\theta$. Thus, after each round of training, weights $\xi$ are updated according to Equation 1:

$$\xi \leftarrow \tau\xi + (1-\tau)\theta \qquad \text{Equation 1.}$$

In some embodiments, system 100 may be configured to take an image 110 and apply two augmentations to image 110 to generate two augmented versions of image 110. Image 110 may be selected randomly from a training set of images (e.g., such as a set of whole slide images depicting biological samples). Some embodiments include image 110 being a sample image to be analyzed by system 100. For example, first neural network 120, after being trained, may be used to classify image 110. The augmentations t and t' applied to image 110 generate a first augmented view v and a second augmented view v' of input image 110. In some embodiments, augmentations t, t' are selected from a set of predefined augmentations. Augmentation t may be selected from a first set of predefined augmentation, while augmentation t' may be selected from a second set of predefined augmentations. In some cases, the first and second sets of predefined augmentations may share one or more common types of augmentation (e.g., both sets may include a rotation augmentation), however the sets of predefined augmentations may not share any common types of augmentation.

First augmented view v and second augmented view v' may then be encoded to produce a first representation $y_\theta$ and a second representation $y'_\xi$, respectively. For instance, the encoding by online neural network 120 and target neural network 130 is defined by Equations 2a, 2b, respectively:

$$y_\theta \triangleq f_\theta(v) \qquad \text{Equation 2a,}$$

$$y'_\xi \triangleq f_\xi(v') \qquad \text{Equation 2b.}$$

First representation $y_\theta$ and a second representation $y'_\xi$ may be subsequently used to generate a first projection $z_\theta$ and a second projection $z'_\xi$, respectively. For instance, the projecting by online neural network 120 and target neural network 130 is defined by Equations 3a, 3b, respectively:

$$z_\theta \triangleq g_\theta(y) \qquad \text{Equation 3a,}$$

$$z'_\xi \triangleq g_\xi(y') \qquad \text{Equation 3b.}$$

In some embodiments, online neural network 120 may be configured to generate a prediction $q_\theta(z_\theta)$. Predication $q_\theta(z_\theta)$ is a prediction of $z'_\xi$. After generating $q_\theta(z_\theta)$, both $q_\theta(z_\theta)$ and $z'_\xi$ may be normalized (for example, an $\ell_2$-normalization) to obtain:

$$\overline{q_\theta}(z_\theta) \triangleq \frac{q_\theta(z_\theta)}{\|q_\theta(z_\theta)\|_2}, \qquad \text{Equation 4a}$$

$$\overline{z'_\xi} \triangleq \frac{z'_\xi}{\|z'_\xi\|_2}. \qquad \text{Equation 4b}$$

The loss function, $\mathcal{L}_{\theta,\xi}$, also referred to interchangeably as the BYOL loss, is defined as:

$$L_{\theta,\xi} \triangleq \left\| \overline{q_\theta}(z_\theta) - \overline{z'_\xi} \right\|_2^2 = 2 - 2 \cdot \frac{< q_\theta(z_\theta), z'_\xi >}{\|q_\theta(z_\theta)\|_2 \cdot \|z'_\xi\|_2}. \qquad \text{Equation 5}$$

After each training step, the weights are updated in accordance with Equation 1 and Equation 6:

$$\theta \leftarrow \text{Optimizer}(\theta, \nabla_\theta \mathcal{L}_{\theta,\xi}, \eta) \qquad \text{Equation 6.}$$

In Equation 6, $\eta$ is the learning rate, which may be predefined, and $\mathcal{L}_{\theta,\xi} = \mathcal{L}_{\theta,\xi} + \widetilde{\mathcal{L}_{\theta,\xi}}$, where $\widetilde{\mathcal{L}_{\theta,\xi}}$ refers to the symmetrized loss function obtained by feeding view v' to online neural network 120 and v to target neural network 130.

After training is completed, only the encoding $f_\theta$ of online neural network 120 is retained.

In some embodiments, augmentations t, t' that may be applied to input image 110 may include, but are not limited to, which is not to suggest that other listings are limiting: random cropping, flipping about one or more axes, color distortions, adjustments to at least one image brightness, contrast, saturation, or hue, converting to grayscale, blurring, or other augmentations, or combinations thereof.

In some embodiments, neural networks 120, 130 may be convolutional neural networks (CNNs) having a plurality of layers. For example, neural networks 120, 130 may include 3 or more layers, 10 or more layers, 50 or more layers, 100 or more layers, 200 or more layers, and the like. An example deep learning model that be used for neural networks 120, 130 is ResNet.

In some embodiments, a linear classifier may be trained on top of neural network 120 or 130 to classify a result of the trained model to a particular class/category, however some embodiments include performing semi-supervised training. Some embodiments include performing transfer learning to other image domains different from the domain (or domains) of the training images used to train neural networks 120 and 130. For example, if ImageNet's dataset is used to train neural networks 120 and/or 130, the features learned from the training may be applied to learn features from images of other domains (e.g., digital pathology images).

In some embodiments, the trained instance of neural network 120 may be used to classify digital images of biological samples. For example, a WSI of a biological sample of a patient may be captured via a scanner and input to the trained first neural network. The trained first neural network may be configured to classify the WSI as depicting one (or more) tissue abnormalities (or not depicting any tissue abnormalities). In some embodiments, multiple classifiers may be trained for each candidate tissue abnormality, and the results of each classifier may be aggregated to determine a result (e.g., the image represents a particular tissue abnormality, the image does not represent any tissue abnormality).

In some embodiments, a set of tiles may be created from a WSI, from which patches may be selected for use as input images. As described herein a patch refers to a subset of an image (e.g., a WSI image) that is to be, or has been, operated on. In some cases, patches may overlap. A given patch can be referenced based on its coordinates relative to the original (WSI) image's origin. A tile, as defined herein, refers to a non-overlapping subset of an image (e.g., a WSI image). Patches can span multiple tiles, which separates the logical view of memory (patches) from the physical view of memory (tiles).

In some embodiments, the training may encompass two portions: a self-supervised pretext task training 102 and a supervised downstream task training 104. Training 102 may include multiple layers (e.g., convolutional layers, pooling layers, etc.) trained using an unlabeled dataset 106. In some embodiments, unlabeled dataset 106 may include medical images, non-medical images, or both. A knowledge transfer process may be used to port information learned from training 102 to training 104. Training 104 may use a labeled dataset 108 and the weights and biases learned from training 102 to perform downstream classification.

Figure 16A:
FIGS. 16A-16C illustrate an example input tile and a comparison between the outputs of the first convolutional layer of an example CNN initially trained on generic natural images and the outputs of the first convolutional layer of an example CNN initially trained on digital pathology images, in accordance with various embodiments.
Figure 16A:
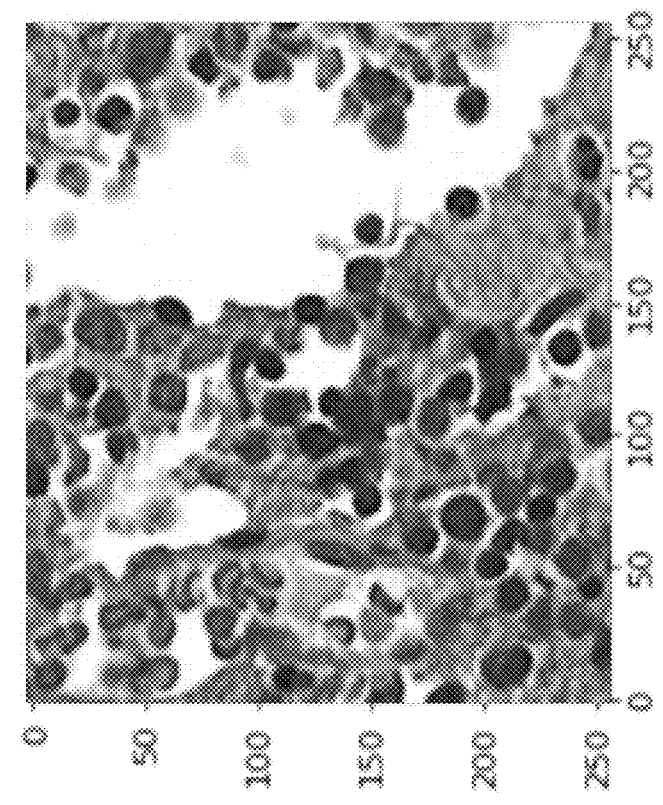

FIG. 16A illustrates a new augmentation technique 200 that includes a larger field of view for training a machine learning model, in accordance with various embodiments. Augmentation technique 200, which is referred to herein interchangeably as "AugmentationV2," helps to include more contextual information during training of a machine learning model, such as PathNet. Due to computational costs and memory constraints, it is difficult to use large tiles (e.g., 512×512 pixels) for training. Augmentation technique 200 overcomes these technical problems by learning from surrounding tiles.

Augmentation technique 200 includes a first stage 210, where larger tiles (e.g. 512×512 pixels) are prepared. For example, tile 212 represents a 512×512 pixel WSI patch. In some embodiments, tile 212 may be obtained from a WSI have a larger size (e.g., 100,000×100,000 pixels). Tile 212 may be formed by dividing a WSI image into a set of tiles each having a same size. In some embodiments, the tiles may overlap. In some embodiments, the tiles (from which tile 212 is obtained) may be randomly selected from the larger WSI. In some embodiments, however, tile 212 may correspond to the WSI being processed.

At a second stage 220, two random small crops from each tile are created and the rest of custom augmentations are applied on these new crops. For example, from tile 212, which may be a 512×512 pixel patch, a first random view 222 and a second random view 224 may be created. First random view 222 and second random view 224 may each be of a smaller size than tile 212. For example, random views 222, 224 may be 256×256 pixels. In some embodiments, the random crops may be augmented a first time. For example, while random views 222, 224 are both obtained from tile 212, they may each correspond to different portions of tile 212 that have been rotated 90-degrees counter-clockwise. However, persons of ordinary skill in the art will recognize that alternative augmentations may be applied to views 222, 224. In some embodiments, random views 222, 224 may be selected such that they retain similar information. For example, random view 222 includes portion 226 which is also visible in random view 224, as seen by portion 226. The similar contextual information allows for the model to be trained to observe global similarities across images, thereby improving the quality of features learnt by the model.

At a third stage 230, another augmentation of random views 222, 224 may be performed. The second augmentation may be different for each view. For example, random view 222 may have a first augmentation applied to it (e.g., a clockwise rotation and a color augmentation) to obtain a first augmented view 232, while random view 224 may have a second (different) augmentation applied (e.g., a brightness augmentation, a color augmentation) to obtain a second augmented view 234. First and second augmented views 232 and 234 may include augmented views of the smaller tile size (e.g., 256×256 pixels). As mentioned above, random views 222, 224 may be crops that have some overlaps. At a fourth stage 240, a BYOL or other loss method may be performed. Therefore, comparing their augmented views (e.g., augmented views 232, 234) using a BYOL loss 242, in fourth stage 240, helps the model learn from the neighborhood of each tile. Augmented views 232, 234 obtained via technique 200 may not share the exact tissue content. Rather, augmented views 232, 234 (as well as random views 222, 224) may only share some common tissue areas (e.g., indicated by portions 226 and 228). This will force the network to learn the features of the local regions in the patch, rather than the global pixel distribution of the entire patch.

In some embodiments, multiple augmented views from the same tile may be partially overlapped or even non-overlapped. However, since these views are obtained from the same local tissue area (the source tile), they should share common tissue characteristics. This helps to train the network to learn these tissue characteristics, rather than only learning the pixel distribution of the entire tile (which would be the case when the augmented views are of the whole tile). Furthermore, some embodiments may include obtaining more than two augmented views. For example, at stage 220, two or more, ten or more, one hundred or more, or other quantities, may be selected from tile 212. As another example, for each of random views 222, 224, one or more, two or more, or other quantities of augmentations may be performed. In some embodiments, the augmented views provided to the model at stage 240 may be randomly selected from the random views generated (e.g., if four augmented views are generated at stage 230, then two augmented views may be selected randomly from the four and provided to the model at stage 240 for training).

Figure 2A:
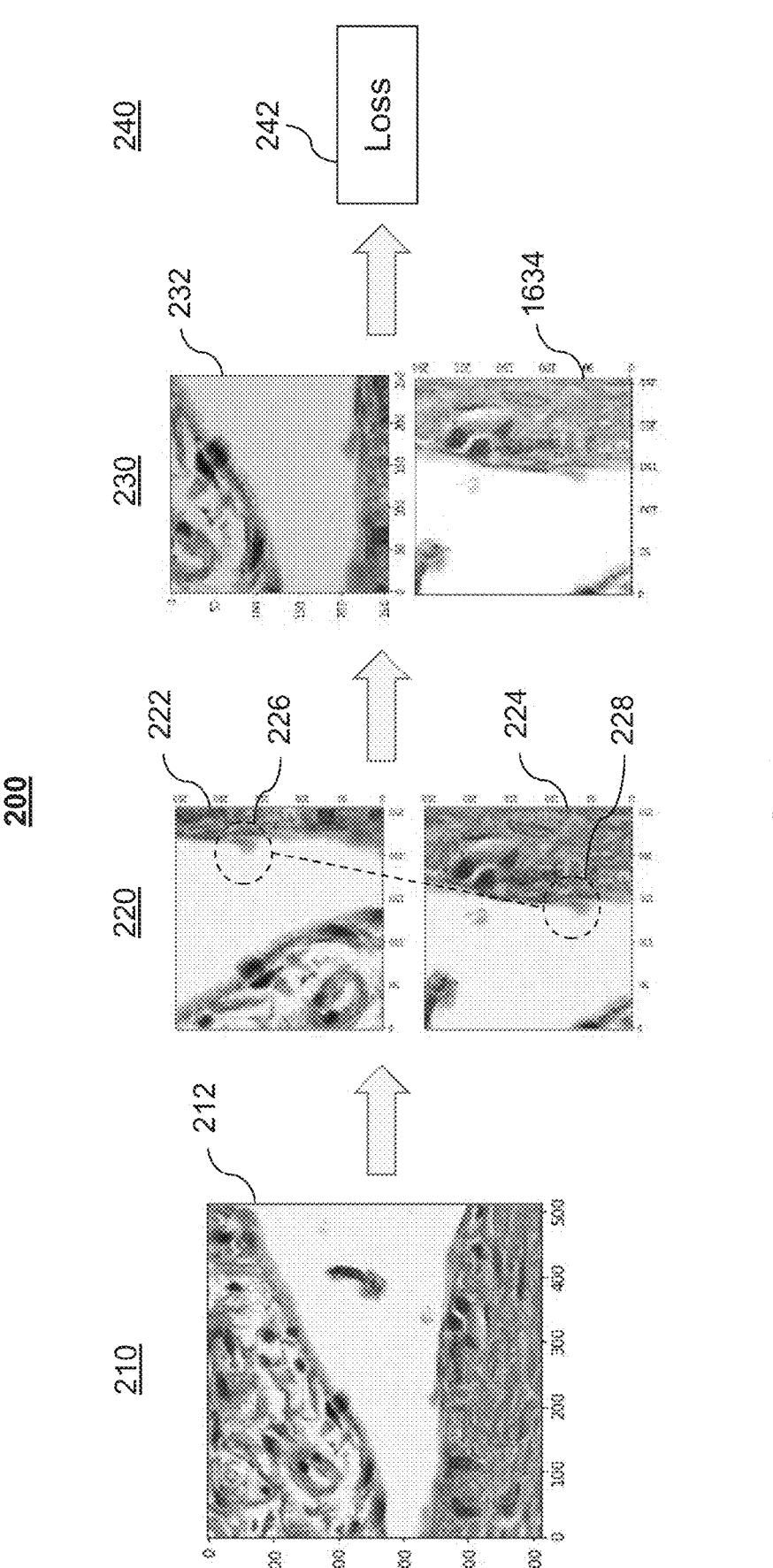
FIG. 2A illustrates a new augmentation technique that includes a larger field of view for training a machine learning model, in accordance with various embodiments.
Figure 2B:
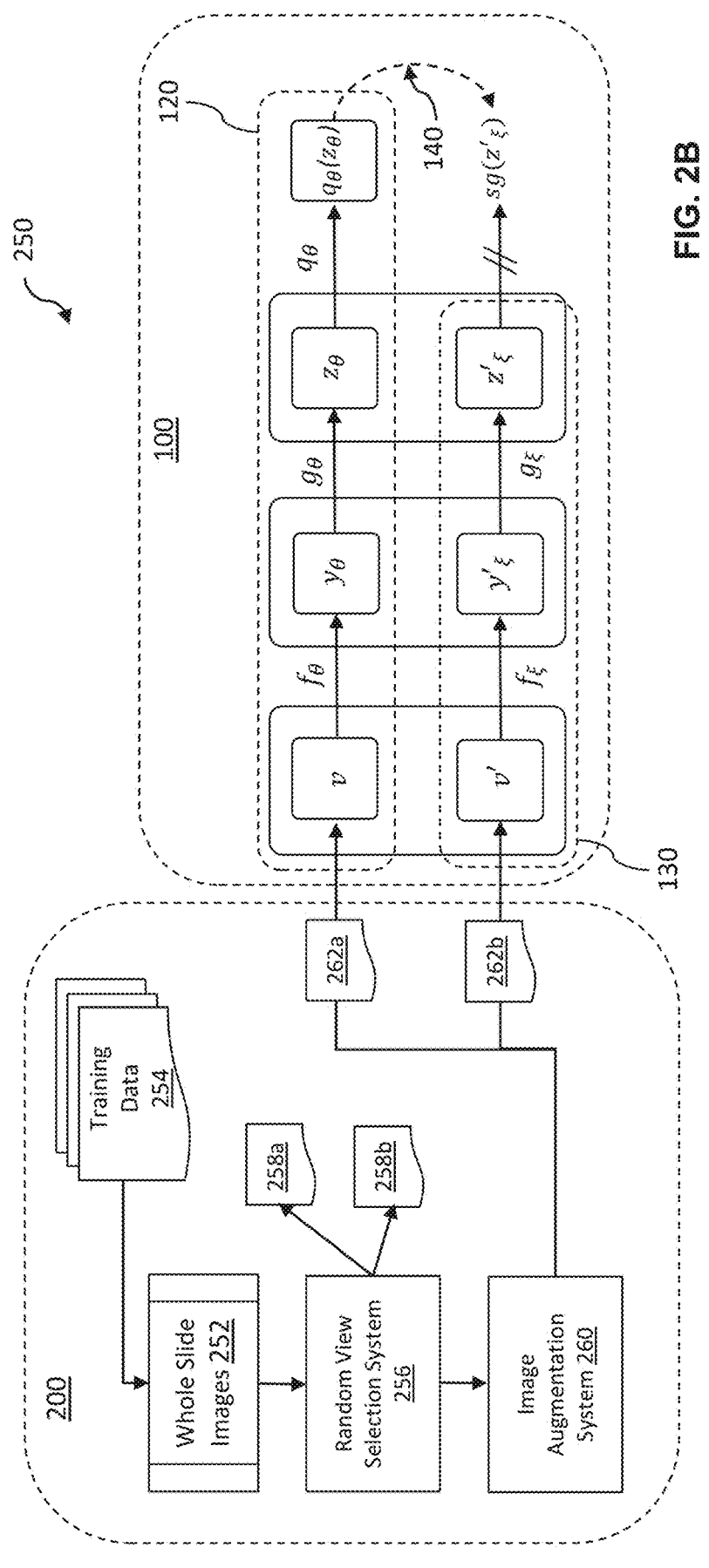
FIG. 2B illustrates the new augmentation technique of FIG. 2A for use in training a model using the BYOL technique, in accordance with various embodiments.

FIG. 2B illustrates the new augmentation technique of FIG. 2A for use in training a model for H&E WSI image feature extraction using the BYOL technique, in accordance with various embodiments. As seen in FIG. 2B, network 250 includes a first portion formed of the components of technique 200 of FIG. 2A and a second portion formed of the components system 100 of FIG. 1. In some embodiments, network 250 may perform self-supervised learning using whole slide images depicting biological samples to be able to infer diagnosis from whole slide images.

Network 250 may obtain one or more whole slide images 252 from training data 254. WSIs 252 may be selected randomly from training data 254, and training data 254 may be selected randomly from a larger corpus of WSIs. In some embodiments, training data 254 and/or WSIs 252 obtained therefrom may be selected based on contextual information associated with WSIs 252. For example, WSIs 252 and/or training data 254 may be selected based on a tissue category depicted by a respective image (e.g., only WSIs depicting tumors of a particular dataset).

In some embodiments, training data 254 may include WSIs that have been cropped or otherwise pre-processed to reduce the number of pixels. For example, WSIs included within training data 254 may be 512×512 pixels. Thus, when selected, WSIs 252 may be formatted as 512×512 patches. In some embodiments, training data 254 may include WSIs that have not been reduced in size. For example, training data 254 may include WSIs that are 100,000×100,000 pixels. These larger WSIs may be reduced in size prior to downstream processing via technique 200. For example, WSIs may be reduced in size to 512×512 patches.

After obtaining WSIs 252, random view selection system 256 may be configured to randomly select a set of tiles from each WSI 252. The random selection may include selecting a percentage of pixels from WSI 252, and selecting a quantity of pixels corresponding to the percentage. In some cases, the percentage of pixels may be predefined (e.g., 50% or less, 25% or less, 10% or less, 5% or less, 3% or less, 2% or less, and the like). In some embodiments, random view selection system 256 may be configured to divide each WSI 252 into a set of tiles. For example, the set of tiles may include 512×512 patches, 256×256 patches, or other amounts. In some embodiments, each patch may be 512× 512 pixels in size.

In some embodiments, random view selection system 256 may randomly select a subset tiles from the set of tiles associated with each of WSIs 252. For example, the subset of tiles may include a first random view 258a and a second random view 258b. In some cases, first and second random views 258a, 1658b may depict similar portions of the WSI they originated from. For example, first random view 222 may include portion 226 which corresponds to portion 228 of second random view 224. In some embodiments, at least some of the set of tiles and/or the subset of tiles (e.g., views 258a, 258b) may, at least partially, overlap.

Image augmentation system 260 may be configured to augment some or all of the subset of tiles (e.g., tiles 258a, 258b). For example, one or more augmentations may be applied to the tiles. The augmentations that may be performed include, but are not limited to, which is not to suggest that other listings are limiting: generating a random color augmentation of the corresponding selected tile, randomly cropping the corresponding selected tile, randomly scaling the corresponding selected tile, randomly flipping the corresponding selected tile about an axis or axes (e.g., flipping along a horizontal or vertical axis), randomly rotating and translating the corresponding selected tile, generating random Gaussian blurring of the corresponding selected tile, randomly changing color to grayscale in the corresponding selected tile, or normalizing the corresponding selected tile. Image augmentation system 260 may output augmented views 262a and 262b, which may be provided to system 100 to train the model.

Differing from the prior techniques described above with respect to FIG. 1, embodiments described herein include providing augmented views 262a and 262b to first neural network 120 and second neural network 130, respectively. Thus, instead of starting from a single (generic) input image 110 and applying transformations thereto, network 250 may use augmented views 262a, 262b, which originate from WSIs 252, as v and v'. System 100 may further be configured to generate representations $y_\theta$ and $y'_\xi$ based on functions $f_\theta(v)$ and $f_\xi(v')$, and the remaining processes of system 100 may proceed as described above to train the model.

Figure 3:
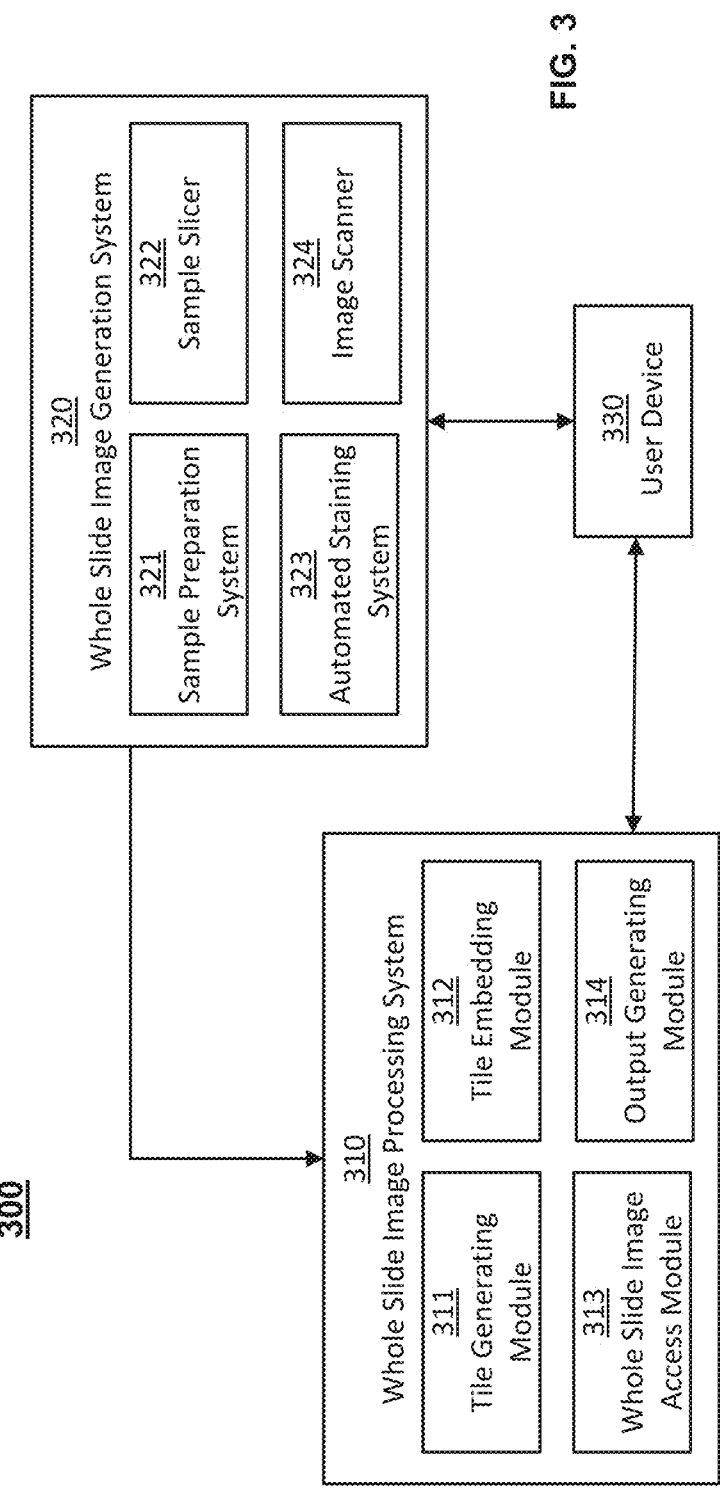
FIG. 3 illustrates an example network of interacting computer systems, in accordance with various embodiments.

FIG. 3 illustrates an example network 300 of interacting computer systems, in accordance with various embodiments. Network 300 may include a whole slide image processing system 310, a whole slide image generation system 320, a user device 330, or other components. For example, network 300 may include one or more scanners configured to capture digital images, such as whole slide images. As another example, whole slide image generation system 320 and/or user device 330 may include, or may be in communication with, one or more scanners. In some embodiments, whole slide image processing system 310, whole slide image generation system 320, and user device 330 may be capable of communicating with one another, or with other devices, systems, databases, and the like, via one or more networks. For example, whole slide image processing system 310 may communicate with user device 330 over the Internet.

In some embodiments, whole slide image generation system 320 can generate one or more whole slide images or other related digital pathology images, corresponding to a particular sample. For example, an image generated by whole slide image generation system 320 can include a stained section of a biopsy sample. As another example, an image generated by whole slide image generation system 320 can include a slide image (e.g., a blood film) of a liquid sample. As another example, an image generated by whole slide image generation system 320 can include fluorescence microscopy such as a slide image depicting fluorescence in situ hybridization (FISH) after a fluorescent probe has been bound to a target DNA or RNA sequence.

Some types of samples (e.g., biopsies, solid samples, and/or samples including tissue) can be processed by a sample preparation system 321 to fix and/or embed the sample. Sample preparation system 321 can facilitate infiltrating the sample with a fixating agent (e.g., liquid fixing agent, such as a formaldehyde solution) and/or embedding substance (e.g., a histological wax). For example, a sample fixation sub-system can fix a sample by exposing the sample to a fixating agent for at least a threshold amount of time (e.g., at least 3 hours, at least 6 hours, or at least 13 hours). A dehydration sub-system can dehydrate the sample (e.g., by exposing the fixed sample and/or a portion of the fixed sample to one or more ethanol solutions) and potentially clear the dehydrated sample using a clearing intermediate agent (e.g., that includes ethanol and a histological wax). A sample embedding sub-system can infiltrate the sample (e.g., one or more times for corresponding predefined time periods) with a heated (e.g., and thus liquid) histological wax. The histological wax can include a paraffin wax and potentially one or more resins (e.g., styrene or polyethylene). The sample and wax can then be cooled, and the wax-infiltrated sample can then be blocked out.

A sample slicer 322 can receive the fixed and embedded sample and can produce a set of sections. Sample slicer 322 can expose the fixed and embedded sample to cool or cold temperatures. Sample slicer 322 can then cut the chilled sample (or a trimmed version thereof) to produce a set of sections. Each section can have a thickness that is (for example) less than 100 μm, less than 50 μm, less than 10 μm or less than 5 μm. Each section can have a thickness that is (for example) greater than 0.1 μm, greater than 1 μm, greater than 2 μm or greater than 4 μm. The cutting of the chilled sample can be performed in a warm water bath (e.g., at a temperature of at least 30° C., at least 35° C. or at least 40° C.).

An automated staining system 323 can facilitate staining one or more of the sample sections by exposing each section to one or more staining agents. Each section can be exposed to a predefined volume of staining agent for a predefined period of time. In some instances, a single section is concurrently or sequentially exposed to multiple staining agents.

Each of one or more stained sections can be presented to an image scanner 324, which can capture a digital image of the section. Image scanner 324 can include a microscope camera. The image scanner 324 can capture the digital image at multiple levels of magnification (e.g., using a 10× objective, 20× objective, 40× objective, etc.). Manipulation of the image can be used to capture a selected portion of the sample at the desired range of magnifications. Image scanner 324 can further capture annotations and/or morphometrics identified by a human operator. In some instances, a section is returned to automated staining system 323 after one or more images are captured, such that the section can be washed, exposed to one or more other stains, and imaged again. When multiple stains are used, the stains can be selected to have different color profiles, such that a first region of an image corresponding to a first section portion that absorbed a large amount of a first stain can be distinguished from a second region of the image (or a different image) corresponding to a second section portion that absorbed a large amount of a second stain.

It will be appreciated that one or more components of whole slide image generation system 320 can, in some embodiments, operate in connection with human operators. For example, human operators can move the sample across various sub-systems (e.g., of sample preparation system 321 or of whole slide image generation system 320) and/or initiate or terminate operation of one or more sub-systems, systems, or components of whole slide image generation system 320. As another example, part or all of one or more components of whole slide image generation system 320 (e.g., one or more subsystems of the sample preparation system 321) can be partly or entirely replaced with actions of a human operator.

Further, it will be appreciated that, while various described and depicted functions and components of whole slide image generation system 320 pertain to processing of a solid and/or biopsy sample, other embodiments can relate to a liquid sample (e.g., a blood sample). For example, whole slide image generation system 320 can receive a liquid-sample (e.g., blood or urine) slide that includes a base slide, smeared liquid sample and cover. Image scanner 324 can then capture an image of the sample slide. In some embodiments, whole slide image generation system 320 can be configured to capture images of samples using advancing imaging techniques, such as FISH, as described herein. For example, once a florescent probe has been introduced to a sample and allowed to bind to a target sequence, appropriate imaging can be used to capture images of the sample for further analysis.

A given sample can be associated with one or more users (e.g., one or more physicians, laboratory technicians, and/or medical providers) during processing and imaging. An associated user can include, by way of example and not of limitation, a person who ordered a test or biopsy that produced a sample being imaged, a person with permission to receive results of a test or biopsy, or a person who conducted analysis of the test or biopsy sample, among others. For example, a user can correspond to a physician, a pathologist, a clinician, or a subject. A user can use/operate one or one user devices 1930 to submit one or more requests (e.g., that identify a subject) that a sample be processed by whole slide image generation system 320 and that a resulting image be processed by a whole slide image processing system 310.

Whole slide image generation system 320 can transmit an image produced by image scanner 324 back to user device 330. User device 330 may then be configured to communicate with the whole slide image processing system 310 to initiate automated processing of the image. In some embodiments, whole slide image generation system 320 may be configured to provide an image produced by image scanner 324 to whole slide image processing system 310 directly (e.g., at the direction of the user of user device 330).

Although not illustrated, other intermediary devices (e.g., data stores of a server connected to the whole slide image generation system 320 or whole slide image processing system 310) can also be used. Additionally, for the sake of simplicity only one whole slide image processing system 310, image generating system 320, and user device 330 is illustrated in the network 300. This disclosure anticipates the use of one or more of each type of system and component thereof without necessarily deviating from the teachings of this disclosure.

Network 300 and associated systems shown in FIG. 3 can be used in a variety of contexts where scanning and evaluation of digital pathology images, such as whole slide images, are an essential component of the work. As an example, network 300 can be associated with a clinical environment, where a user is evaluating the sample for possible diagnostic purposes. The user can review the image using user device 330 prior to providing the image to whole slide image processing system 310. The user can provide additional information to whole slide image processing system 310 that can be used to guide or direct the analysis of the image by whole slide image processing system 310. For example, the user can provide a prospective diagnosis or preliminary assessment of features within the scan. The user can also provide additional context, such as the type of tissue being reviewed. As another example, network 300 can be associated with a laboratory environment were tissues are being examined, for example, to determine the efficacy or potential side effects of a drug. In this context, it can be commonplace for multiple types of tissues to be submitted for review to determine the effects on the whole body of said drug. This can present a particular challenge to human scan reviewers, who may need to determine the various contexts of the images, which can be highly dependent on the type of tissue being imaged. These contexts can optionally be provided to whole slide image processing system 310.

Whole slide image processing system 310 may be configured to process digital pathology images, including whole slide images, classify the digital pathology images, and generate annotations for the digital pathology images and related output. A tile generating module 311 may be configured to define a set of tiles for each digital pathology image (e.g., WSI). To define the set of tiles, tile generating module 311 may be configured to segment the digital pathology image into the set of tiles. As embodied herein, the tiles can be non-overlapping (e.g., each tile includes pixels of the image not included in any other tile) or overlapping (e.g., each tile includes some portion of pixels of the image that are included in at least one other tile). Features such as whether or not tiles overlap, in addition to the size of each tile and the stride of the window (e.g., the image distance or pixels between a tile and a subsequent tile), can increase or decrease the data set for analysis, with more tiles (e.g., through overlapping or smaller tiles) increasing the potential resolution of eventual output and visualizations. For instances, a feature specifying whether some or all of the tiles overlap, as well as a feature specifying which tiles overlap (if any) may be included in the embedding generated for a given tile (described below). In some embodiments, tile generating module 311 defines a set of tiles for an image where each tile is of a predefined size and/or an offset between tiles is predefined. Furthermore, tile generating module 311 can create multiple sets of tiles of varying size, overlap, step size, etc., for each image. In some embodiments, the digital pathology image itself can contain tile overlap, which may result from the imaging technique. Even segmentation without tile overlapping can be a preferable solution to balance tile processing requirements and avoid influencing the embedding generation and weighting value generation discussed herein. A tile size or tile offset can be determined, for example, by calculating one or more performance metrics (e.g., precision, recall, accuracy, and/or error) for each size/offset and by selecting a tile size and/or offset associated with one or more performance metrics above a predetermined threshold and/or associated with one or more optimal (e.g., high precision, highest recall, highest accuracy, and/or lowest error) performance metric(s).

Tile generating module 311 may further be configured to define a tile size depending on the type of abnormality being detected. For example, tile generating module 311 can be configured with awareness of the type(s) of tissue abnormalities that whole slide image processing system 310 will be searching for and can customize the tile size according to the tissue abnormalities to optimize detection. For example, image generating module 311 can determine that, when the tissue abnormalities include searching for inflammation or necrosis in lung tissue, the tile size should be reduced to increase the scanning rate, while when the tissue abnormalities include abnormalities with Kupffer cells in liver tissues, the tile size should be increased to increase the opportunities for whole slide image processing system 310 to analyze the Kupffer cells holistically. In some embodiments, tile generating module 311 may be configured to define a set of tiles, where a number of tiles in the set, size of the tiles of the set, resolution of the tiles for the set, or other related properties, for each image, is defined and held constant for each of one or more images.

As embodied herein, tile generating module 311 may be further configured to define the set of tiles for each digital pathology image along one or more color channels or color combinations. As an example, digital pathology images received by whole slide image processing system 310 can include large-format multi-color channel images having pixel color values for each pixel of the image specified for one of several color channels. Example color specifications or color spaces that can be used include the RGB, CMYK, HSL, HSV, or HSB color specifications. The set of tiles can be defined based on segmenting the color channels and/or generating a brightness map or greyscale equivalent of each tile. For example, for each segment of an image, tile generating module 311 can provide a red tile, blue tile, green tile, and/or brightness tile, or the equivalent for the color specification used. As explained herein, segmenting the digital pathology images based on segments of the image and/or color values of the segments can improve the accuracy and recognition rates of the networks used to generating embeddings for the tiles and image and to produce classifications of the image. Additionally, whole slide image processing system 310, for example, using tile generating module 311, can convert between color specifications and/or prepare copies of the tiles using multiple color specifications. Color specification conversions can be selected based on a desired type of image augmentation (e.g., accentuating or boosting particular color channels, saturation levels, brightness levels, etc.). Color specification conversions can also be selected to improve compatibility between whole slide image generation systems 1220 and whole slide image processing system 310. For example, a particular image scanning component can provide output in the HSL color specification and the models used in whole slide image processing system 310, as described herein, can be trained using RGB images. Converting the tiles to the compatible color specification can ensure the tiles can still be analyzed.

Additionally, the whole slide image processing system can up-sample or down-sample images that are provided in particular color depth (e.g., 8-bit, 16-bit, etc.) to be usable by the whole slide image processing system. Furthermore, the whole slide image processing system 310 can cause tiles to be converted according to the type of image that has been captured (e.g., fluorescent images may include greater detail on color intensity or a wider range of colors).

As described herein, a tile embedding module 312 can generate an embedding for each tile in a corresponding feature embedding space. The embedding can be represented by whole slide image processing system 310 as a feature vector for the tile. Tile embedding module 312 can use a neural network (e.g., a convolutional neural network) to generate a feature vector that represents each tile of the image. In some embodiments, the tile embedding neural network can be based on the ResNet image network trained on a dataset based on natural (e.g., non-medical) images, such as the ImageNet dataset. For example, the neural network used by tile embedding module 312 may correspond to first neural network 120, second neural network 130, or another neural network. By using a non-specialized tile embedding network, tile embedding module 312 can leverage known advances in efficiently processing images to generate embeddings. Furthermore, using a natural image dataset allows the embedding neural network to learn to discern differences between tile segments on a holistic level.

In other embodiments, the tile embedding network used by tile embedding module 312 can be an embedding network customized to handle large numbers of tiles of large format images, such as digital pathology whole slide images. Additionally, the tile embedding network used by tile embedding module 312 can be trained using a custom dataset. For example, the tile embedding network can be trained using a variety of samples of whole slide images or even trained using samples relevant to the subject matter for which the embedding network will be generating embeddings (e.g., scans of particular tissue types). Training the tile embedding network using specialized or customized sets of images can allow the tile embedding network to identify finer differences between tiles which can result in more detailed and accurate distances between tiles in the feature embedding space at the cost of additional time to acquire the images and the computational and economic cost of training multiple tile generating networks for use by tile embedding module 312. Tile embedding module 312 can select from a library of tile embedding networks based on the type of images being processed by whole slide image processing system 310.

As described herein, tile embeddings can be generated from a deep learning neural network using visual features of the tiles. Tile embeddings can be further generated from contextual information associated with the tiles or from the content shown in the tile. For example, a tile embedding can include one or more features that indicate and/or correspond to a size of depicted objects (e.g., sizes of depicted cells or aberrations) and/or density of depicted objects (e.g., a density of depicted cells or aberrations). Size and density can be measured absolutely (e.g., width expressed in pixels or converted from pixels to nanometers) or relative to other tiles from the same digital pathology image, from a class of digital pathology images (e.g., produced using similar techniques or by a single whole slide image generation system or scanner), or from a related family of digital pathology images. Furthermore, tiles can be classified prior to tile embedding module 312 generating embeddings for the tiles such that tile embedding module 312 considers the classification when preparing the embeddings.

For consistency, tile embedding module 312 may be configured to produce embeddings of a predefined size (e.g., vectors of 512 elements, vectors of 2048 bytes, etc.). Tile embedding module 312 can cause embeddings of various and arbitrary sizes to be produced. Tile embedding module 312 can further be configured to adjust the sizes of the embeddings based on user direction or can be selected, for example, to optimize computation efficiency, accuracy, or other parameters. In some embodiments, the embedding size can be based on the limitations or specifications of the deep learning neural network that generated the embeddings. Larger embedding sizes can be used to increase the amount of information captured in the embedding and improve the quality and accuracy of results, while smaller embedding sizes can be used to improve computational efficiency.

A whole slide image access module 313 can manage requests to access whole slide images from other modules of whole slide image processing system 310 and user device 330. For example, whole slide image access module 313 may be configured to receive requests to identify a whole slide image based on a particular tile, an identifier for the tile, or an identifier for the whole slide image. Whole slide image access module 313 can perform tasks of confirming that the whole slide image is available to the user requesting, identifying the appropriate databases from which to retrieve the requested whole slide image, and retrieving any additional metadata that may be of interest to the requesting user or module. Additionally, whole slide image access module 313 can handle efficiently streaming the appropriate data to the requesting device. As described herein, whole slide images may be provided to user devices in chunks, based on the likelihood that a user will wish to see the portion of the whole slide image. Whole slide image access module 313 can determine which regions of the whole slide image to provide and determine how best to provide them. Furthermore, whole slide image access module 313 can be empowered within whole slide image processing system 310 to ensure that no individual component locks up or otherwise misuses a database or whole slide image to the detriment of other components or users.

An output generating module 314 of whole slide image processing system 310 may be configured to generate output corresponding to result tile and result whole slide image datasets based on a user request. As described herein, the output can include a variety of visualizations, interactive graphics, and/or reports based upon the type of request and the type of data that is available. In some embodiments, the output will be provided to user device 330 for display. In some embodiments, the output can be accessed directly from whole slide image processing system 310. The output will be based on existence of and access to the appropriate data, so the output generating module will be empowered to access necessarily metadata and anonymized patient information as needed. As with the other modules of whole slide image processing system 310, output generating module 314 can be updated and improved in a modular fashion, so that new output features can be provided to users without requiring significant downtime.

The general techniques described herein can be integrated into a variety of tools and use cases. For example, as described, a user (e.g., pathology or clinician) can access a user device 330 that is in communication with whole slide image processing system 310 and provide a query image for analysis. Whole slide image processing system 310, or the connection to the whole slide image processing system can be provided as a standalone software tool or package that searches for corresponding matches, identifies similar features, and generates appropriate output for the user upon request. As a standalone tool or plug-in that can be purchased or licensed on a streamlined basis, the tool can be used to augment the capabilities of a research or clinical lab. Additionally, the tool can be integrated into the services made available to the customer of whole slide image generation systems. For example, the tool can be provided as a unified workflow, where a user who conducts or requests a whole slide image to be created automatically receives a report of noteworthy features within the image and/or similar whole slide images that have been previously indexed. Therefore, in addition to improving whole slide image analysis, the techniques can be integrated into existing systems to provide additional features not previously considered or possible.

Moreover, whole slide image processing system 310 can be trained and customized for use in particular settings. For example, whole slide image processing system 310 can be specifically trained for use in providing insights relating to specific types of tissue (e.g., lung, breast, heart, blood, liver, lymph node, etc.). As another example, whole slide image processing system 310 can be trained to assist with safety assessment, for example in determining levels or degrees of toxicity associated with drugs or other potential therapeutic treatments. Once trained for use in a specific subject matter or use case, whole slide image processing system 310 is not necessarily limited to that use case. Training may be performed in a particular context, such as toxicity assessment, due to a relatively larger set of at least partially labeled or annotated images.

Figure 4:
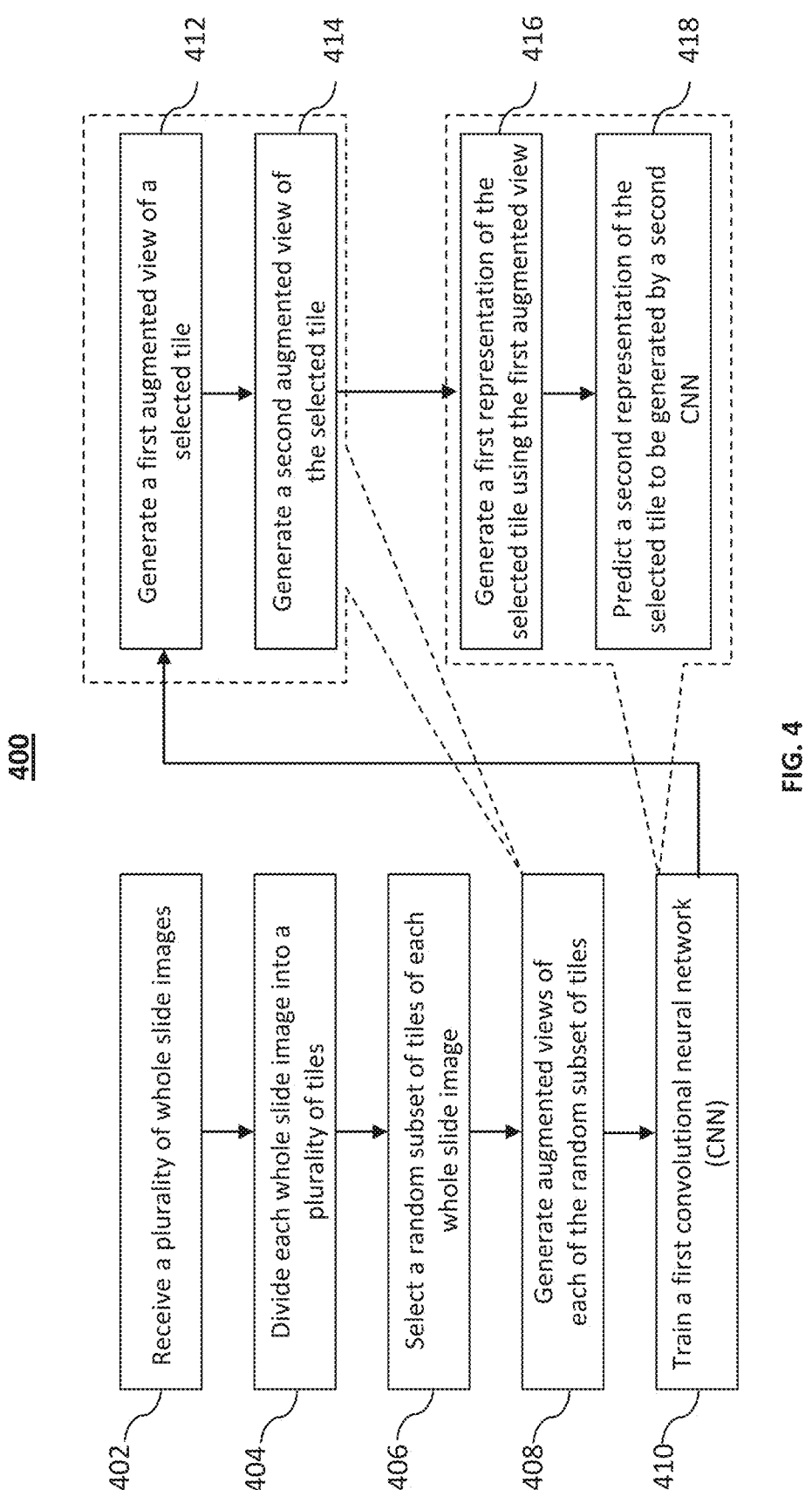
FIG. 4 illustrates an example process for training a model to classify digital pathology images, in accordance with various embodiments.
Figure 5A:
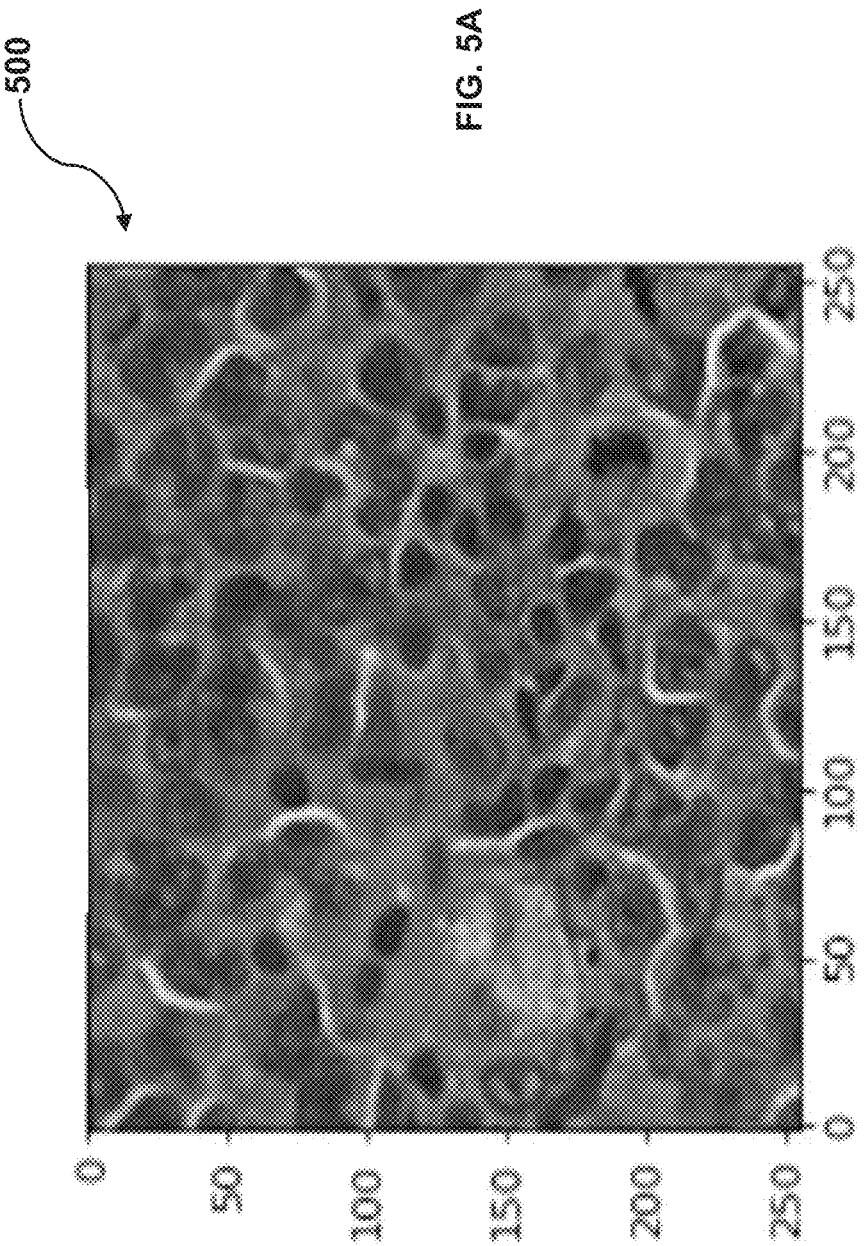
FIGS. 5A-11E show examples of selected WSI patches in various phenotype categories of different private datasets, in accordance with various embodiments.
Figure 5B:
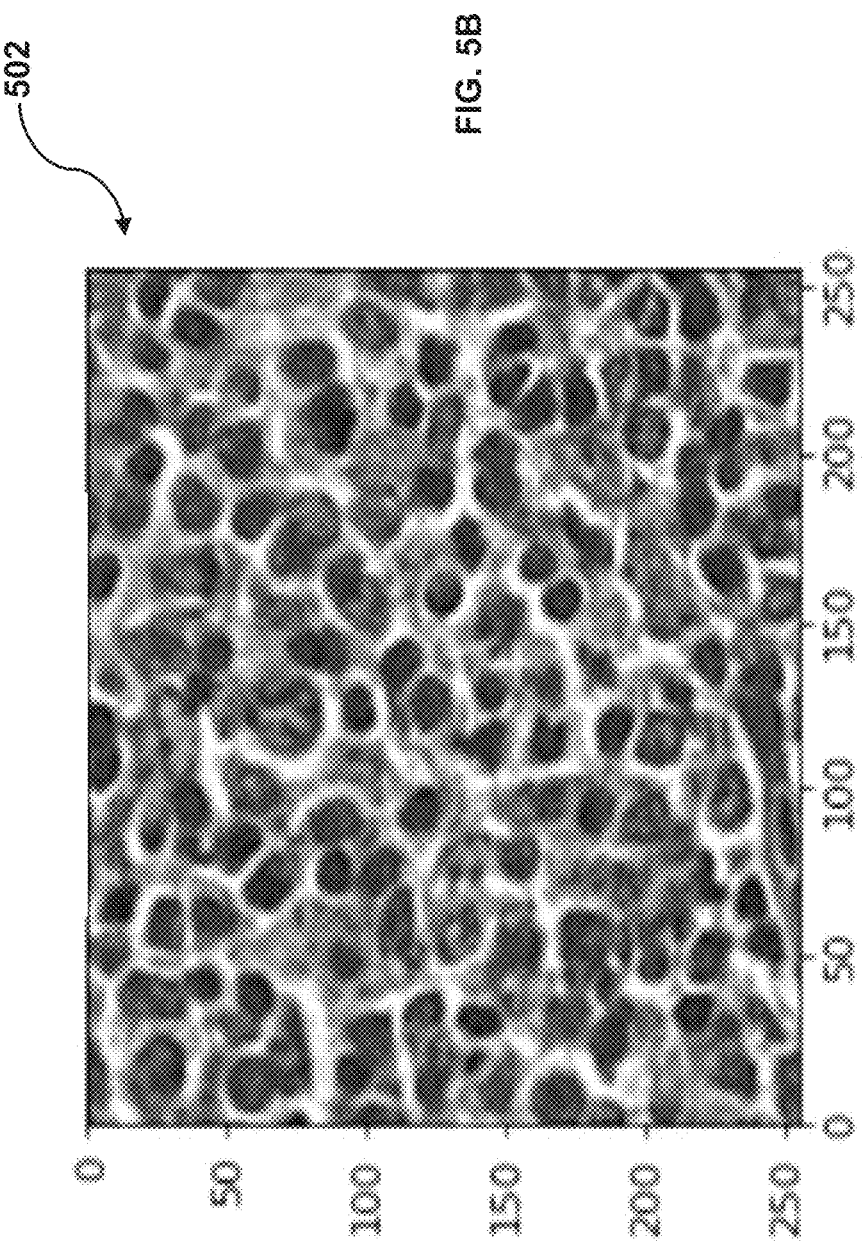
Figure 5C:
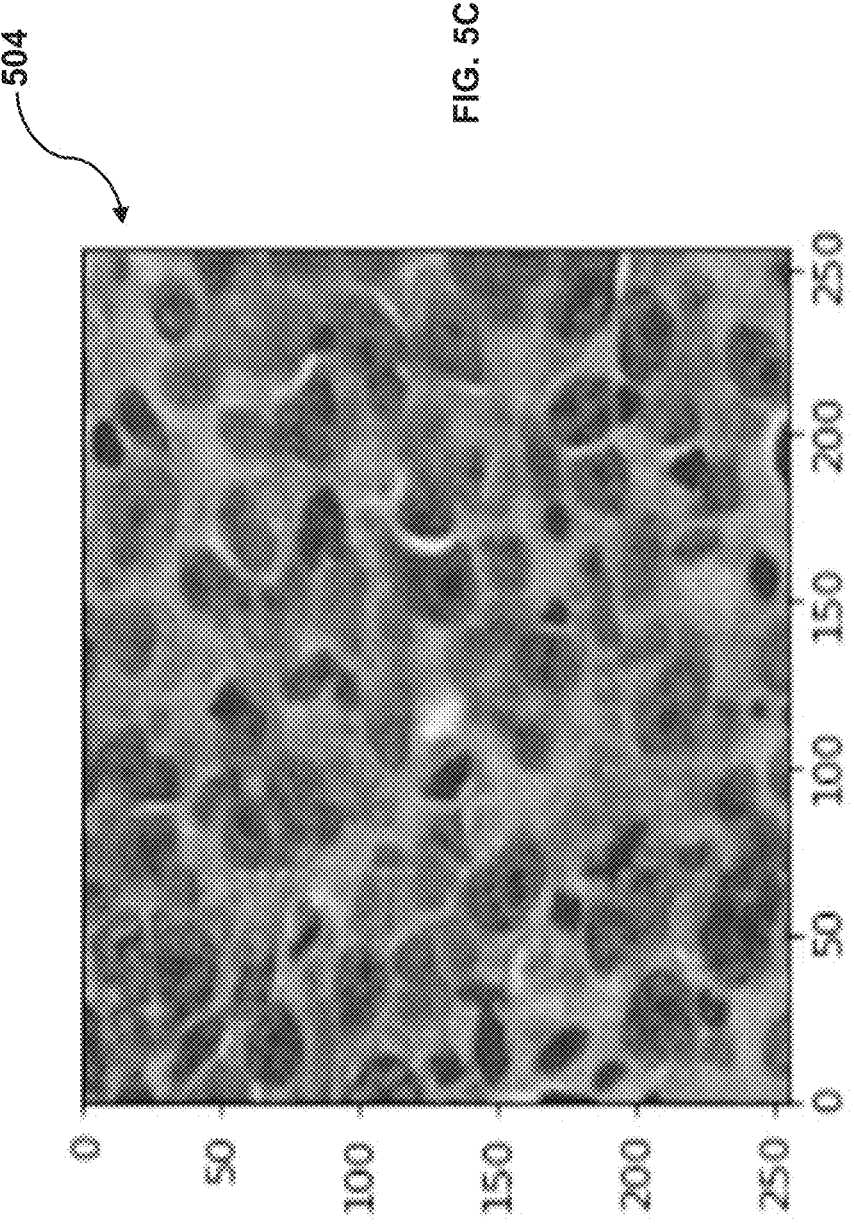
Figure 5D:
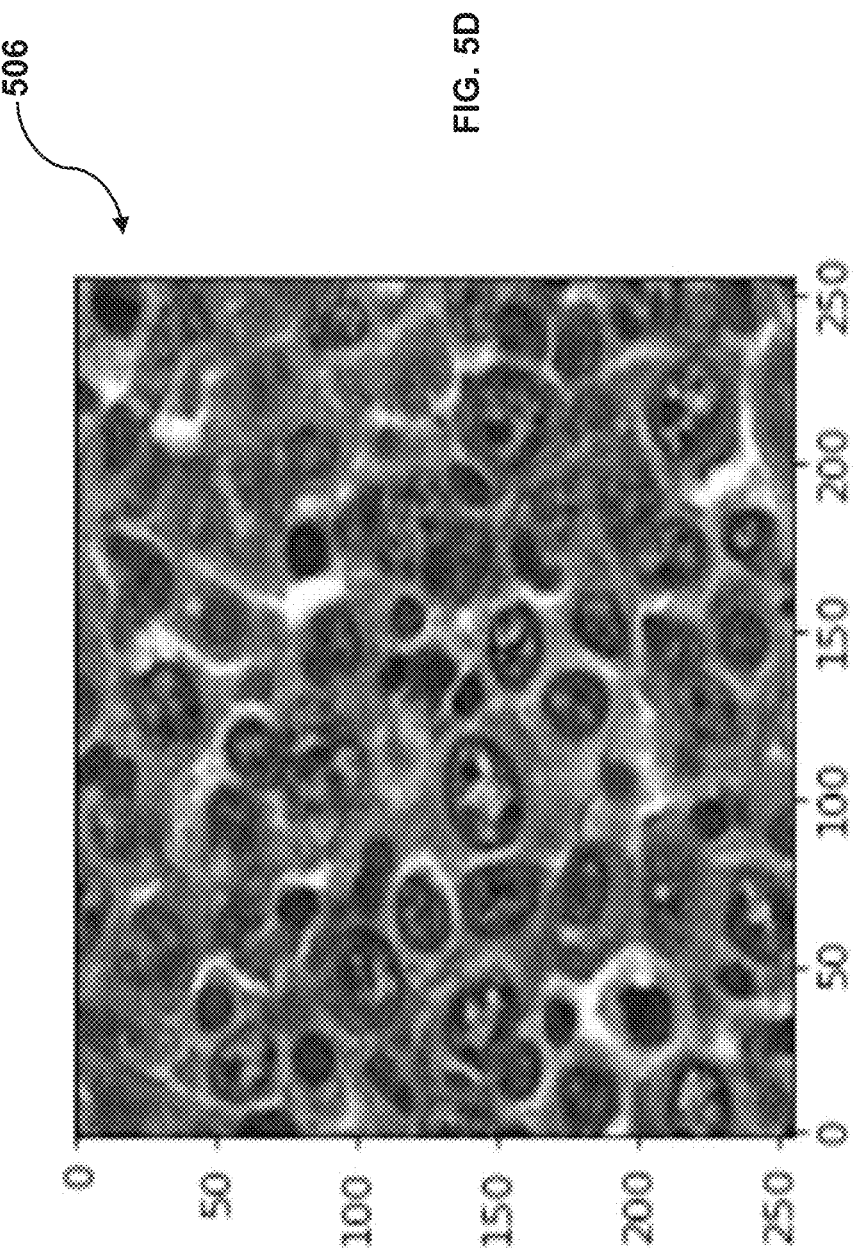
Figure 5E:
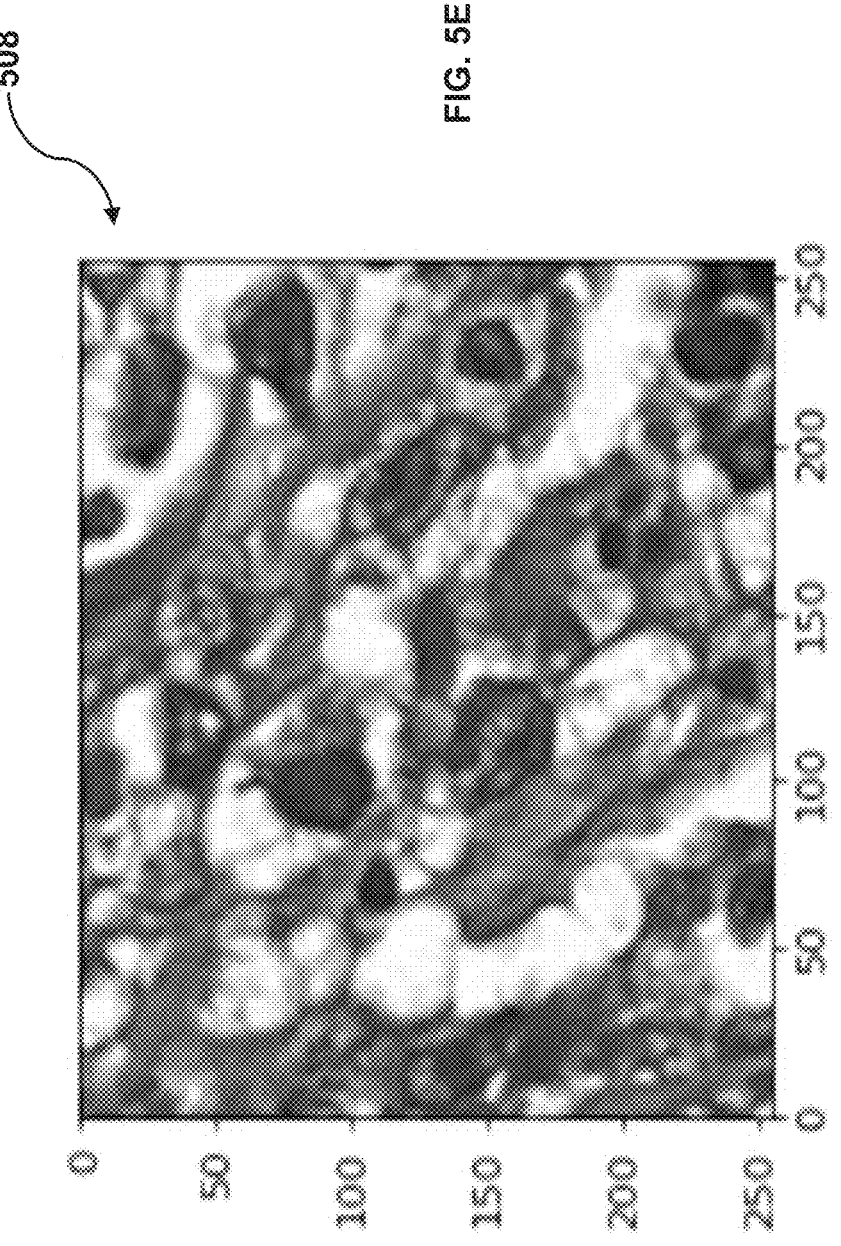
Figure 6A:
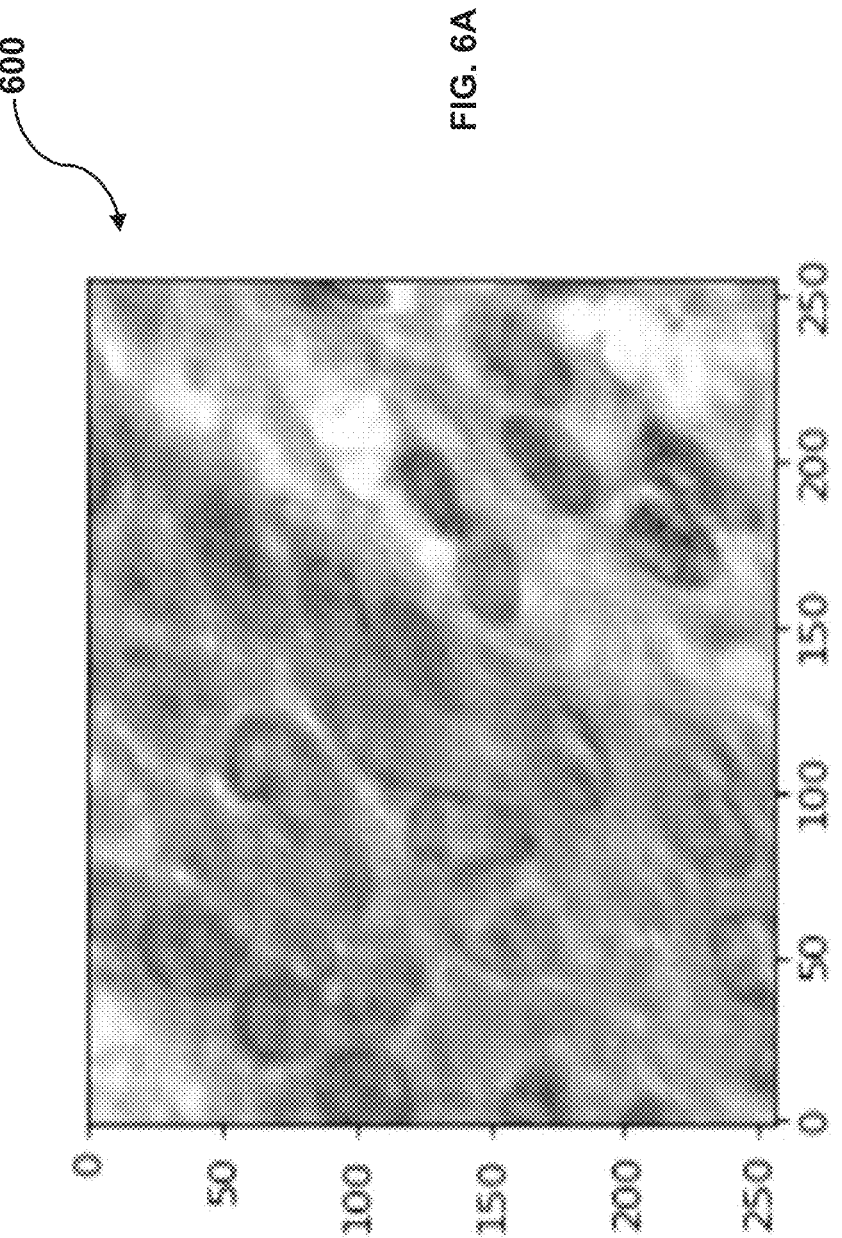
Figure 6B:
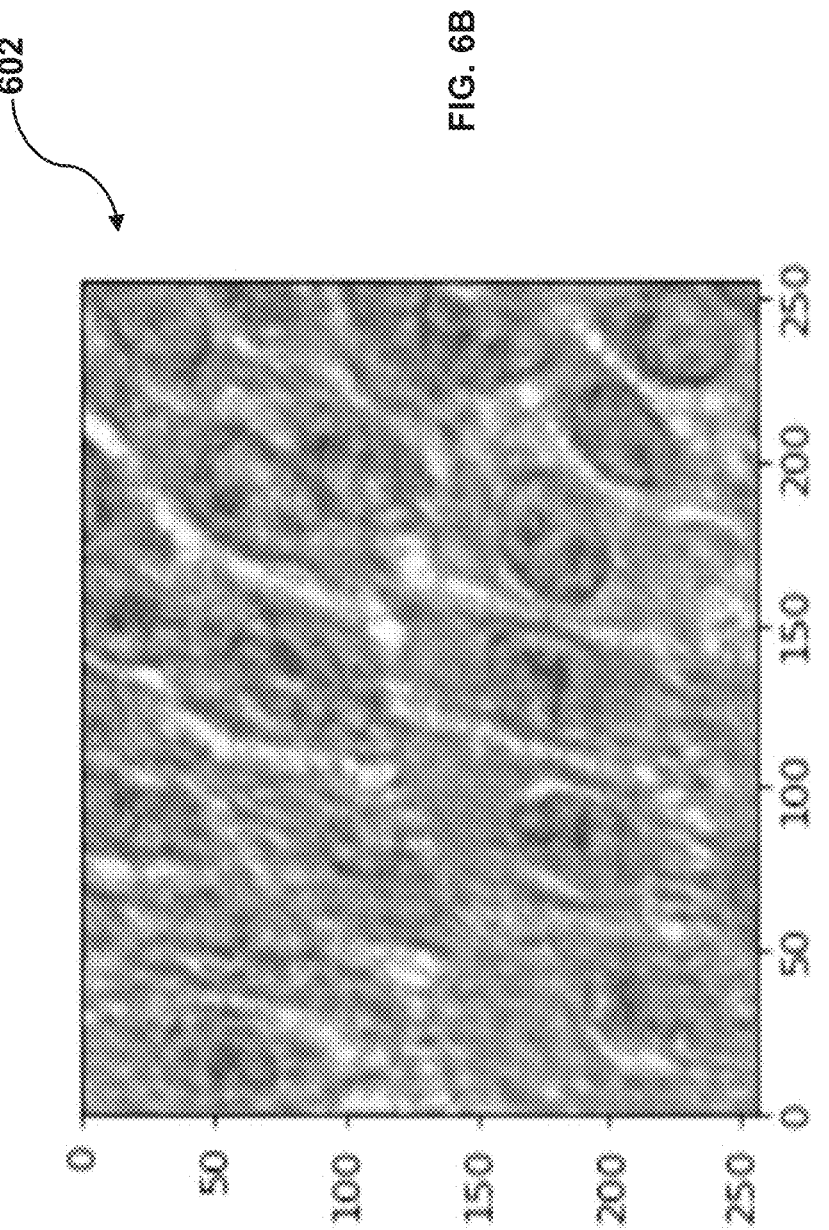
Figure 6C:
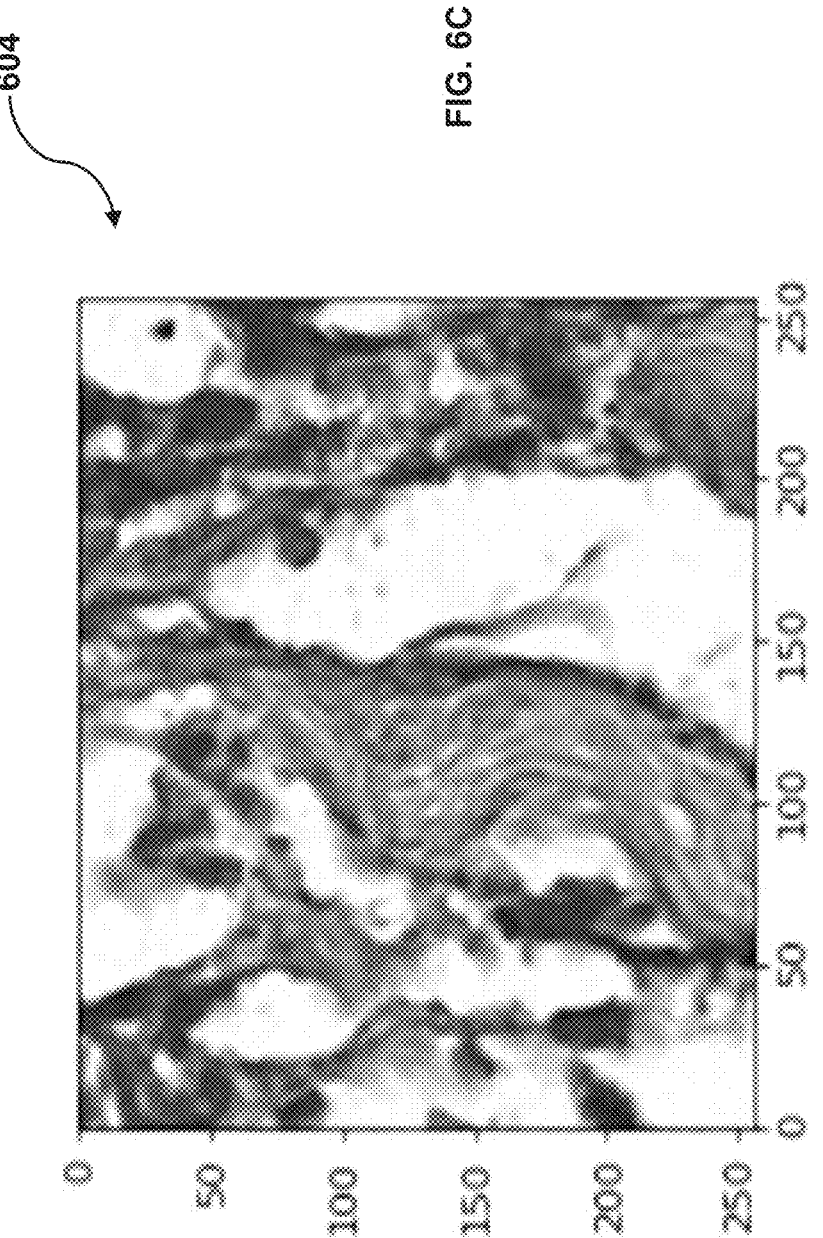
Figure 6D:
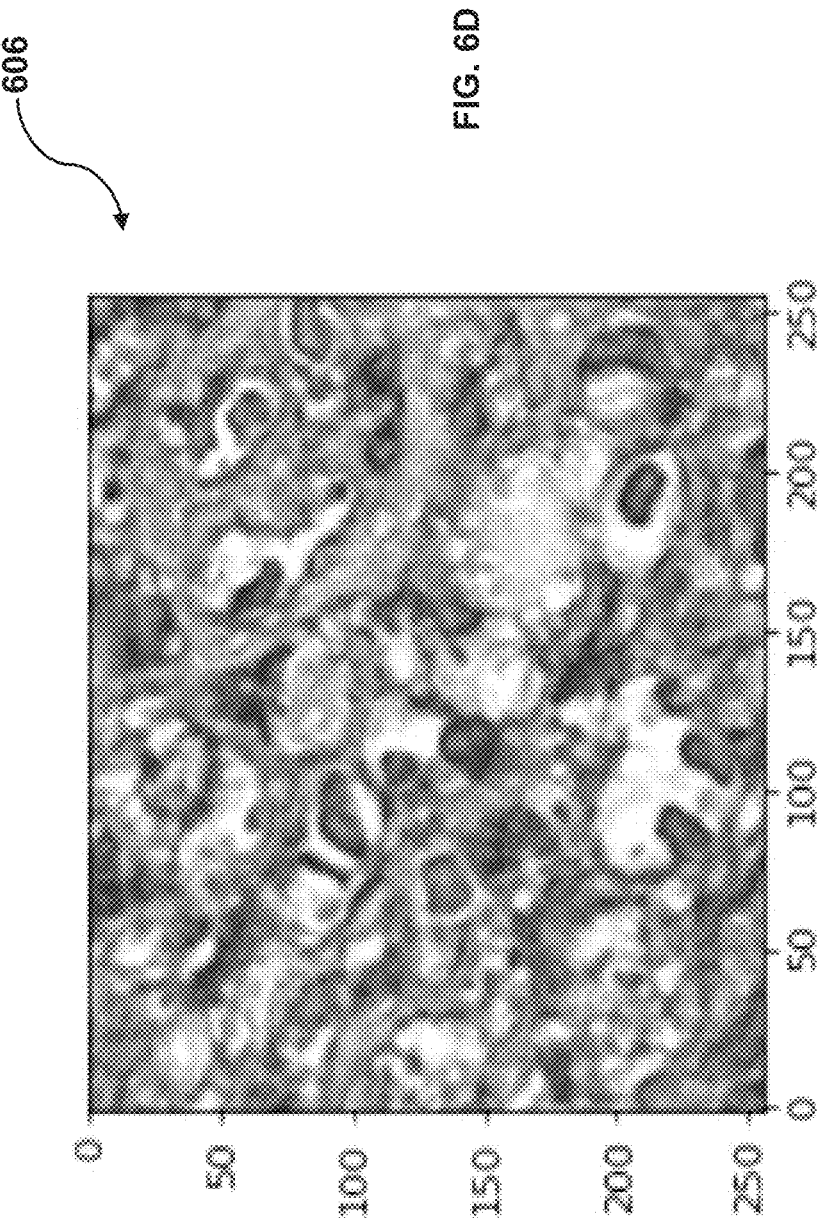
Figure 6E:
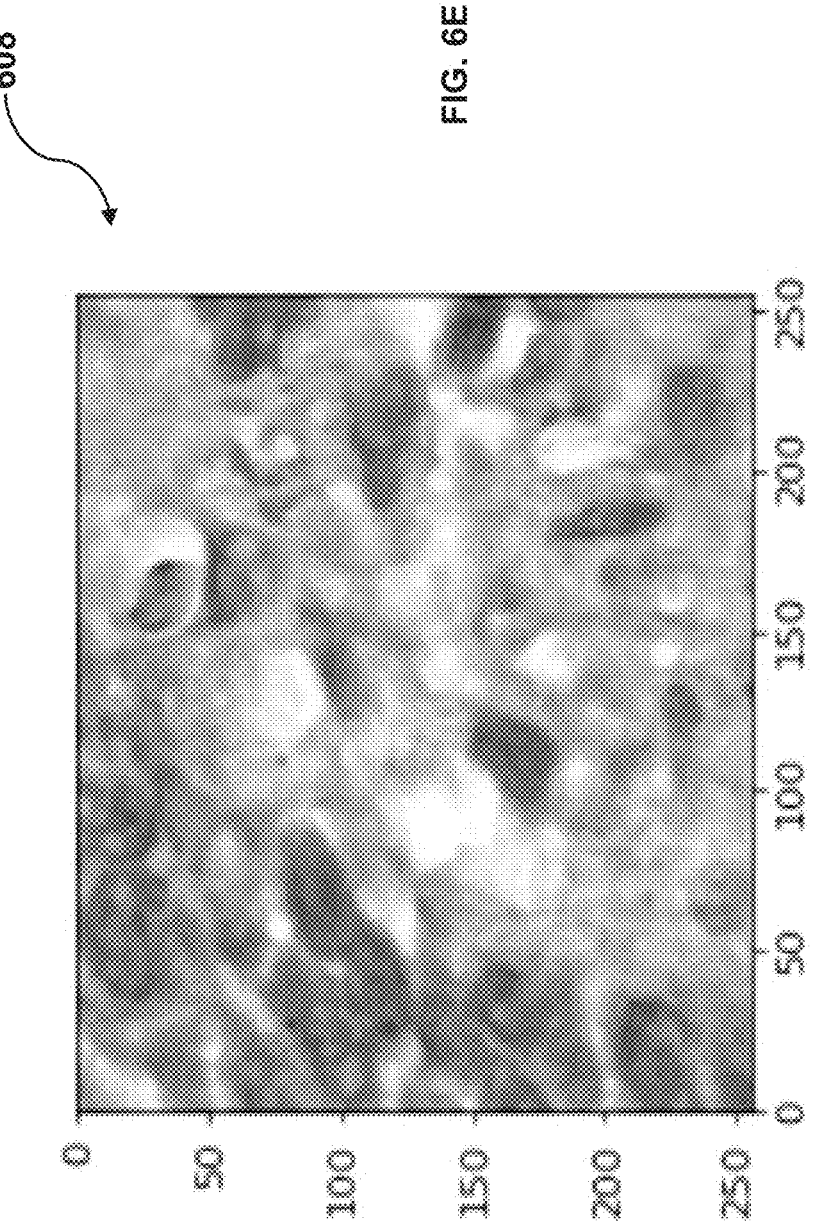
Figure 7A:
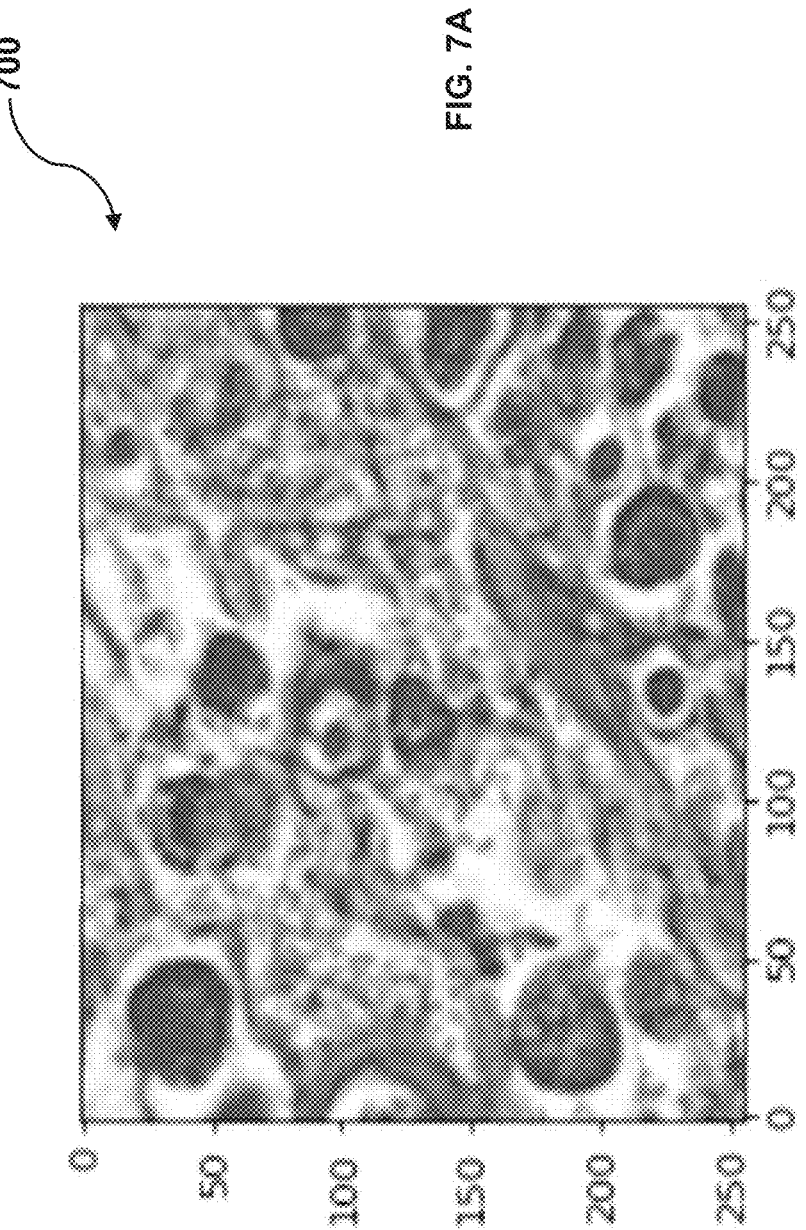
Figure 7B:
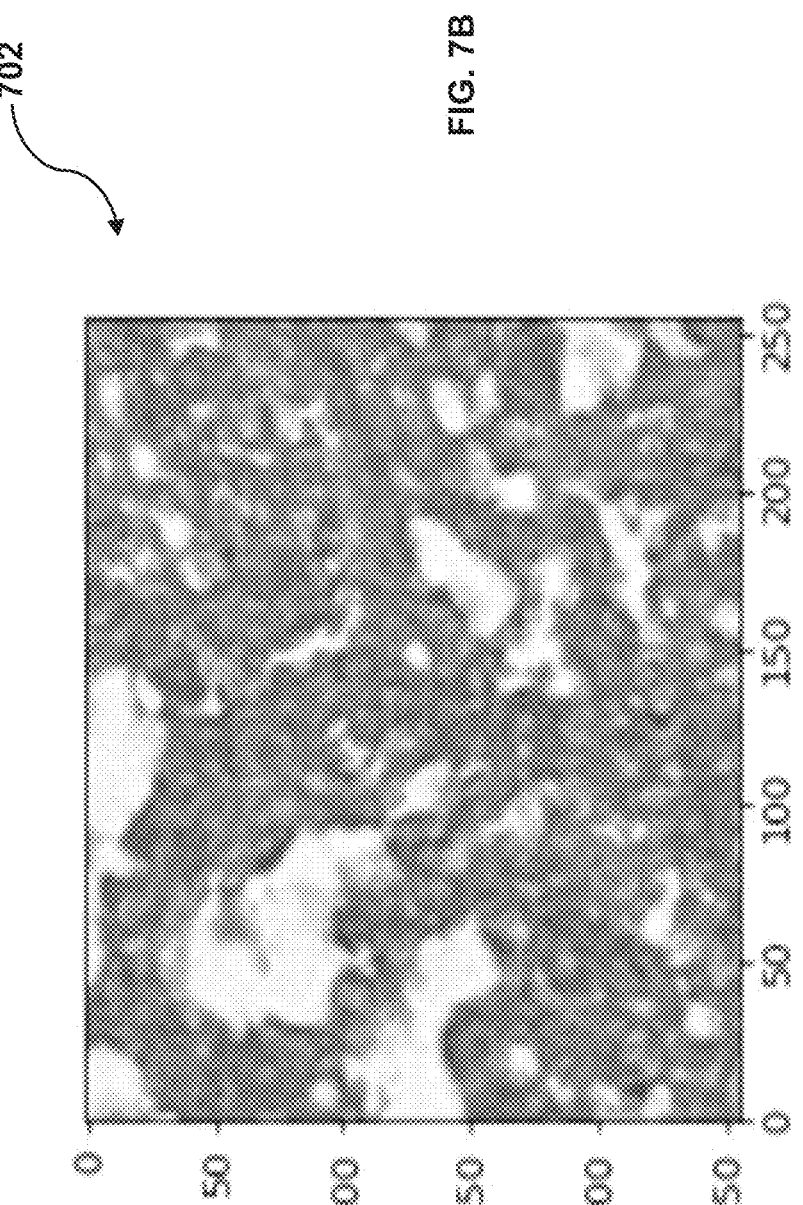
Figure 7C:
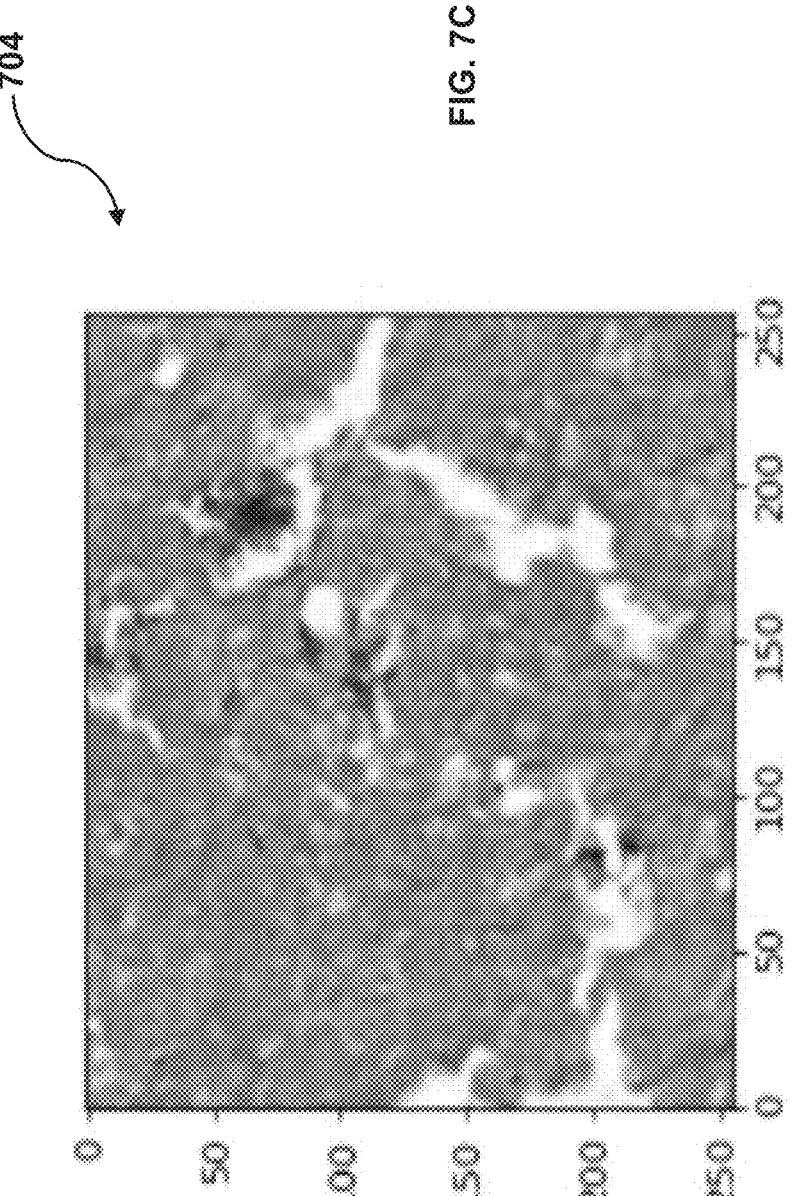
Figure 7D:
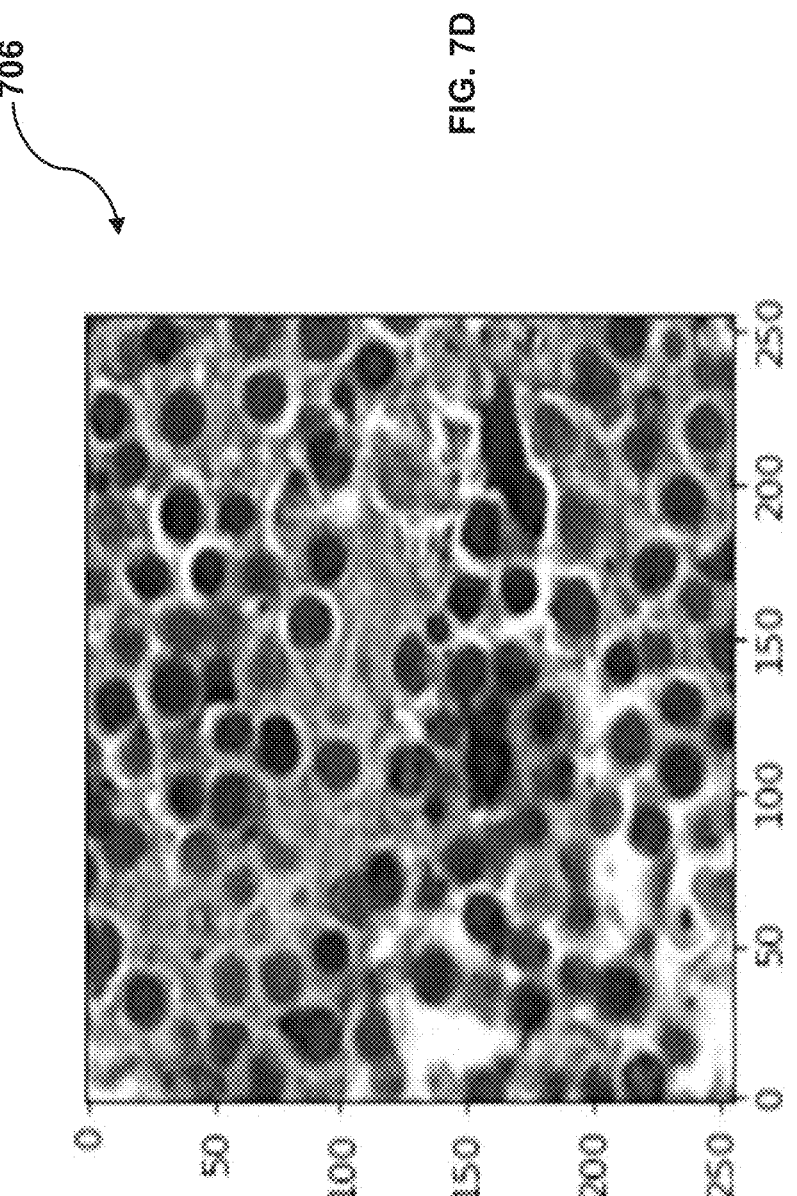
Figure 7E:
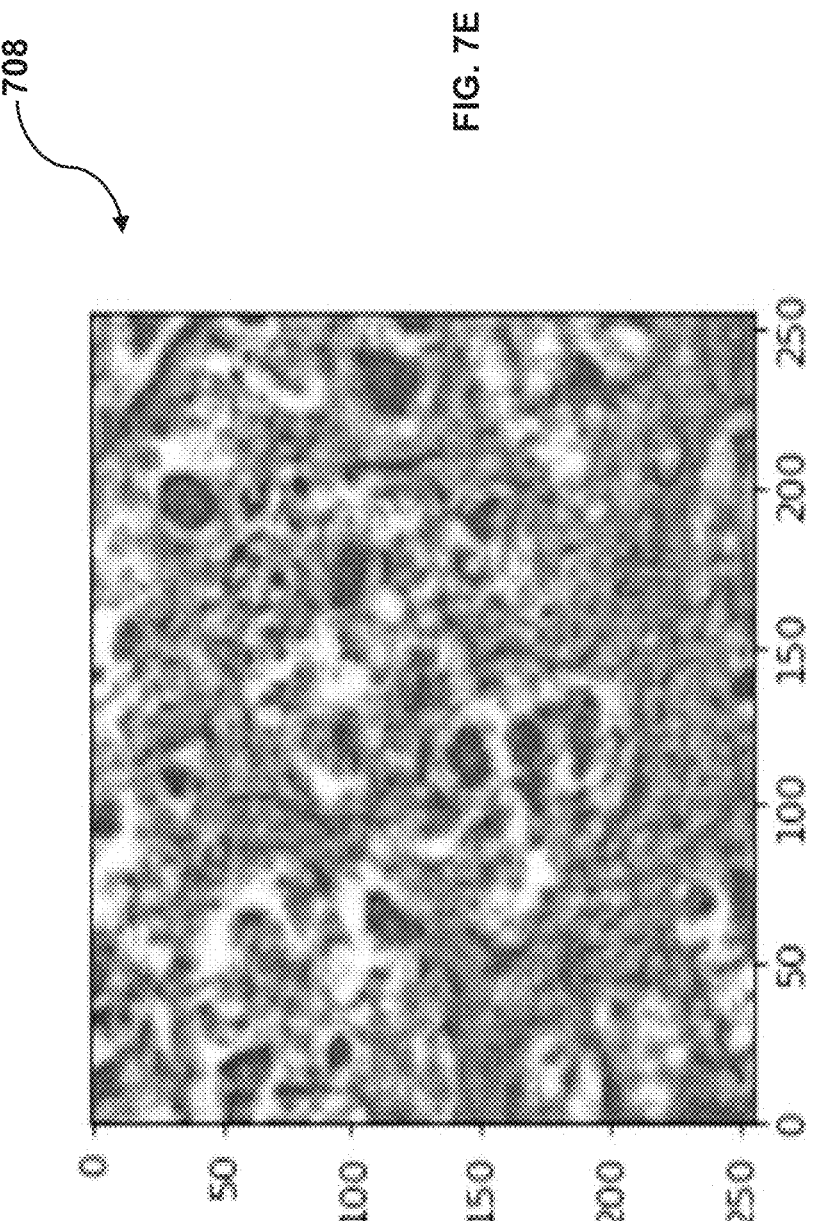
Figure 8A:
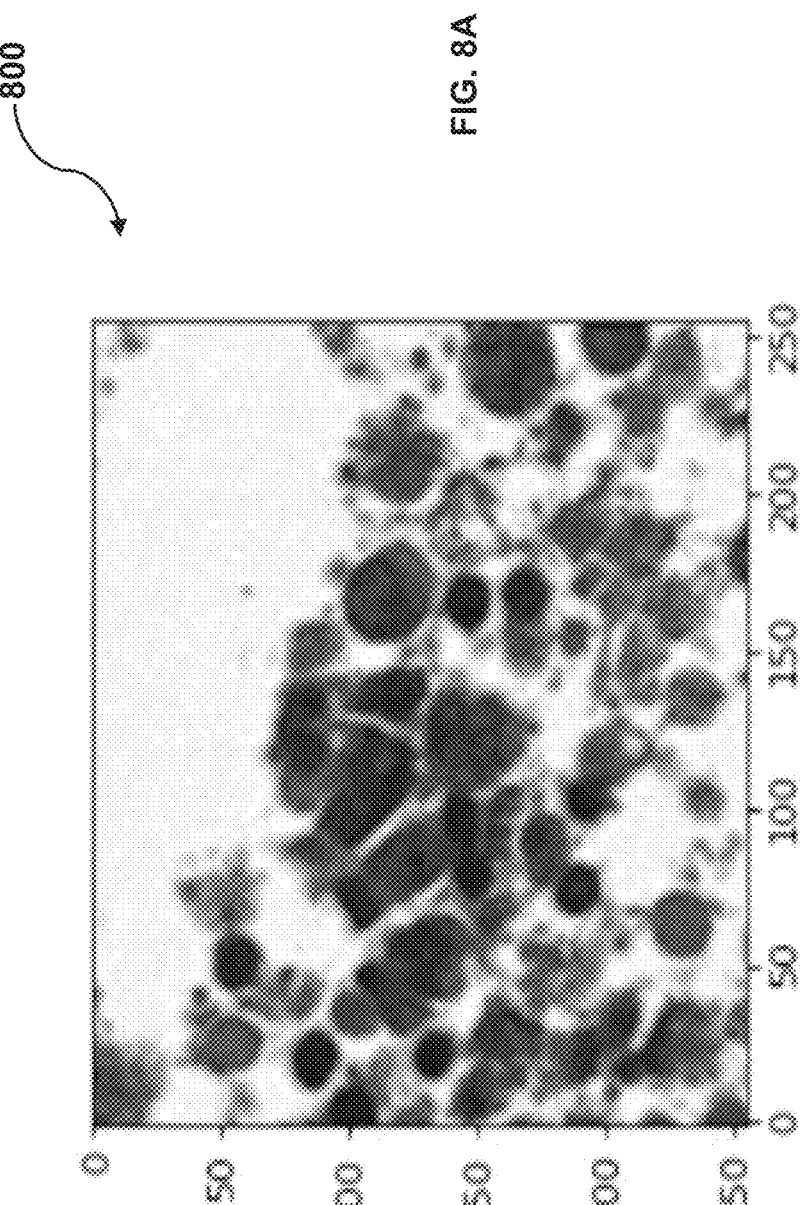
Figure 8B:
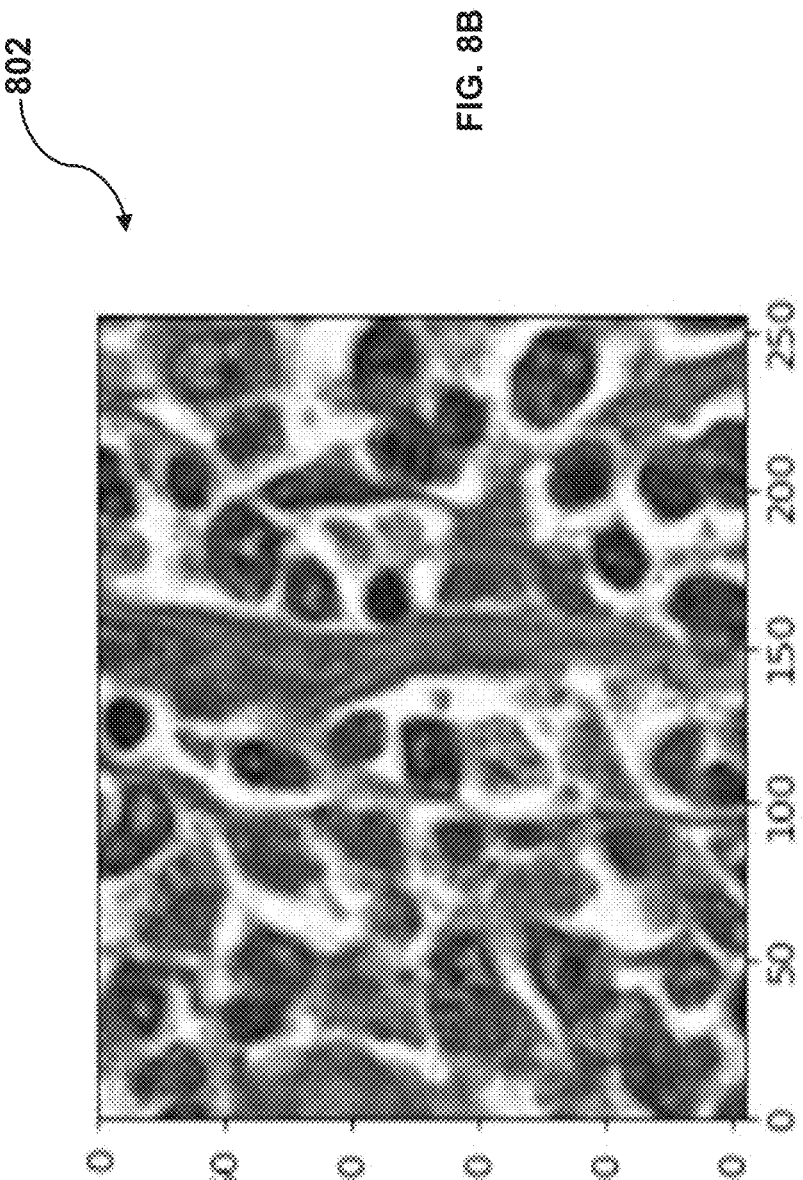
Figure 8C:
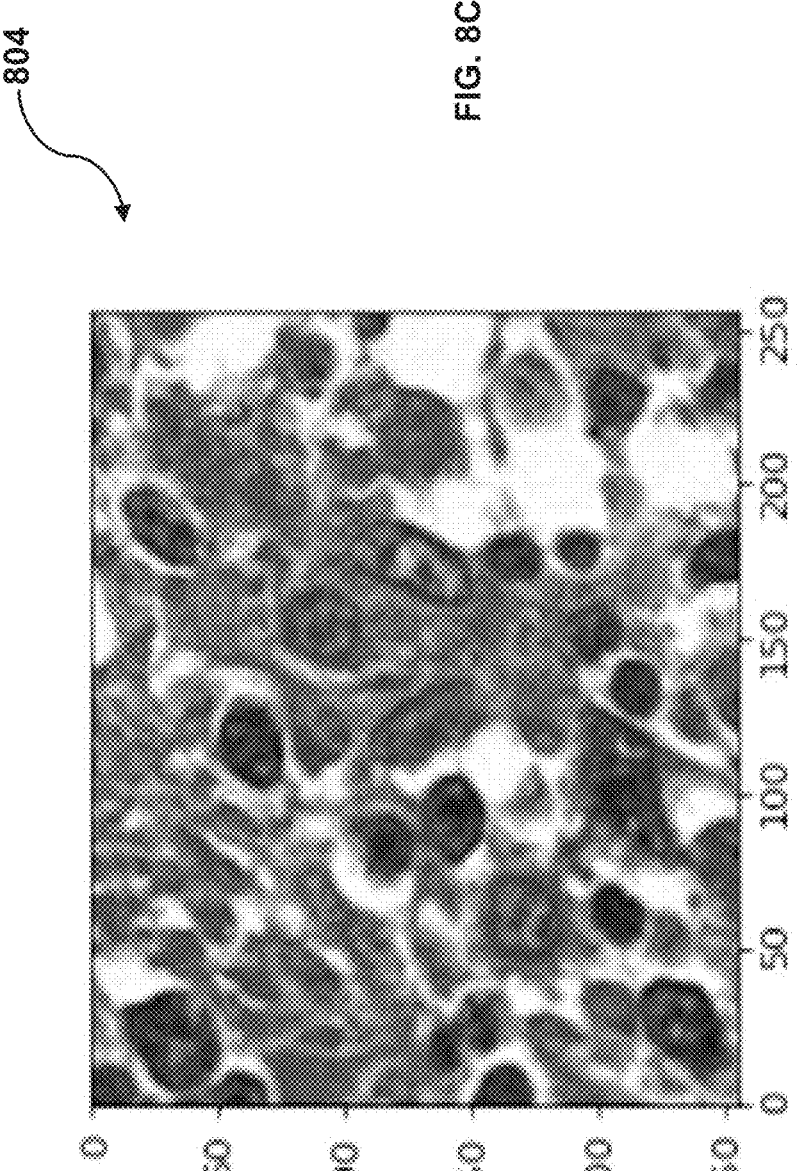
Figure 8D:
Figure 8D:
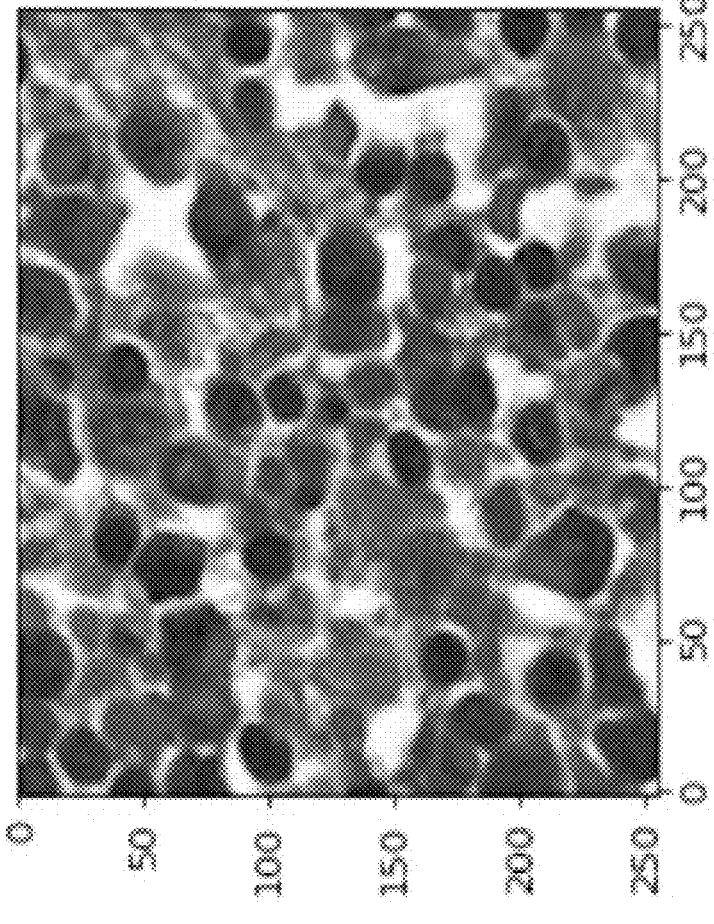
Figure 8E:
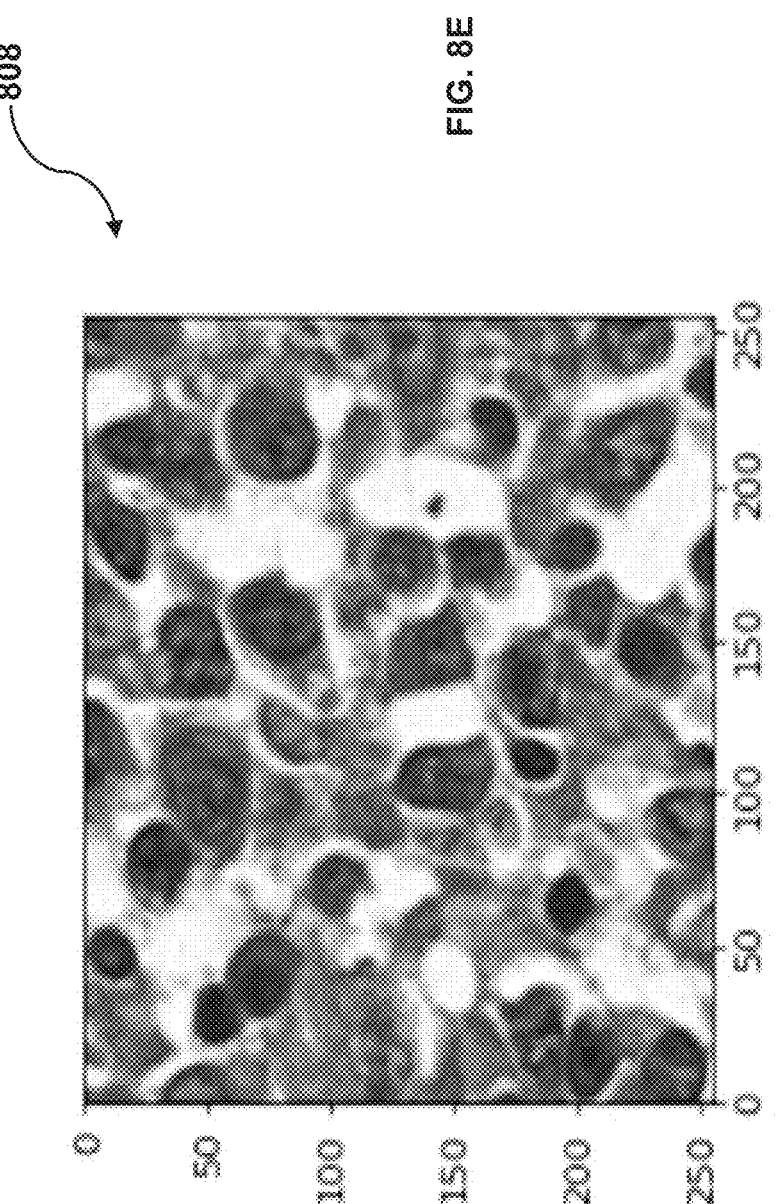
Figure 9A:
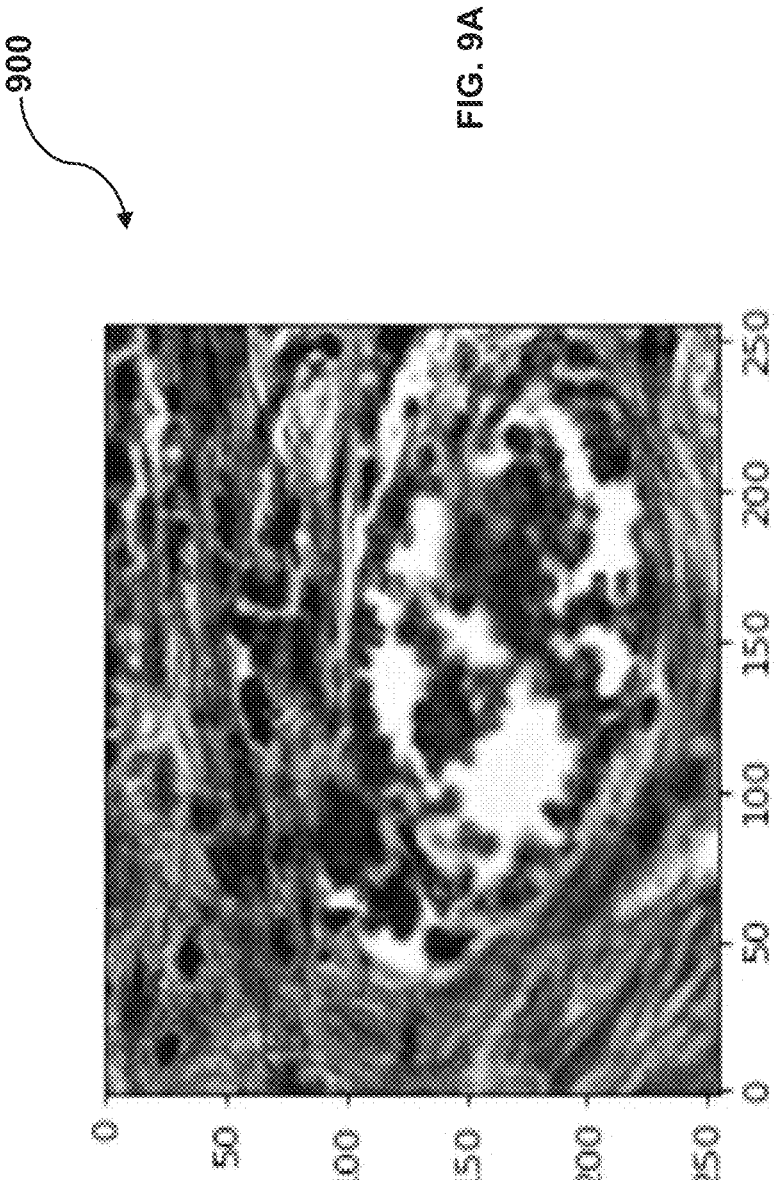
Figure 9B:
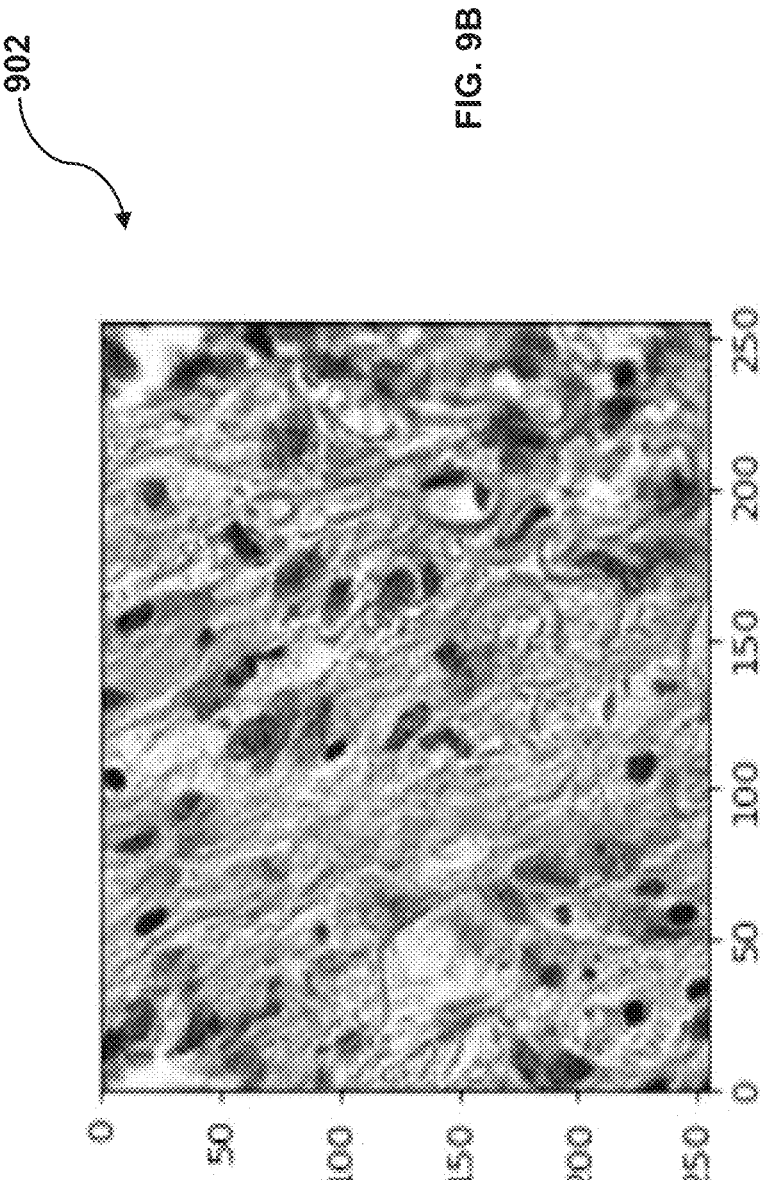
Figure 9C:
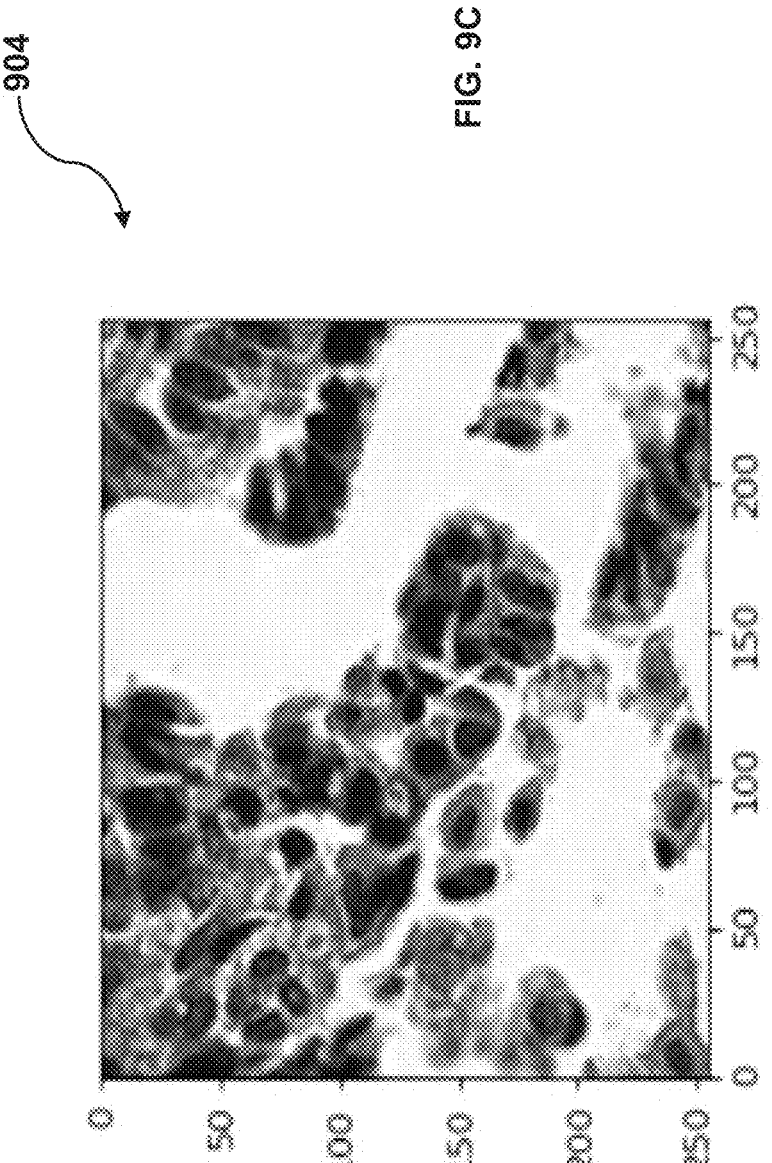
Figure 9D:
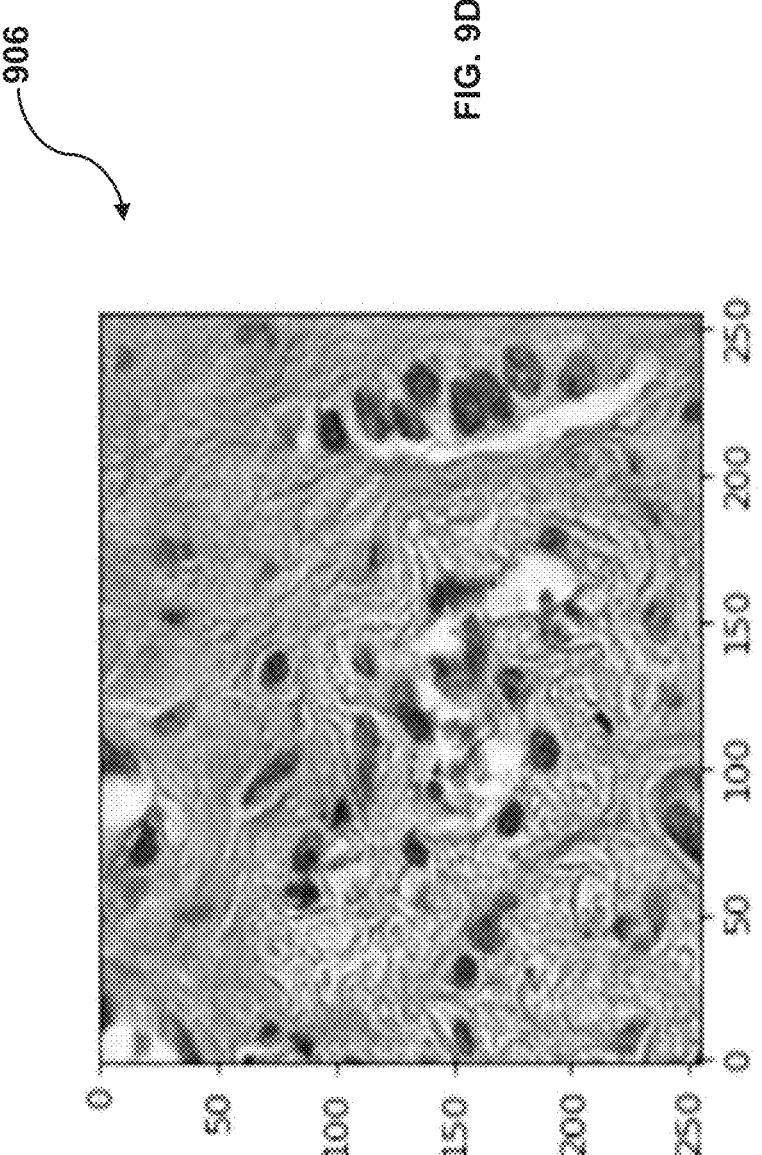
Figure 9E:
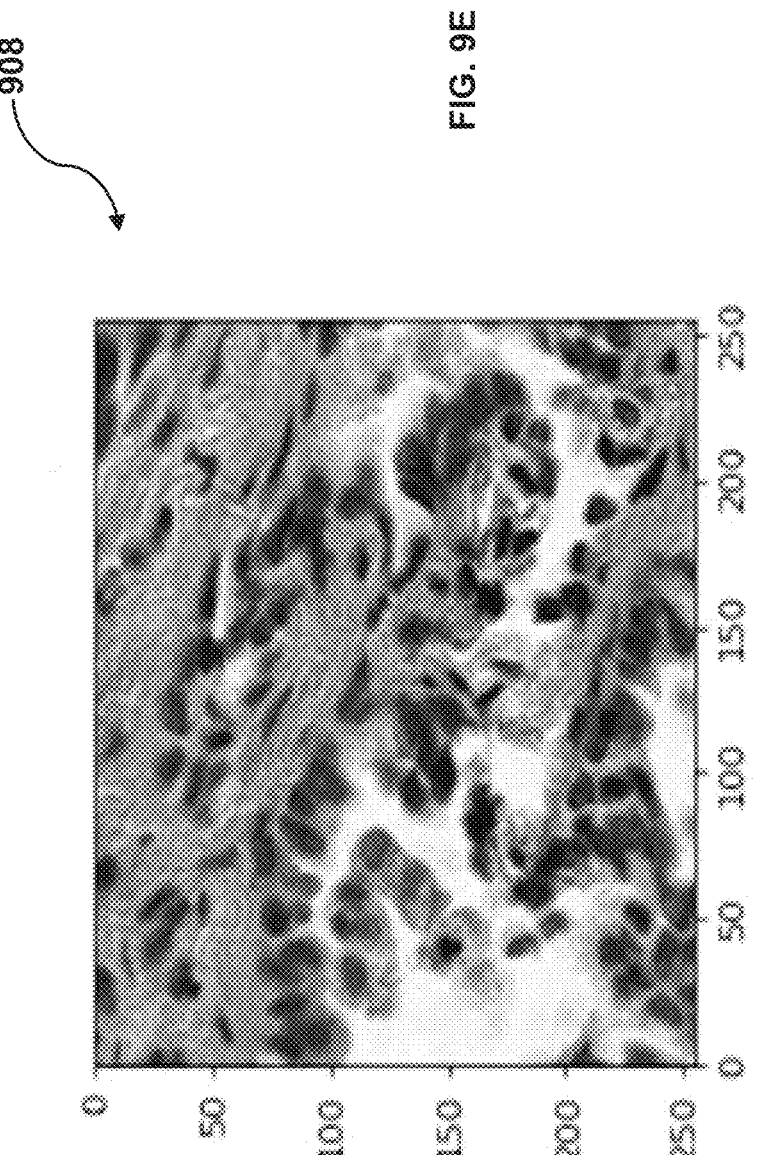
Figure 10A:
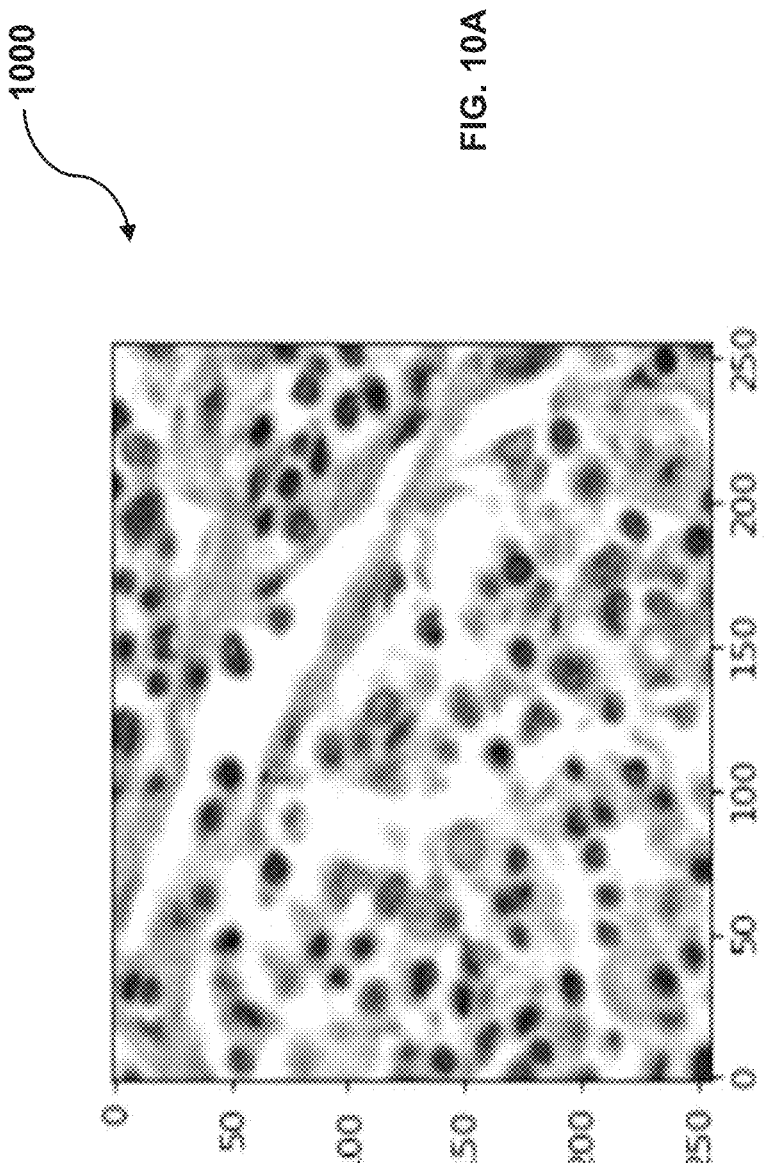
Figure 10B:
Figure 10B:
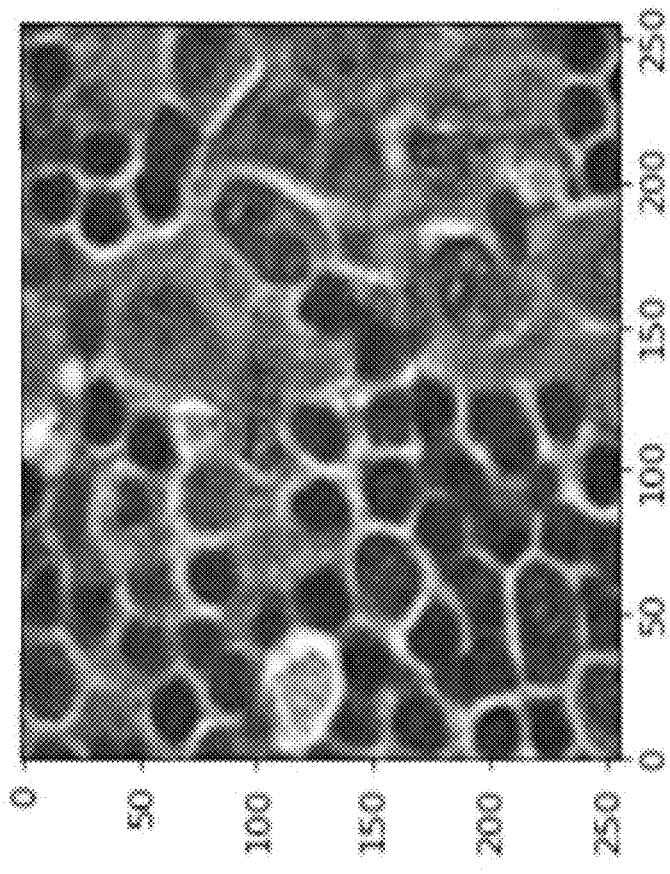
Figure 10C:
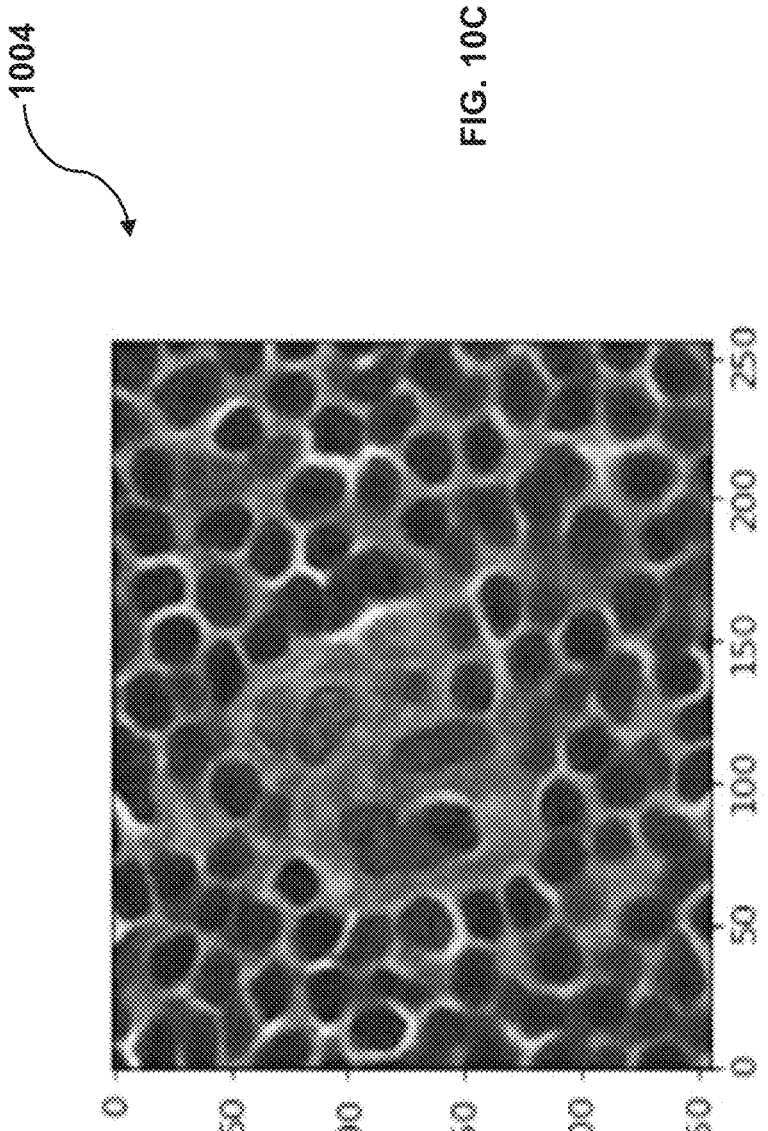
Figure 10D:
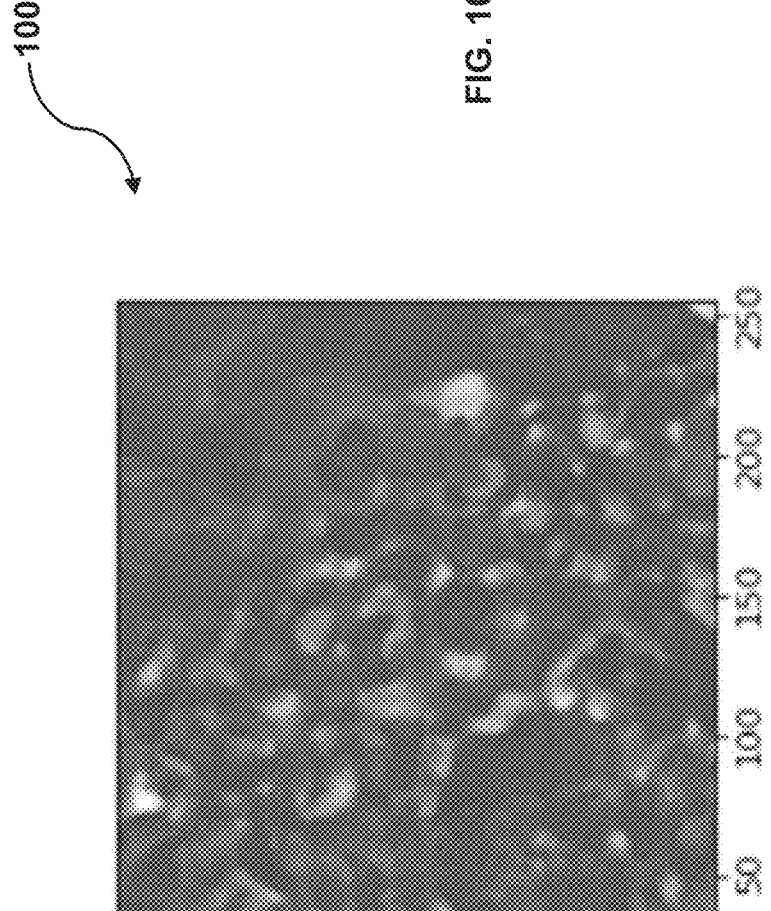
Figure 10E:
Figure 10E:
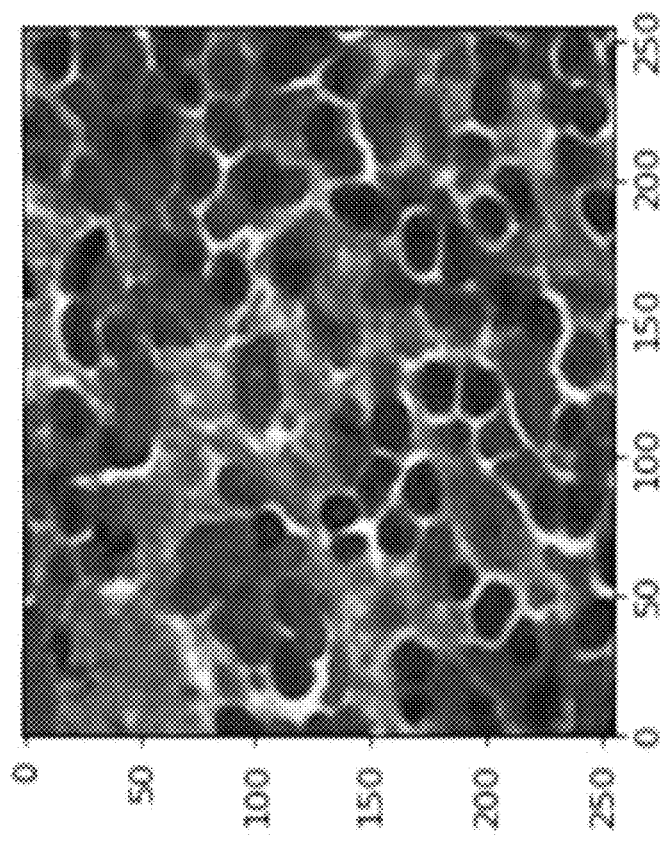
Figure 11A:
Figure 11A:
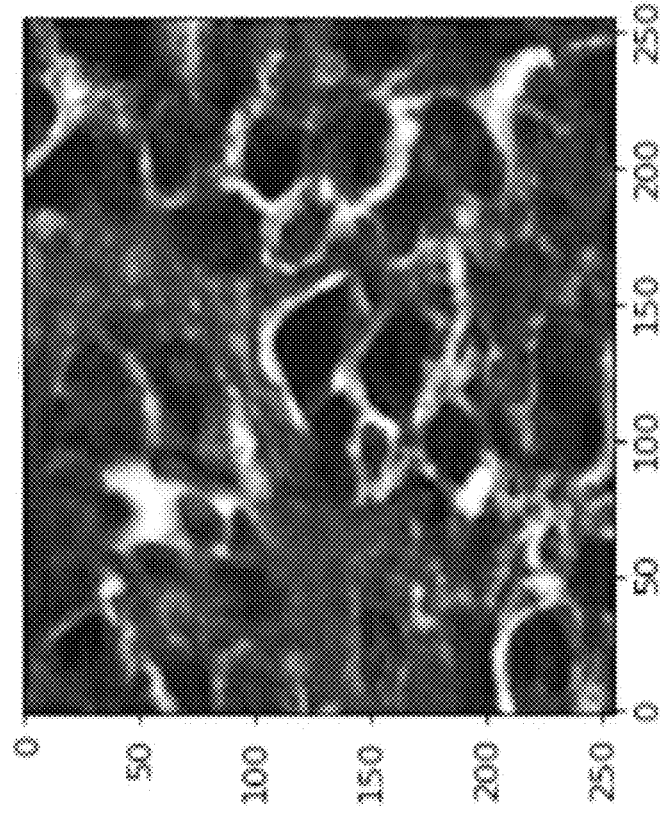
Figure 11B:
Figure 11B:
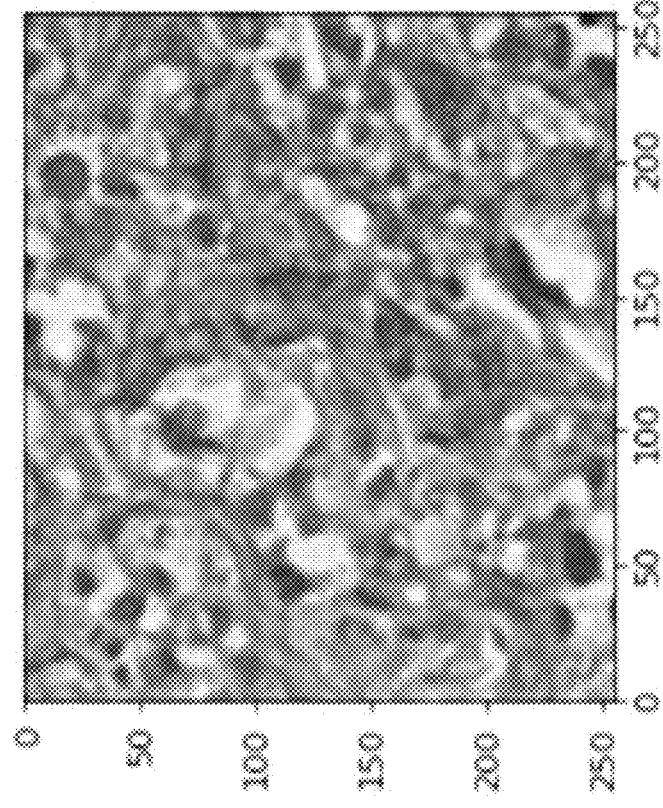
Figure 11C:
Figure 11C:
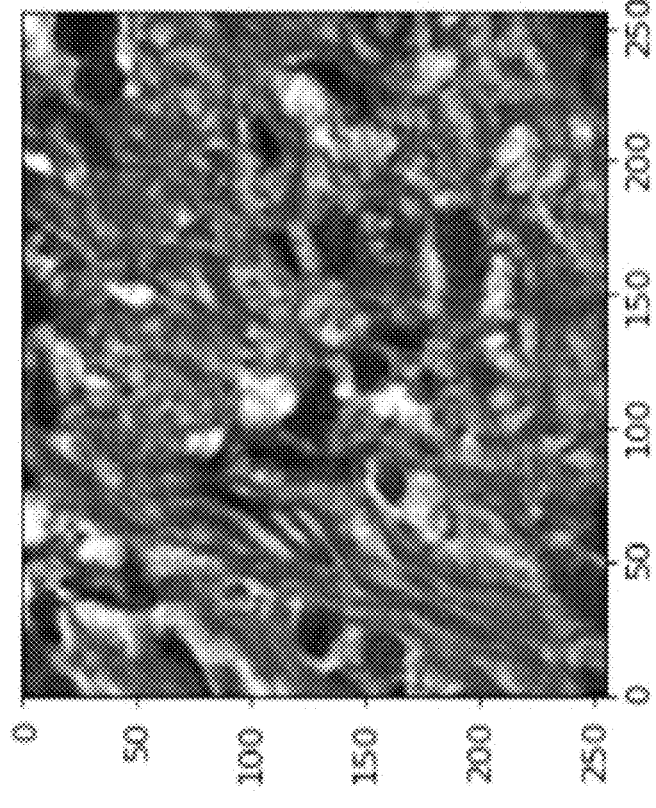
Figure 11D:
Figure 11D:
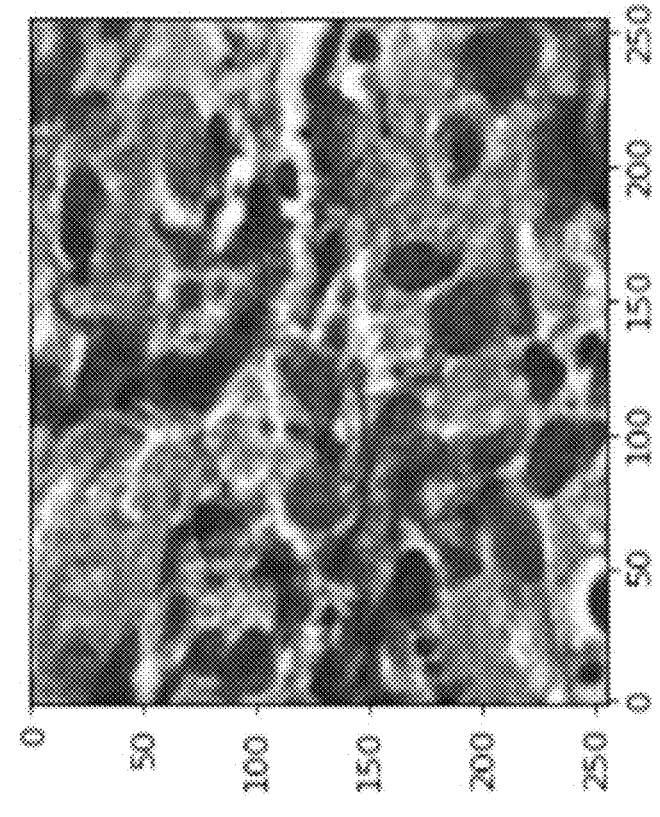
Figure 11E:
Figure 11E:
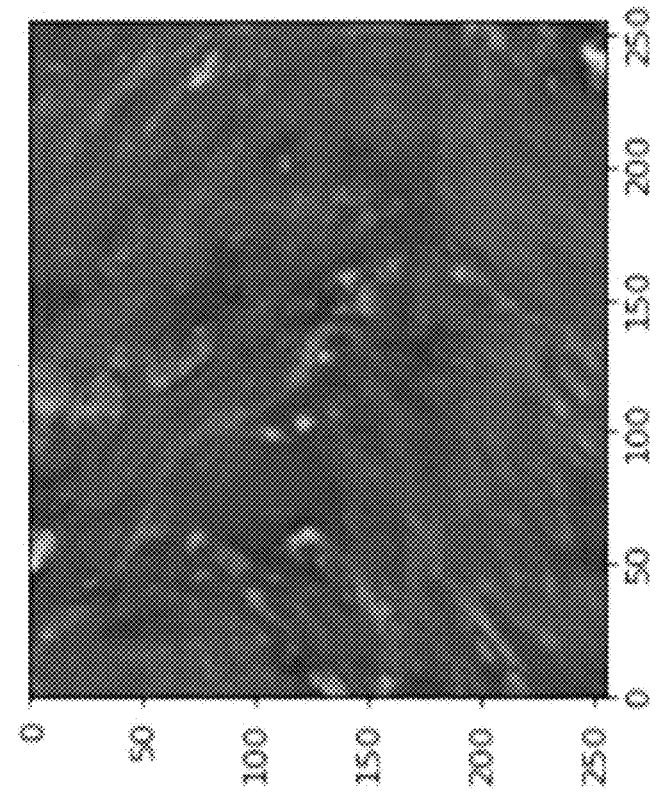

FIG. 4 illustrates an example process 400 for training a model to classify digital pathology images, in accordance with various embodiments. Process 400 may begin at operation 402. At operation 402, a plurality of whole slide images may be received. The whole slide images may depict a biological sample. An image generated by whole slide image generation system 320 may include the biological sample. For example, the image may be a digital image of a stained section of a biopsy sample. As another example, the image may be a slide image (e.g., a blood film) of a liquid sample. As yet another example, the image may be an image captured using a fluorescence microscopy, such as a slide image depicting fluorescence in situ hybridization (FISH) after a fluorescent probe has been bound to a target DNA or RNA sequence. In some embodiments, the number of WSIs received at operation 402 may be 50 or more images, 100 or more images, 200 or more images, 1,000 or more images, or other quantities. In some embodiments, the WSIs may be in an original format (e.g., 100,000×100,000 pixels) and, subsequently, may be segmented to obtain a patch of the original WSI. For example, the patch may be 512×512 pixels). In some embodiments, the WSIs that are received may already be in reduced size (e.g., 512×512 pixels).

At operation 404, each WSI may be divided into a plurality of tiles. For example, a given WSI may be segmented into tiles of size 256×256 pixels. The tiles may overlap in some cases. In some embodiments, the size of each tile may be predefined based on a type of tissue to be analyzed.

At operation 406, a random subset of tiles of the WSI may be selected. For example, for a given WSI, from the tiles produced by dividing each the WSI, a random subset of one or more tiles may be selected. In some embodiments, the random subset may include at least two tiles. The two tiles may overlap at least in part. In some embodiments, one or more augmentations may be performed initially to the selected tiles. The number of tiles randomly selected may be predefined by a user, or may be hardcoded into the computer program instructions specifying process 400. Some embodiments include selecting subsets of tiles including at least some common pixels. For example, views 222 and 224 include portions 226 and 228, respectively, which correspond to a same aspect of tile 212.

At operation 408, augmented views of each of the random subset of tiles may be generated. The augmented views may be generated by applying one or more augmentations to a given tile of the selected tiles. For example, the augmentations that may be applied to a given tile include, but are not limited to, which is not to suggest that other listings are limiting: generating a random color augmentation of the corresponding selected tile, randomly cropping the corresponding selected tile, randomly scaling the corresponding selected tile, randomly flipping the corresponding selected tile about an axis or axes (e.g., flipping along a horizontal or vertical axis), randomly rotating and translating the corresponding selected tile, generating random Gaussian blurring of the corresponding selected tile, randomly changing color to grayscale in the corresponding selected tile, or normalizing the corresponding selected tile. In some embodiments, different tiles may be augmented in different manners. For example, one tile may have a random color augmentation performed while another tile may have a random rotation performed.

At operation 410, a first convolutional neural network (CNN) may be trained. In some embodiments, the first CNN may be trained using the augmented views. In some embodiments, the first CNN may be trained using a technique that is the same or similar to the BYOL technique, however modified to use augmented views of WSIs, as detailed above.

In some embodiments, operation 408 (e.g., generating augmented views of each of the random subset of tiles) may be described using sub-operations 412 and 414. At operation 412, a first augmented view of a selected tile may be generated. As mentioned above, the first may be obtained by performing a first augmentation, or first set of augmentations, to a randomly selected tile (from the set of tiles obtained from the WSI). For example, the first augmented view may be obtained by applying a color augmentation to a first tile (e.g., as seen by augmented view 232). At operation 414, a second augmented view of the selected tile may be obtained. For example, the second augmented view may be obtained by applying a translation of the pixels in the selected tile. Image augmentation system 260 may be configured to augment some or all of the subset of tiles (e.g., tiles 258a, 258b). For example, one or more augmentations may be applied to the tiles. The augmentations that may be performed include, but are not limited to, which is not to suggest that other listings are limiting: generating a random color augmentation of the corresponding selected tile, randomly cropping the corresponding selected tile, randomly scaling the corresponding selected tile, randomly flipping the corresponding selected tile about an axis or axes (e.g., flipping along a horizontal or vertical axis), randomly rotating and translating the corresponding selected tile, generating random Gaussian blurring of the corresponding selected tile, randomly changing color to grayscale in the corresponding selected tile, or normalizing the corresponding selected tile. Image augmentation system 260 may output augmented views 262a and 262b, which may be provided to system 100 to train the model.

In some embodiments, operation 410 (e.g., training the first CNN) may be described using sub-operations 416 and 418. At operation 416, a first representation of the selected tile using the augmented view may be generated. As an example, the first representation may include an embedding of the augmented view. In some embodiments, the embedding may be an array of a predefined size (e.g., 512 elements). At operation 418, a second representation of the selected tile to be generated by a second CNN may be predicted. For example, first neural network 120 may generate the first representation and use that information to predict a second representation of the selected tile using second neural network 130. In some embodiments, some or all of process 400 may be repeated for each WSI. Process 400 may repeat, for example, until a loss function is minimized (or until a predefined number of epochs occur). In some embodiments, the model may be considered to be trained—such as when the (BYOL) loss function is minimized (which is not to suggest that further training, re-training, or resetting of the model cannot occur), upon the accuracy of the trained model being greater than or equal to a threshold accuracy score (e.g., 85% or greater, 90% or greater, 95% or greater, etc.) obtained using test data. In some embodiments, some or all of the weights and biases learned by the models may be retained for inference operations for downstream tasks. For example, after training completes, first neural network 120, information associated with encoding $f_9$ (v) may be retained, while the remaining information associated with first neural network 120 may be discarded.

FIGS. 5A-11E show examples of selected WSI patches in various phenotype categories of different datasets, in accordance with various embodiments. In particular, FIGS. 5A-11E show examples of selected WSI patches (each 256×256 pixels, at 20× magnification) in various tissue categories. For example, FIGS. 5A-5E depict WSI patches 500-508 of non-Hodgkin's lymphoma tumors, while FIGS. 6A-6E depict WSI patches 600-608 of non-Hodgkin's lymphoma tissue. As another example, FIGS. 7A-7E depict WSI patches 700-708 of non-Hodgkin's lymphoma necrosis, while FIGS. 8A-8E depict WSI patches 800-808 of non-Hodgkin's lymphoma exclusions. FIGS. 9A-9E depict WSI patches 900-908 of non-squamous non-small cell lunch cancer tumors. FIGS. 10A-10E depict WSI patches 1000-1008 of diffuse large B-cell lymphoma tumors, whereas FIGS. 11A-11E depict WSI patches 1100-1108 of diffuse large B-cell lymphoma tissue.

In some embodiments, the particular image augmentations subsequently performed on the WSI patches may be selected for the unique and specific aspects of the WSI. In one example, for H&E images, the selection of augmentations related to color and scale plays an important role in the analysis of H&E images since cells with different sizes and colors may have different biological meanings.

Figure 12A:
FIGS. 12A-13D show examples of image augmentations specifically designed for digital pathology, in accordance with various embodiments.
Figure 12A:
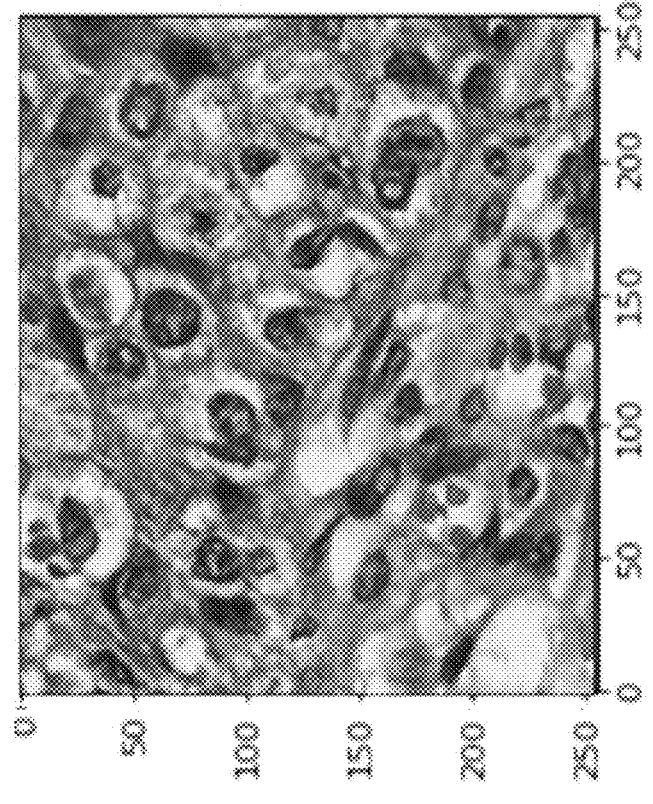
Figure 12B:
Figure 12B:
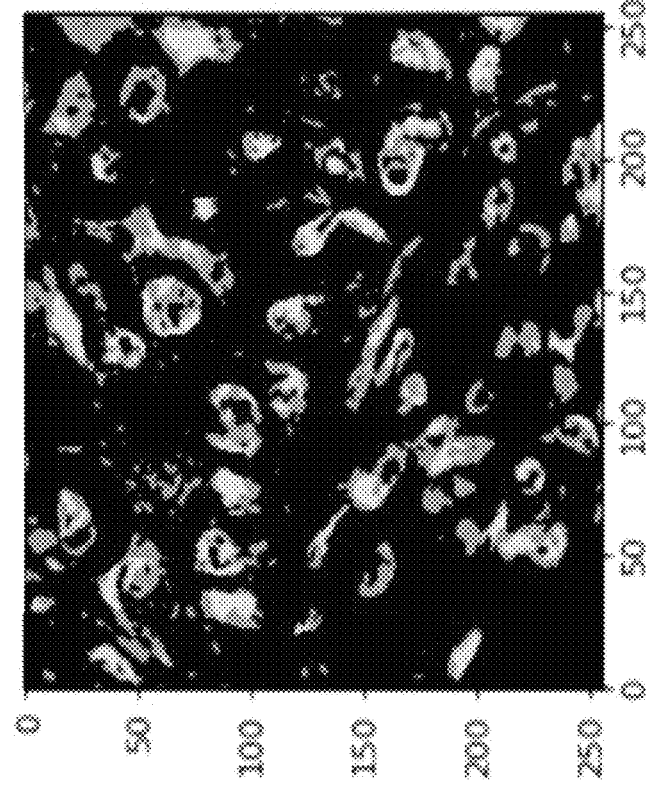
Figure 12C:
Figure 12C:
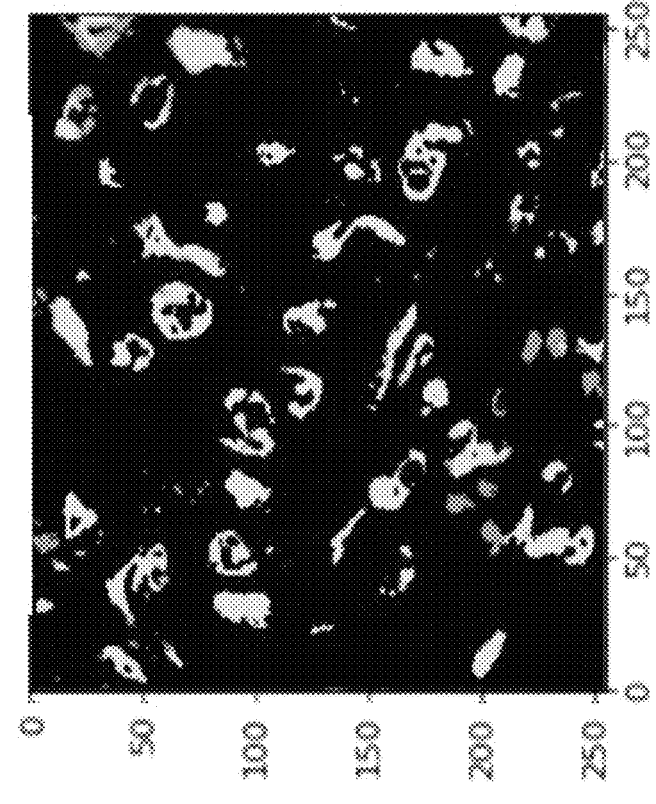
Figure 12D:
Figure 12D:
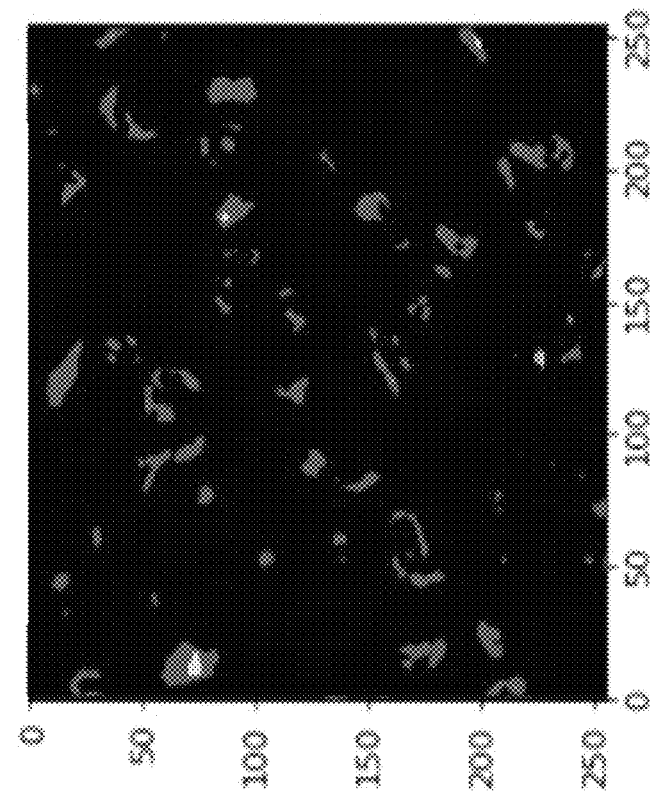
Figure 12E:
Figure 12E:
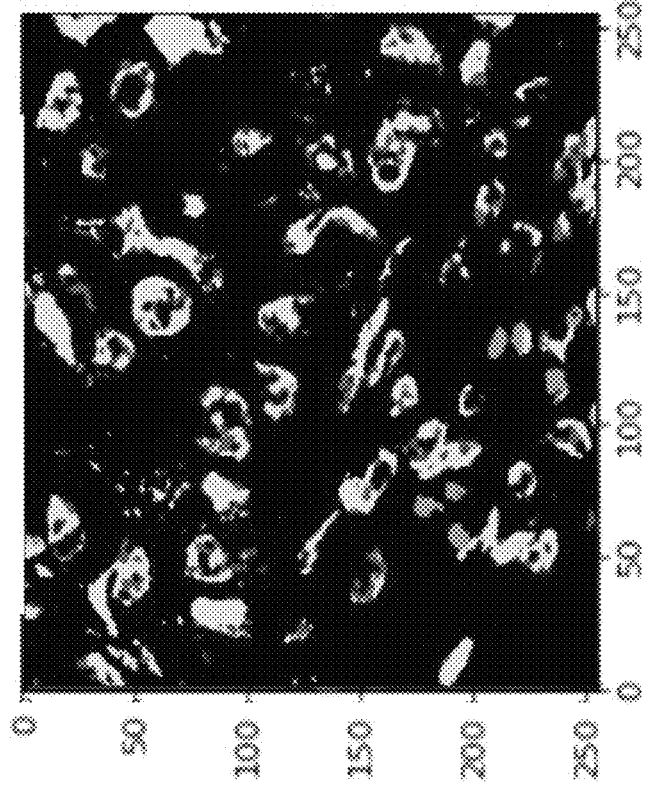
Figure 12F:
Figure 12F:
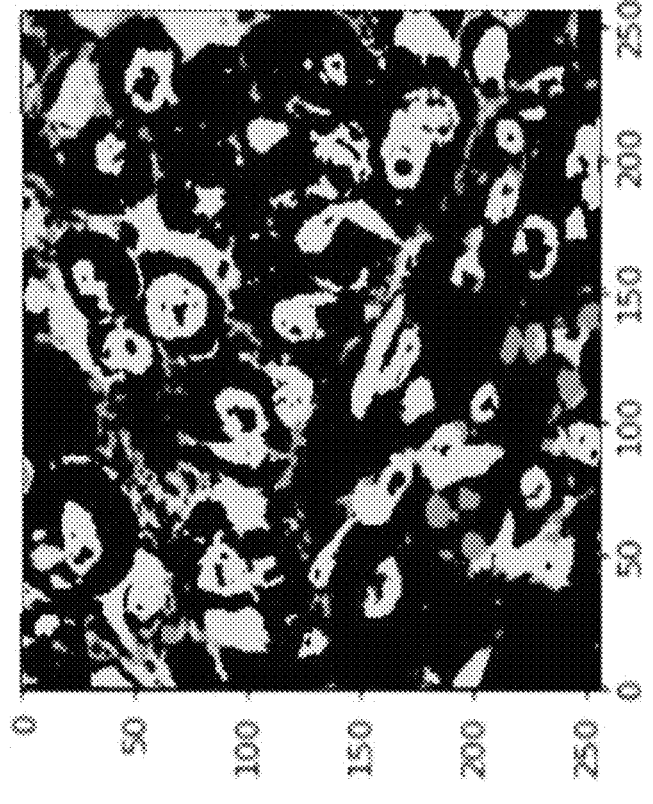
Figure 12G:
Figure 12G:
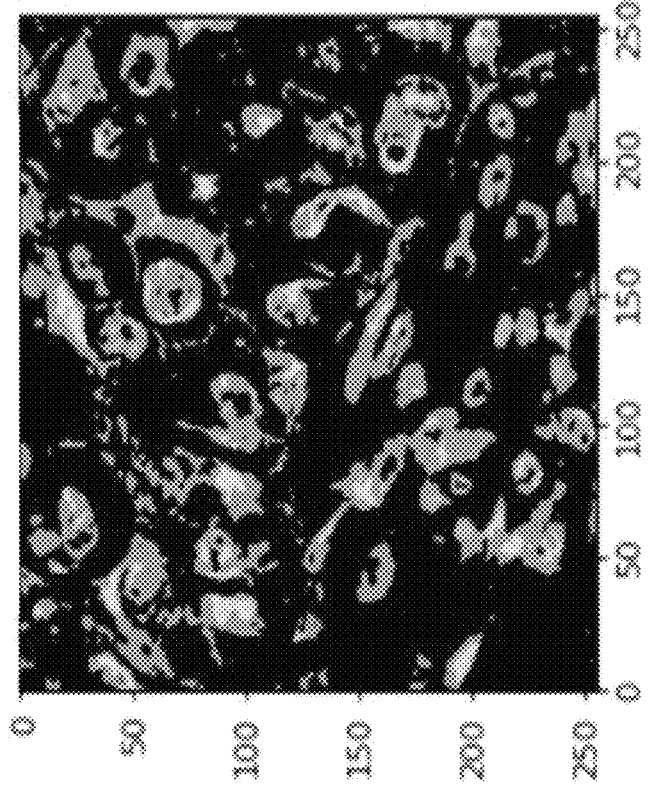
Figure 12H:
Figure 12H:
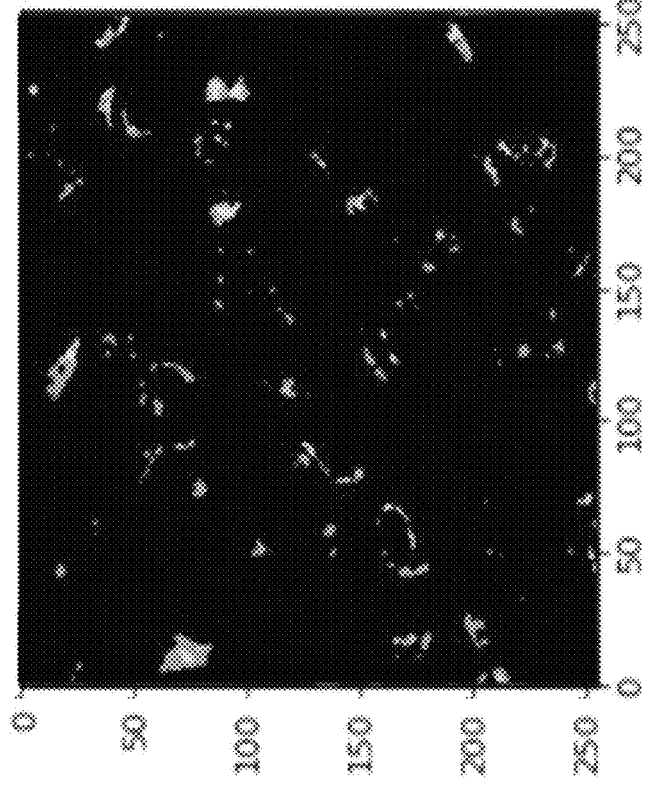
Figure 12I:
Figure 12I:
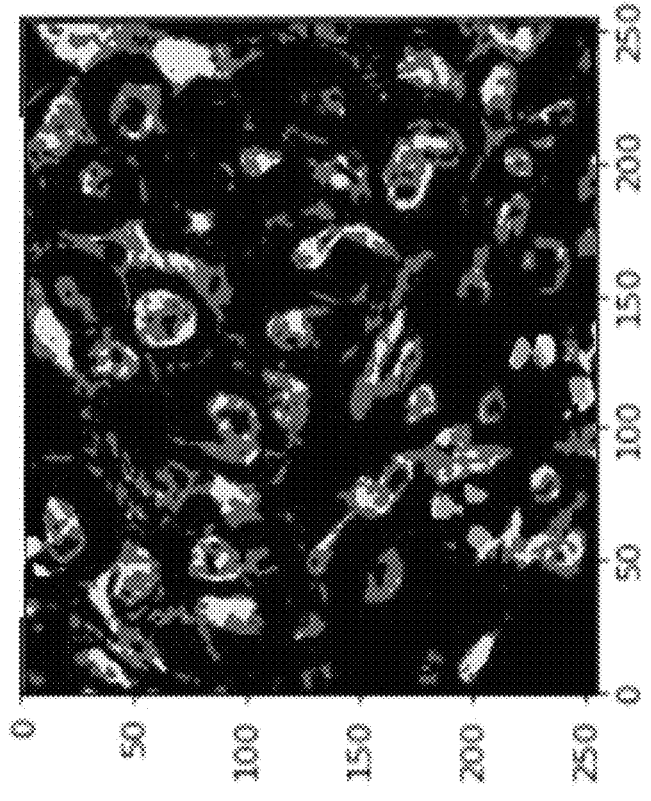
Figure 12J:
Figure 12J:
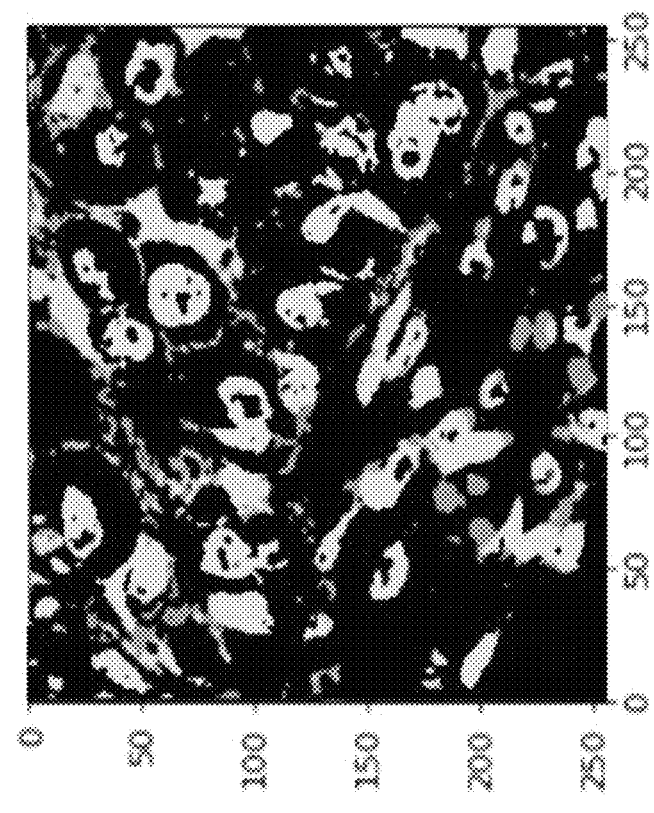
Figure 12K:
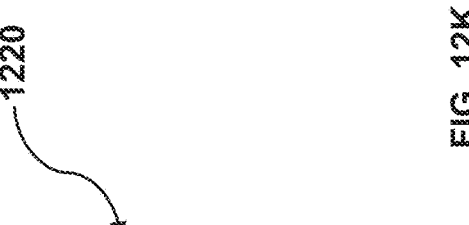
Figure 12K:
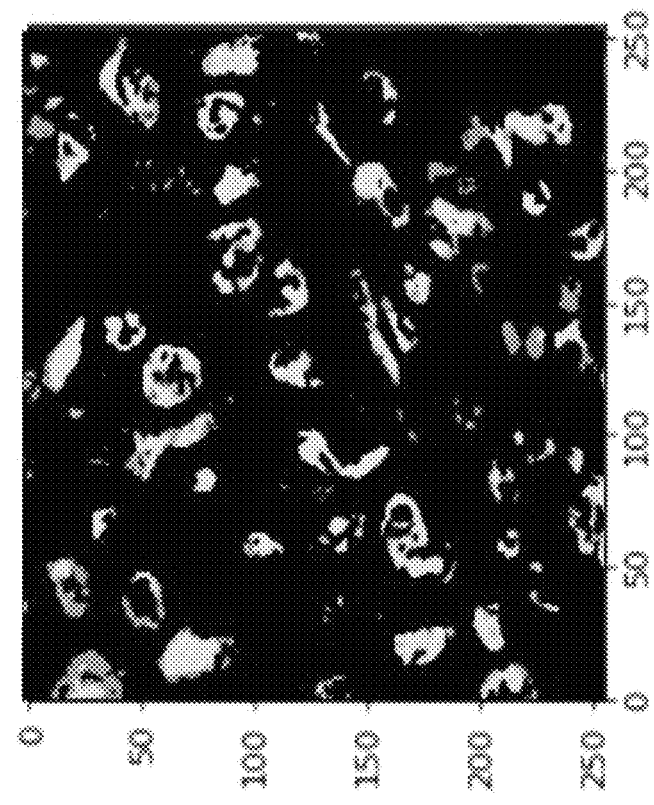
Figure 12L:
Figure 12L:
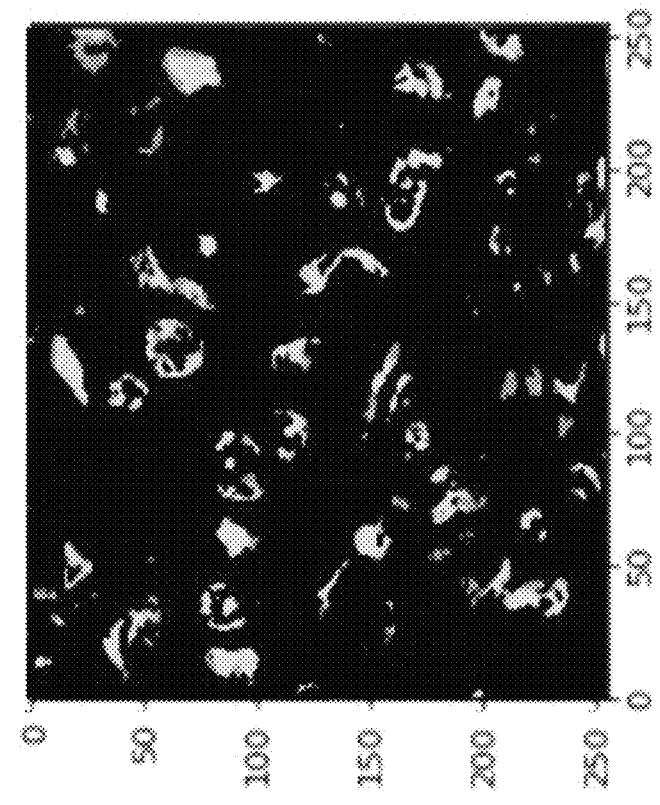
Figure 12M:
Figure 12M:
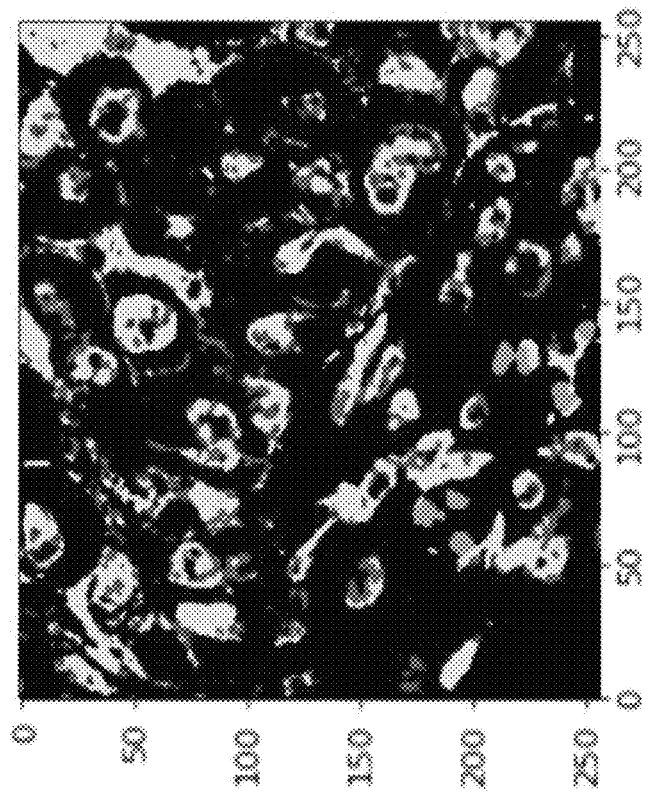
Figure 12N:
Figure 12N:
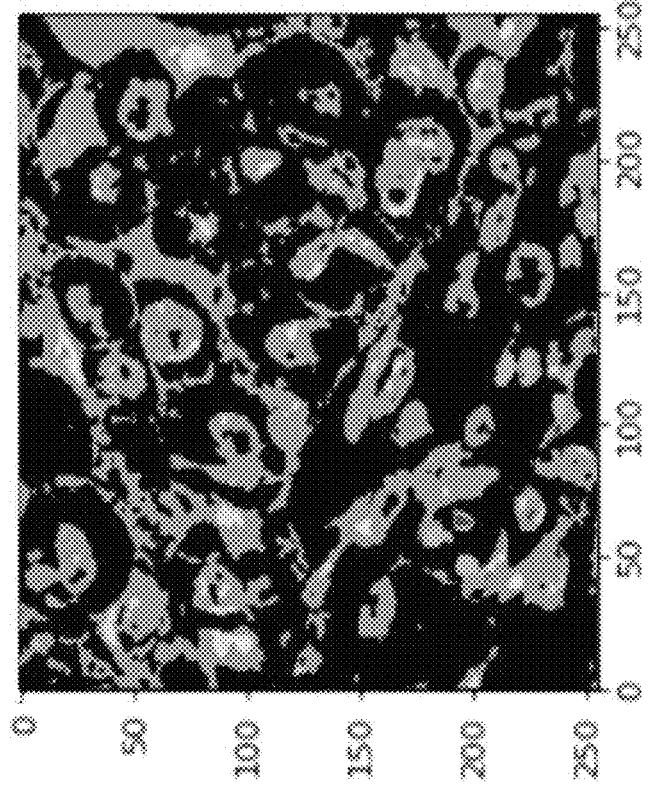
Figure 12O:
Figure 12O:
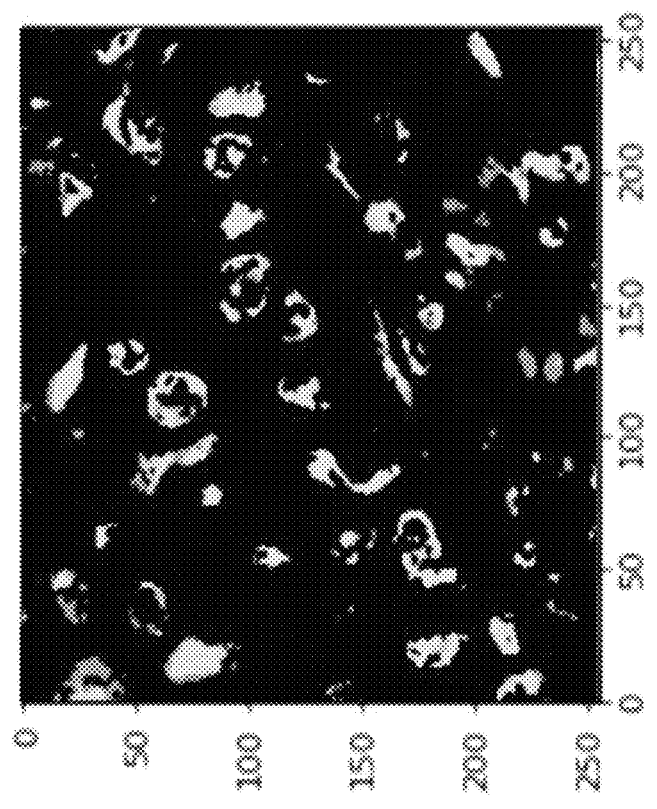
Figure 12P:
Figure 12P:
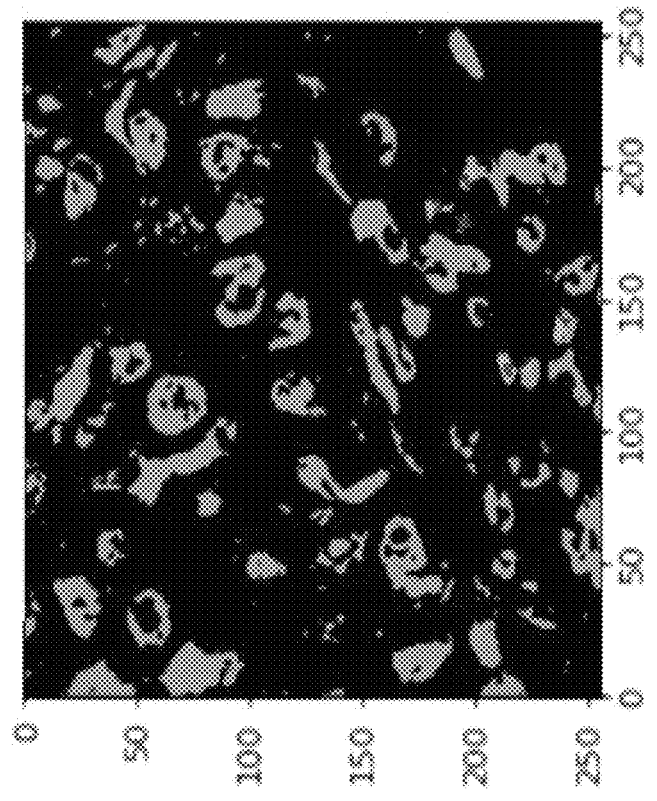
Figure 12Q:
Figure 12Q:
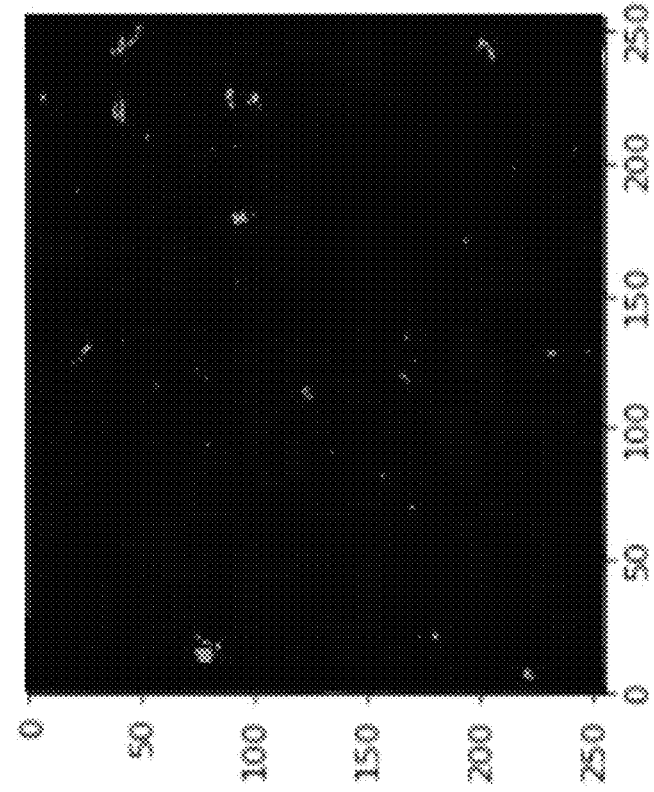
Figure 12R:
Figure 12R:
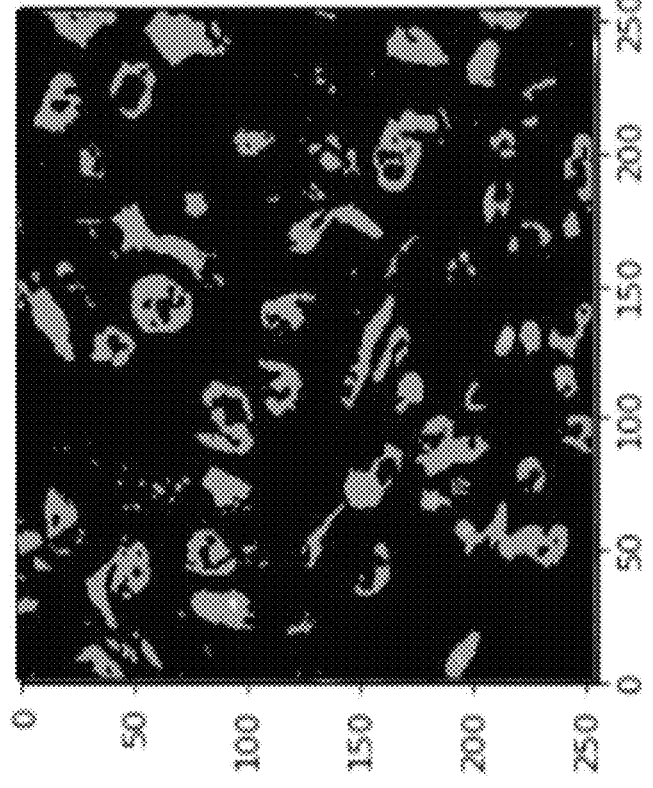
Figure 12S:
Figure 12S:
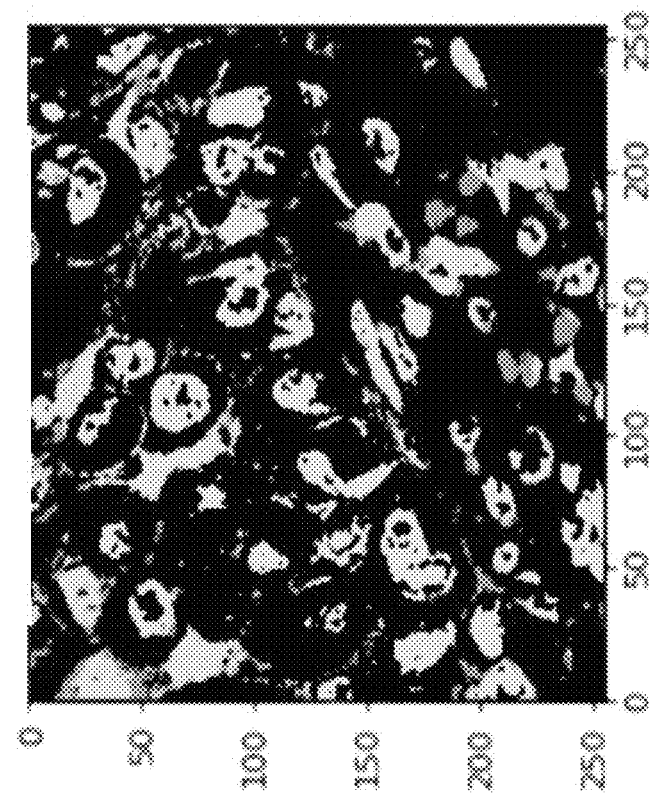
Figure 12T:
Figure 12T:
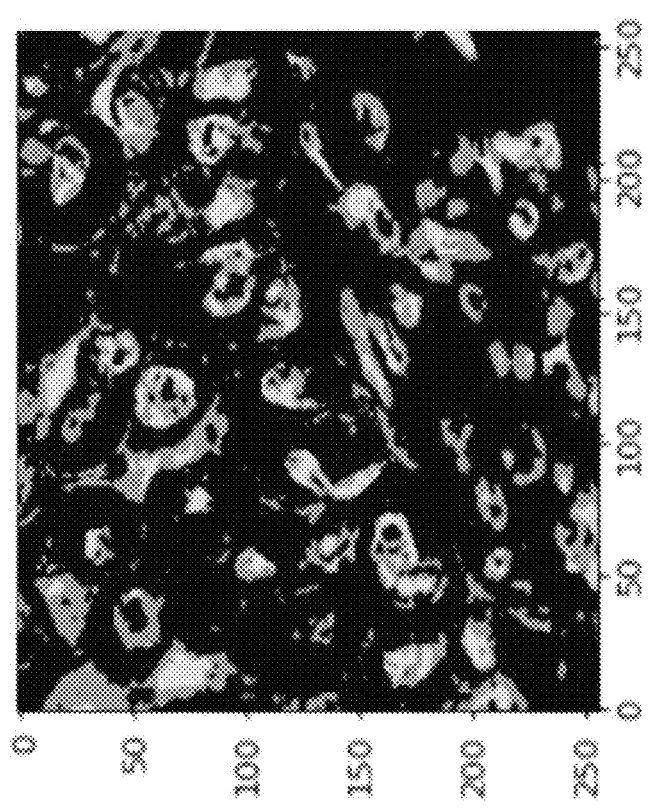
Figure 12U:
Figure 12U:
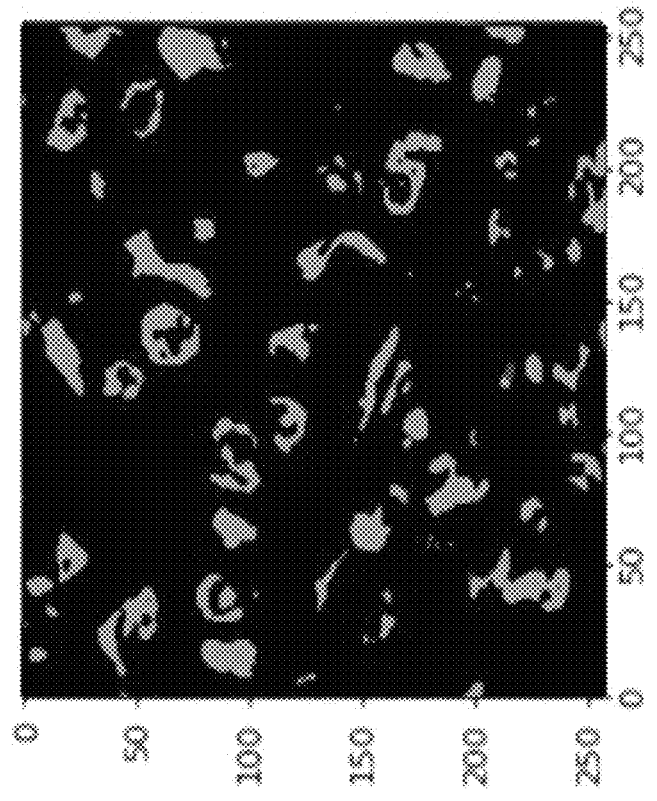
Figure 12V:
Figure 12V:
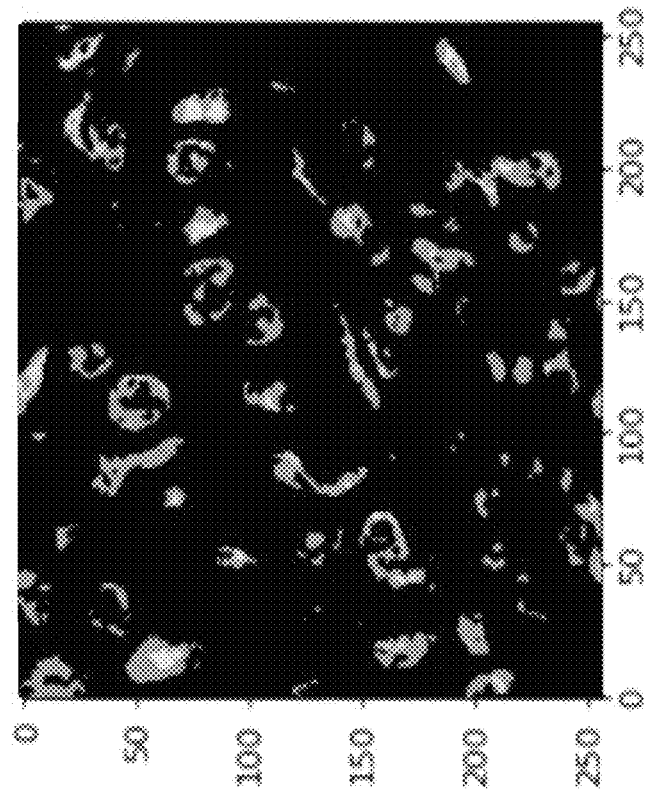
Figure 12W:
Figure 12W:
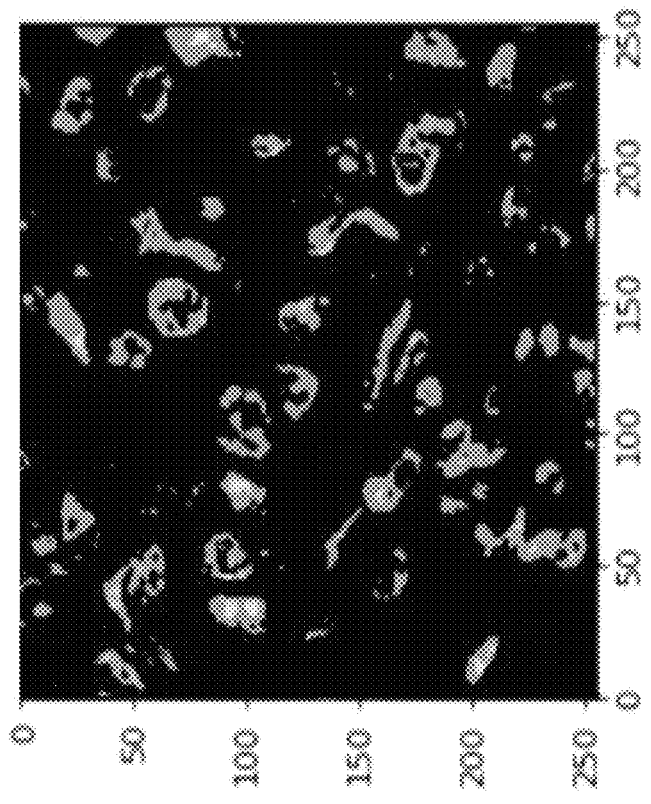
Figure 12X:
Figure 12X:
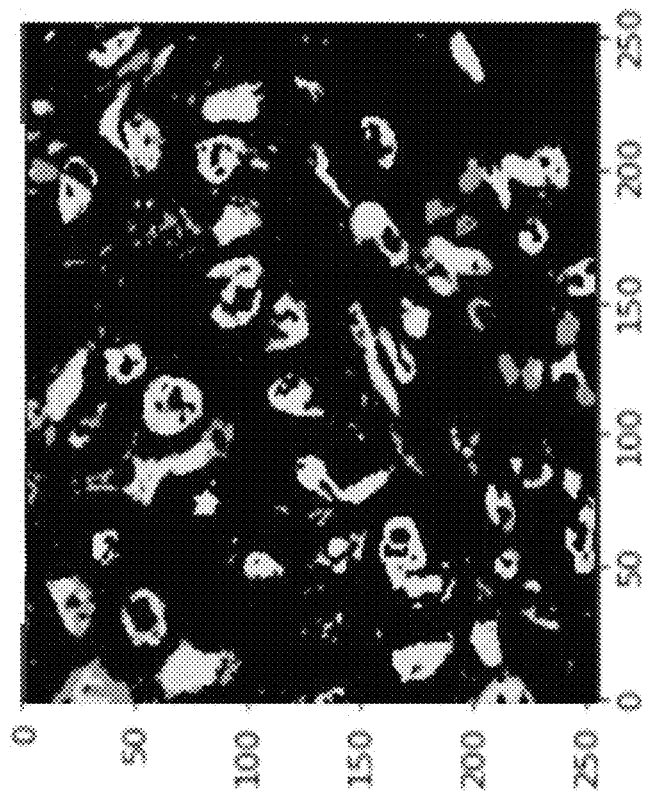
Figure 12Y:
Figure 12Y:
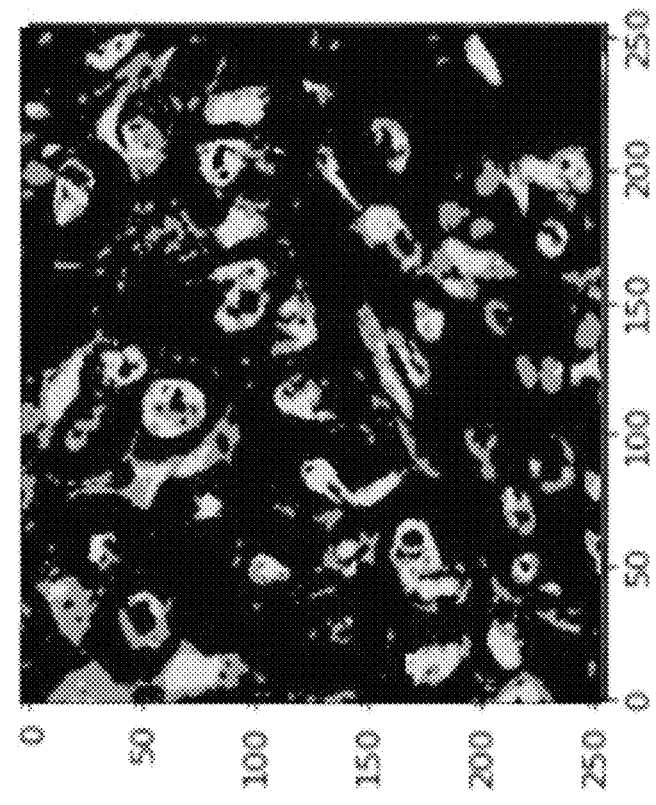
Figure 13A:
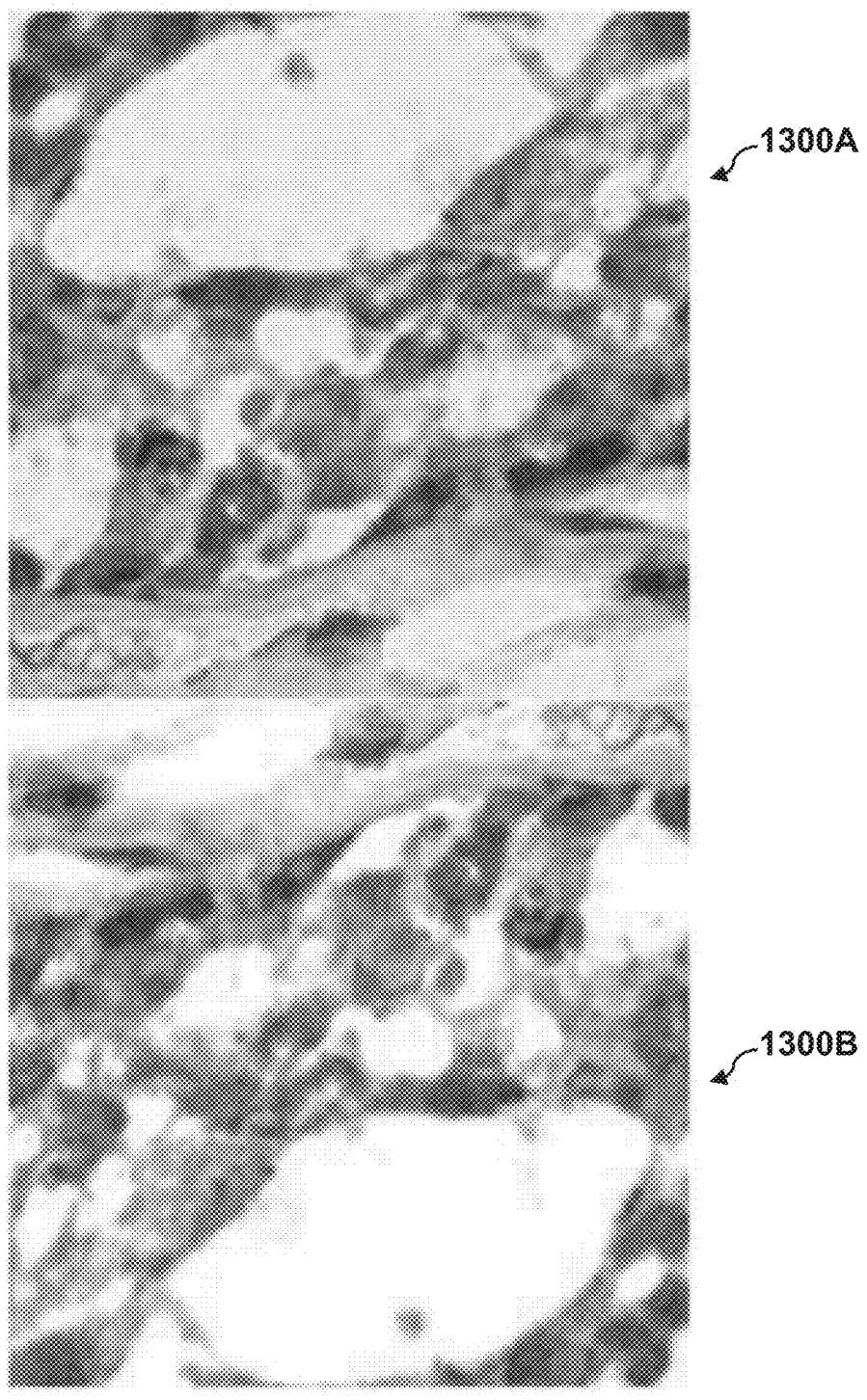
Figure 13B:
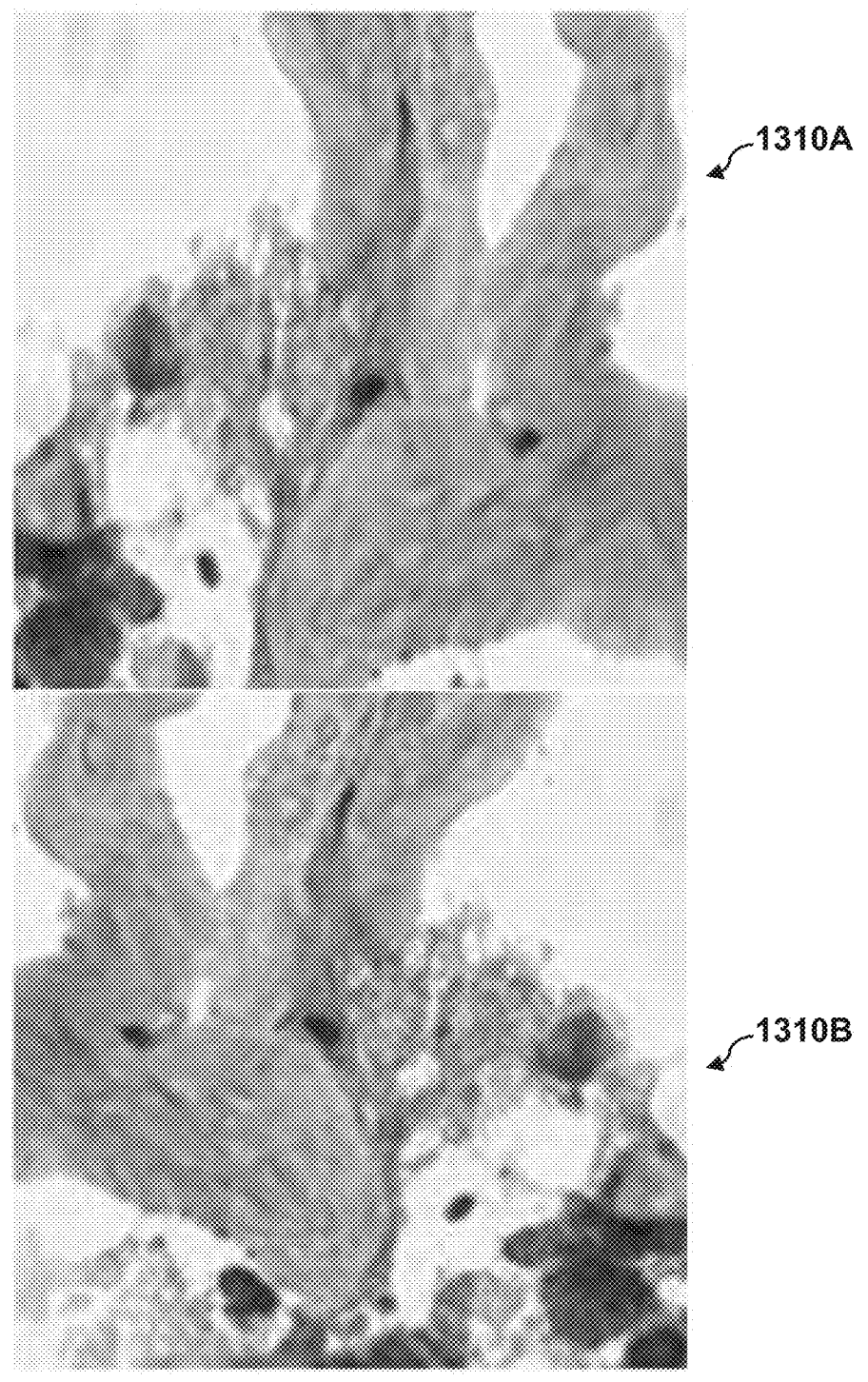
Figure 13C:
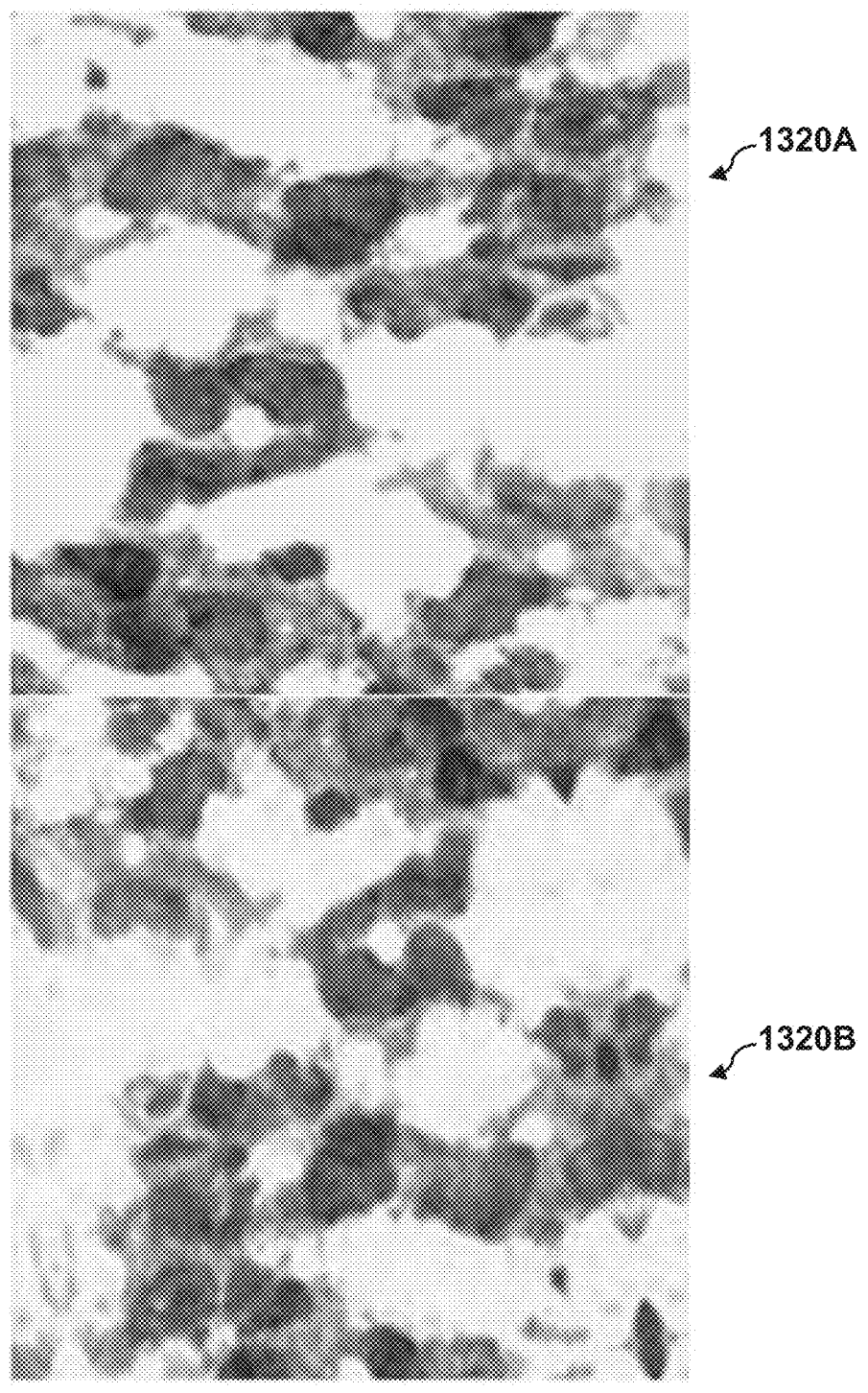
Figure 13D:
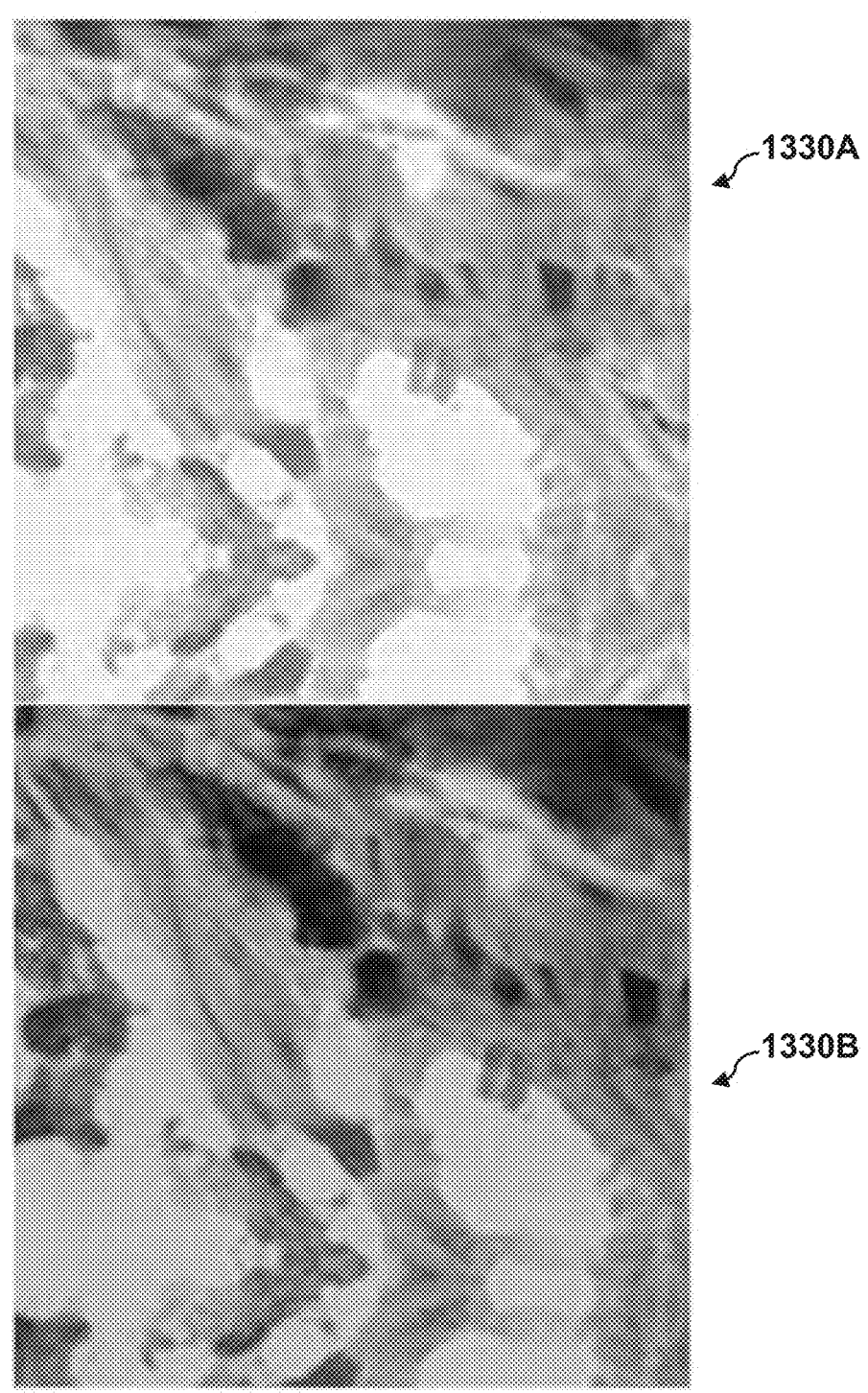

FIGS. 12A-13D show examples of image augmentations specifically designed for digital pathology, in accordance with various embodiments. For instance, FIG. 12A illustrates an example WSI patch 1200. FIGS. 12B-12Y show examples of different augmentations of WSI patch 1200. For instance, WSI patches 1202-1248 represent augmented views of WSI patch 1200 obtained by applying one or more augmentations to WSI patch 1200 (e.g., modifying color, rotating, flipping, scaling, etc.). Moreover, in FIGS. 13A-13D, each of columns 1300-1330 represents augmented views of a unique tile generated for training (normalization is excluded in this figure for visualization purposes). For example, column 1300 of FIG. 13A depicts an augmented view 1300A of WSI patch 1300B. In particular, augmented view 1300A may be obtained by flipping WSI patch 1300B along a horizontal axis. Column 1310 of FIG. 13B depicts an augmented view 1310A of WSI patch 1310B. Augmented view 1310A may be obtained by applying a grayscale augmentation to WSI patch 1310B. Column 1320 of FIG. 13C depicts an augmented view 1320A of a WSI patch 1320B. Augmented view 1320A may be obtained by applying a color augmentation to pixels of WSI patch 1320B. Column 1330 of FIG. 13D depicts an augmented view 1330A of a WSI patch 1330B. Augmented view 1330A may be obtained, for example, by applying a grayscale augmentation to WSI patch 1330B.

The augmentations applied during training may include, but are not limited to, which is not to suggest that other listings are limiting:

Limited random color augmentations (to preserve the color information);

Limited random cropping and scaling (to preserve the scale information);

Random horizontal and vertical flipping;

Random rotation and translation;

Random Gaussian blurring;

Random change of the color to grayscale (to enforce learning color-invariant contextual features);

Normalization.

Examples of various H&E image data sets and the associated number of tiles that may be generated from WSI in those data sets is shown below in Table 1.

TABLE 1

| Tissue type | Datasets | Number of tiles |
| --- | --- | --- |
| Lung | TCGA_LUAD | 150,000 |
| Thyroid | TCGA_THCA | 150,000 |
| Breast | TCGA_BRAC | 150,000 |
| Kidney | TCGA_KIRC | 150,000 |
| DLBCL | TCGA_DLBCL | 100,000 |
| DLBCL | Private set | 200,000 |
| Lymph node | Private set | 200,000 |
| Tonsil | Private set | 150,000 |
| Follicular lymphoma | Private set | 150,000 |

Figure 14:
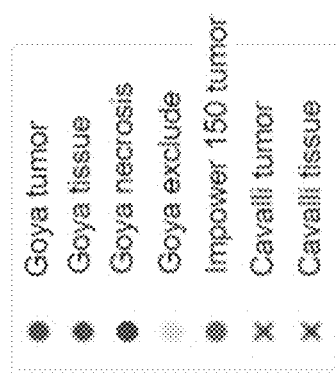
FIG. 14 illustrates a tSNE plot of embeddings for the patches similar to the ones in FIGS. 5A-11E, in accordance with various embodiments.
Figure 14:
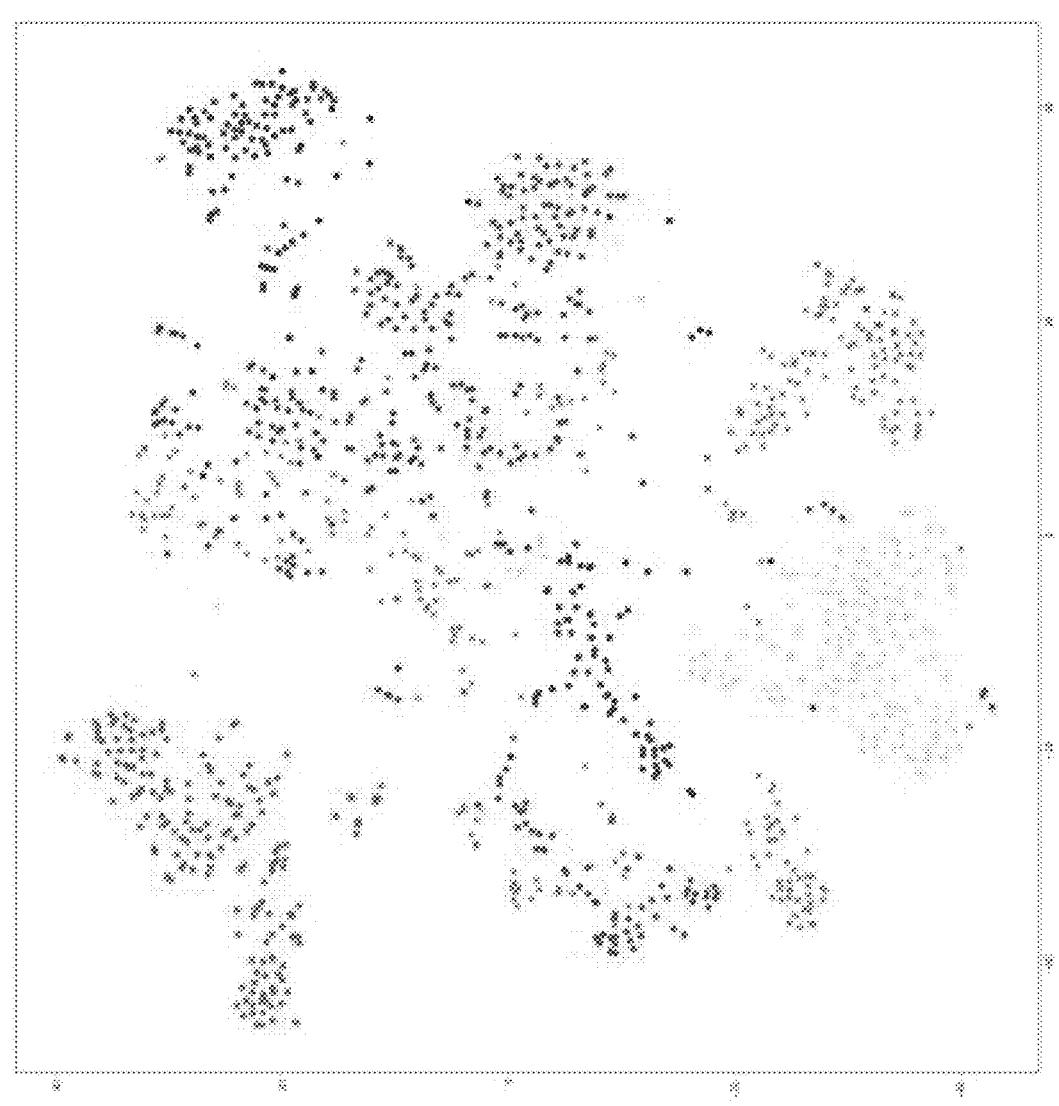

The high level of performance of one example H&E-trained feature extraction network (e.g., PathNet) can be illustrated by projecting the image representation for each tile (e.g., an embedding of the tile represented as an array of 512 numbers, each representing a feature of the tile) to two-dimensional space (i.e., as a t-distributed stochastic neighbor embedding (tSNE) plot). FIG. 14 illustrates a tSNE plot 1400 of embeddings for patches similar to the ones in FIGS. 5A-11E, in accordance with various embodiments. In tSNE plot 1400, image representations generated for tiles corresponding to various tissue categories, such as those depicted in FIGS. 5A-5D, is illustrated. A different colored marker is used to identify data points in the plot corresponding to each of the tissue categories. For example, non-Hodgkin's lymphoma tumors are represented by "red" dots, while non-Hodgkin's lymphoma is represented by "green" dots. As seen from tSNE plot 100, tiles in each category cluster together. This illustrates the effectiveness of the descriptor, since two tiles of the same category should have more similar descriptors than tiles of different categories.

Figure 15B:
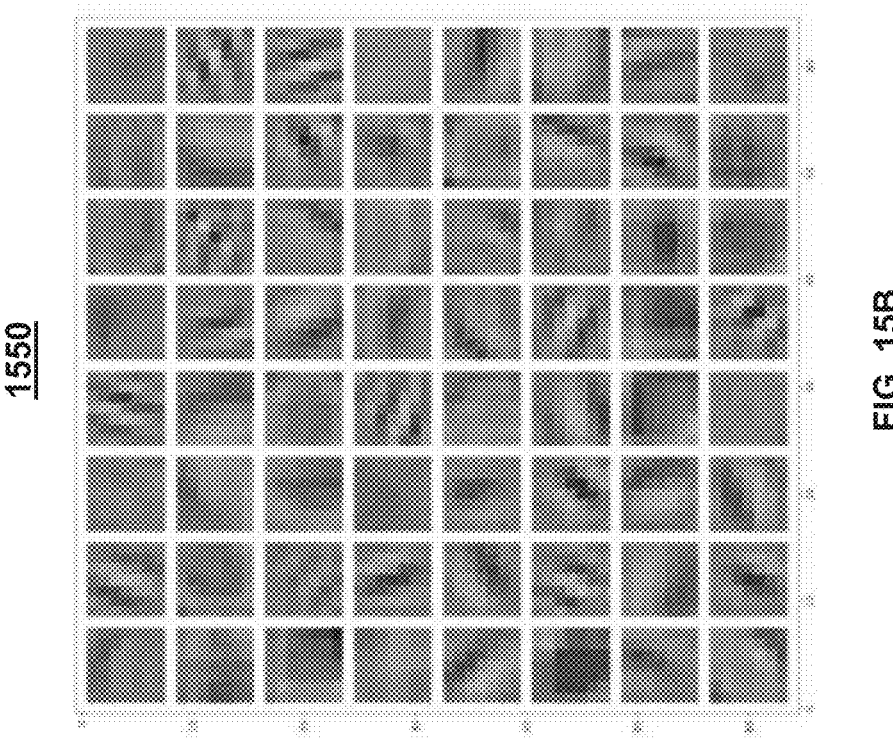
FIGS. 15A-15B illustrate a comparison between weights of the first convolutional layer of an example CNN initially trained on generic natural images and weights of the first convolutional layer of an example CNN initially trained on digital pathology images, in accordance with various embodiments.
Figure 15A:
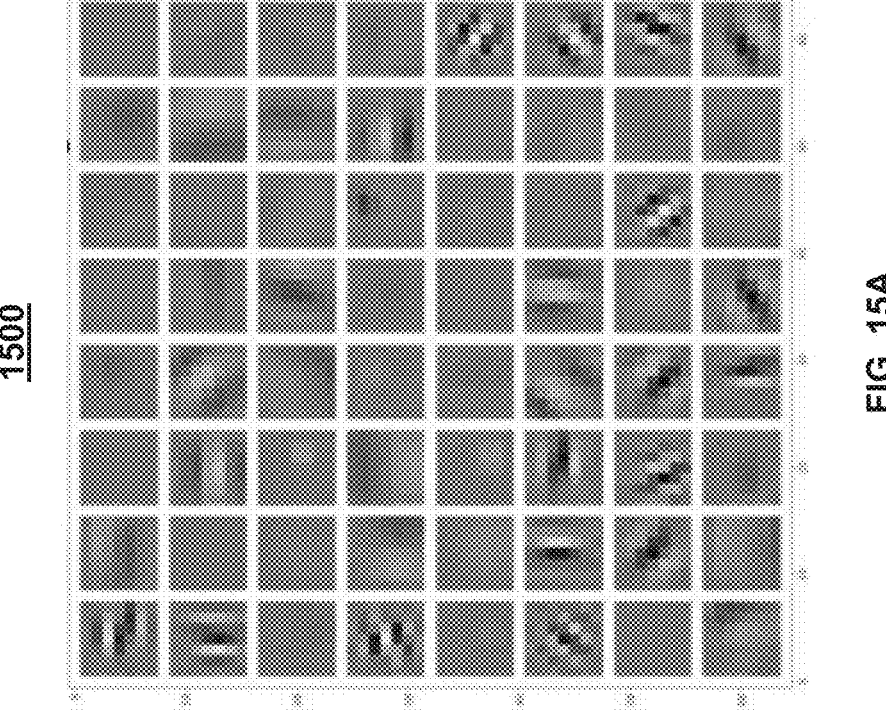

FIGS. 15A-15B illustrate a comparison between the weights of the first convolutional layer of an example CNN initially trained on generic natural images and the weights of the first convolutional layer of an example CNN initially trained on digital pathology images, in accordance with various embodiments. For instance, in FIG. 15A, plot 1500 illustrates the weights of a first convolutional layer of ResNet 18, a CNN initially trained on generic natural images from the ImageNet dataset. In FIG. 15B, plot 1550 illustrates the weights of a first convolutional layer of PathNet, a CNN initially trained in H&E images. The tiles are extracted from WSIs at 20× magnification (0.5 µm/pixel). As seen from FIGS. 15A and 15B, the features learnt on the natural images (as seen by plot 1500) are not necessarily the optimum ones for H&E images (as seen by plot 1550). The descriptors learnt with the CNN initially trained on digital pathology images (e.g., PathNet) are optimized to characterize the existing phenotypes in WSIs at specific magnification level, scale, and color distributions.

Figure 16C:
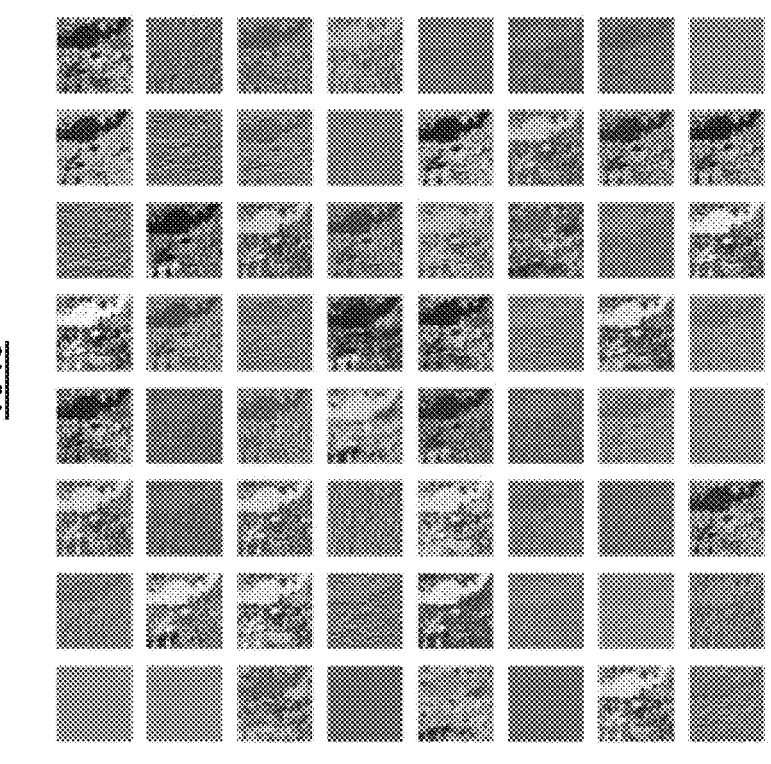
Figure 16B:
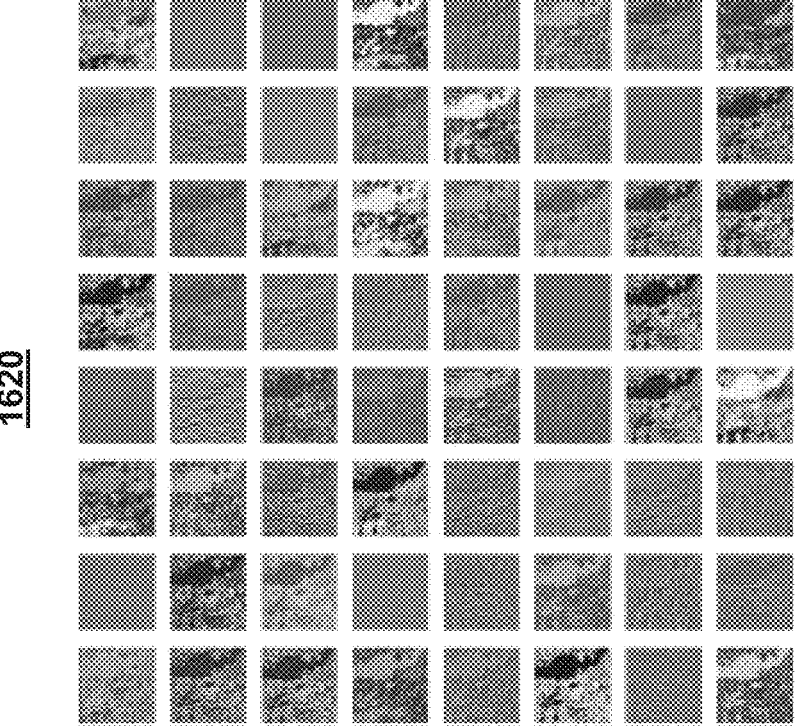

FIGS. 16A-16C illustrate an example input tile and a comparison between the outputs of the first convolutional layer of an example CNN initially trained on generic natural images and the outputs of the first convolutional layer of an example CNN initially trained on digital pathology images, in accordance with various embodiments. FIG. 16A illustrates an example input tile 1600. As an example, input tile 1600 may be taken from an H&E WSI. FIGS. 16B and 16C illustrate a plot 1620 describing the output of the first convolutional layer of the example CNN initially trained on generic natural images (e.g., ResNet18) and a plot 1640 describing the output of the first convolutional layer of the example CNN initially trained on digital pathology images (e.g., PathNet), respectively. As seen from plots 1620 and 1640, the outputs from the first convolutional layer of the two CNNs (e.g., PathNet and ResNet) differ. This is due to the first convolutional layer of the two CNNs also differ.

Table 2 illustrates a comparison of results of various CNNs performing classification of whole slide images using multiple instance learning.

TABLE 2

| Model | Best AUC |
| --- | --- |
| ImageNet-based ResNet18 | Train AUC: 0.91 Val AUC: 0.78 |
| PathNet (ResNet18) | Train AUC: 0.91 Val AUC: 0.95 |
| MOCO v2 ResNet18 | Train AUC: 0.88 Val AUC: 0.89 |

Figure 17:
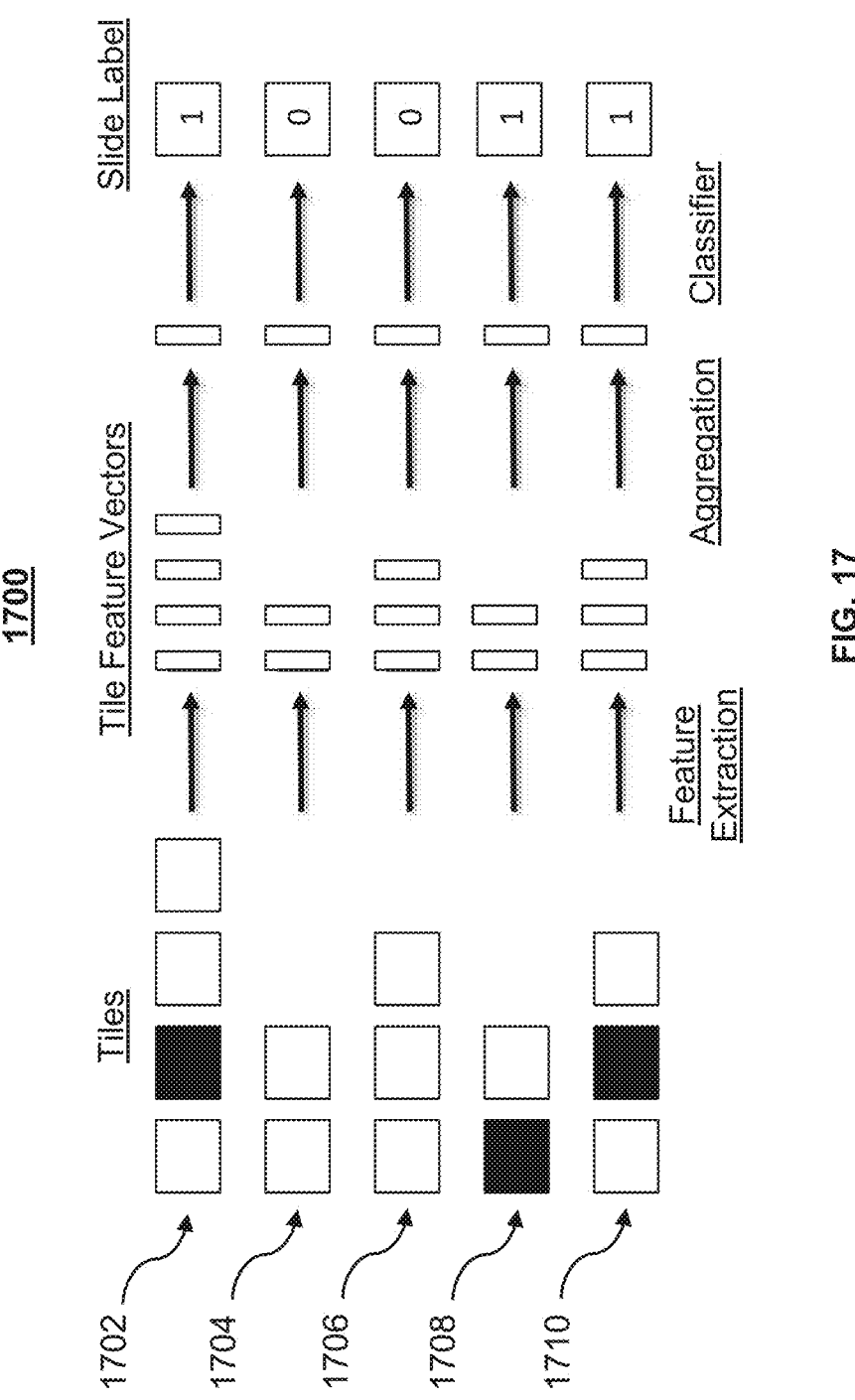
FIG. 17 illustrates a sample application of the trained backbone in a downstream task, in accordance with various embodiments.

From the Camelyon16 data set (publicly available H&E whole slide images illustrating breast cancer metastasis in lymph node tissue), a subset of WSI images were selected for the training and validation phases. For example, the training set may include 126 images depicting tumors and 88 images not depicting tumors, and the validation set may include 32 images depicting tumors and 22 images not depicting tumors. FIG. 17 illustrates a sample application 1700 of the trained backbone in a downstream task, in accordance with various embodiments. For instance, application 1700 may be used for whole slide classification in a multiple instance learning setting. After using the self-supervised technique to train the feature extraction network, a multiple instance (MIL) learning technique can be used to train the CNN to perform classification of whole slide images. For example, from tiles 1702-1710, tile feature vectors may be generated using a feature extraction process. The features may be aggregated and a classifier may be used for downstream classification. As an example, tiles 1702, 1708, and 1710 each include one marked tile (e.g., the black tile), while tiles 1704 and 1706 do not include any marked tiles. The feature extraction process may be configured to generate feature vectors for each tile, which can then be aggregated together to determine whether any of the feature vectors include a feature indicating the presence of a black tile. If so, the classifier may label the tiles as including a black tile (e.g., labeled "1") or label the tiles as not including a black tile (e.g., labeled "0"). The results shown in Table 2 illustrate that PathNet outperforms the ResNet18 (trained using the ImageNet dataset) for this downstream task. Moreover, PathNet outperforms other state-of-the-art self-supervised techniques (e.g., MOCO v2) in this downstream task.

Figures 18A, 18B:
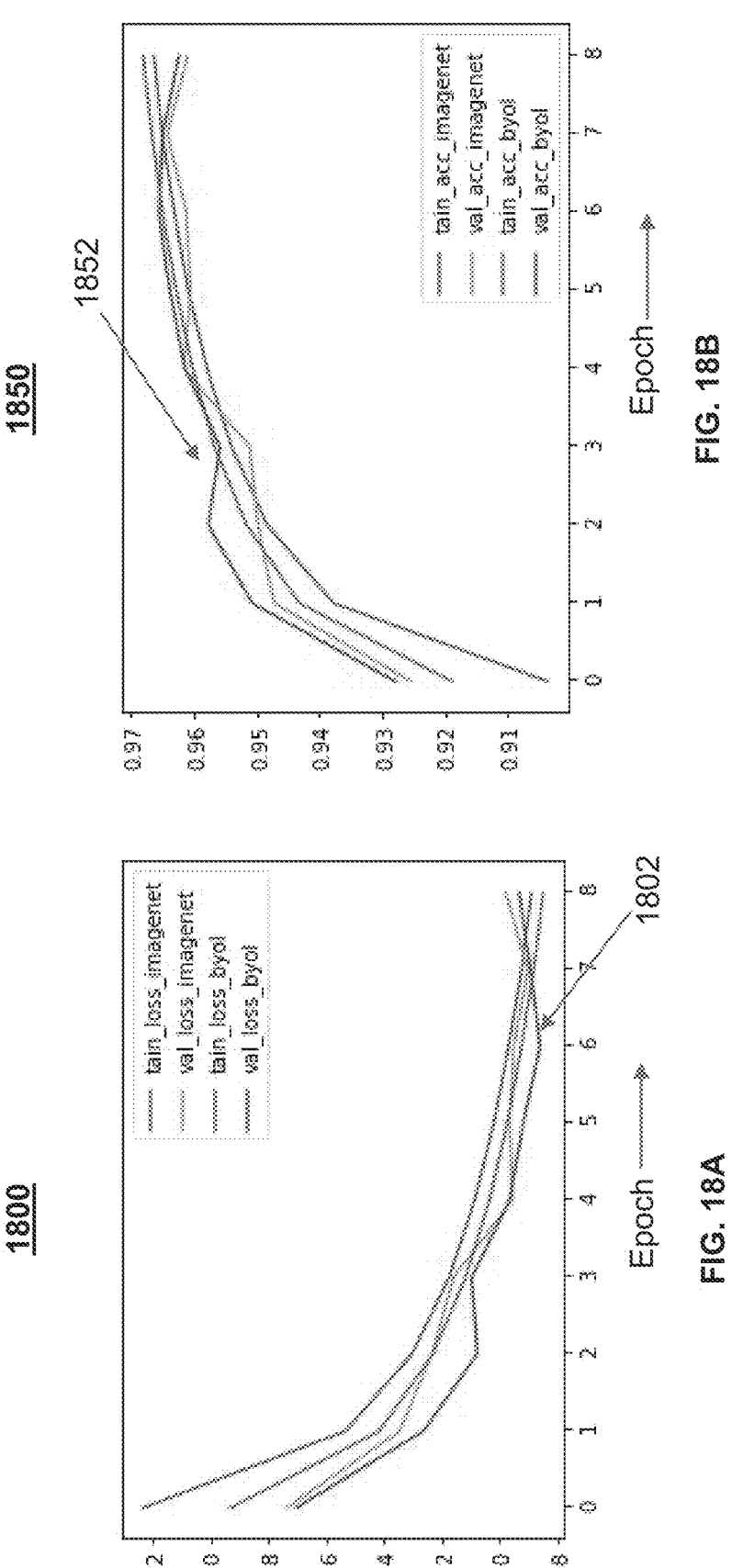
FIGS. 18A-18B illustrate graphs of an example tile-wise tumor detection task as another downstream task for comparison between the PathNet and the backbone trained on ImageNet, in accordance with various embodiments.

FIGS. 18A-18B illustrate graphs of an example tile-wise tumor detection task as another downstream task for comparison between the PathNet and the backbone trained on ImageNet, in accordance with various embodiments. Graphs 1800 and 1850 illustrate a comparison of results of various CNNs performing binary classification (tumor vs. non-tumor tile) at tile-level. For this evaluation, a subset of WSI images were selected from the Camelyon16 data set and a private H&E whole slide images illustrating tumors and non-tumor regions in 552 tissue images. After using the self-supervised technique described herein to train the feature extraction network, a supervised technique can be used to train the CNN head to perform binary classification of tiles from H&E slide images (e.g., the slide image depicts a tumor vs. the slide image is a non-tumor tile). The results show by graphs 1800 and 1850 that PathNet converges faster and achieves a higher performance on fewer number of iterations (epochs) for this downstream task.

Figure 19B:
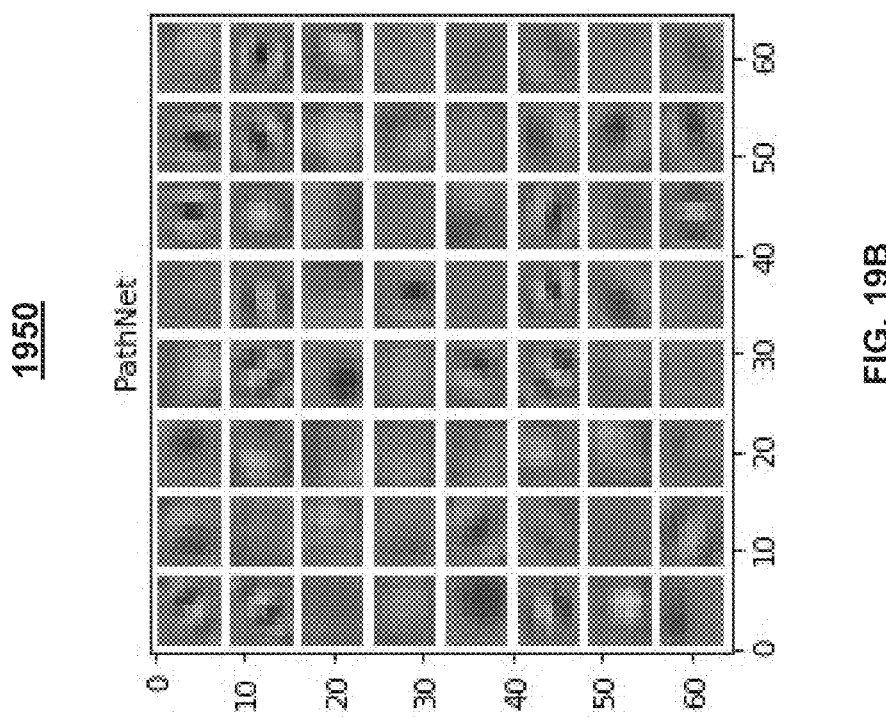
FIGS. 19A-19B illustrate an example qualitative comparison between the weights of a first convolutional layer of the same backbones trained with two different augmentation settings, in accordance with various embodiments.
Figure 19A:
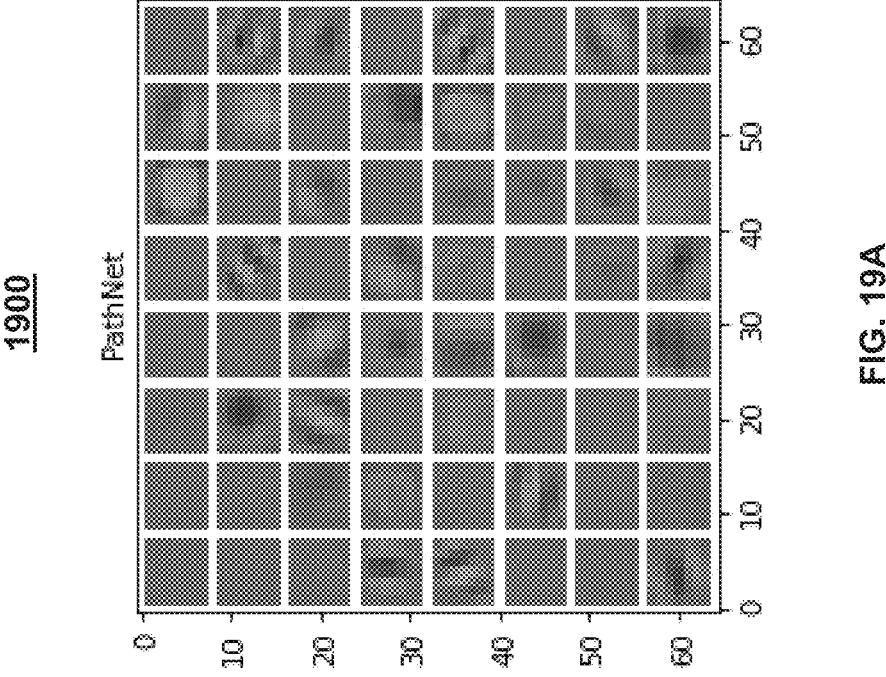

FIGS. 19A-19B illustrate an example qualitative comparison between the weights of a first convolutional layer of the same backbones trained with two different augmentation settings, in accordance with various embodiments. In particular, charts 1900 and 1950 represent the qualitative comparison between the weights of two similar backbones, one trained with normal augmentation settings and the other one with augmentation techniques 1900 (e.g., AugmentationV2). The filters in network 250 trained with augmentation techniques 1900 (e.g., AugmentationV2) are populated and shaped better compared to the normal augmentation setting because augmentation techniques 200 presents more context to network 250 to learn from.

Figure 20A:
FIGS. 20A-20B illustrate examples of a custom color augmentation where tile color is modified to one that is similar to a random tile picked from the training set, in accordance with various embodiments.
Figure 20A:
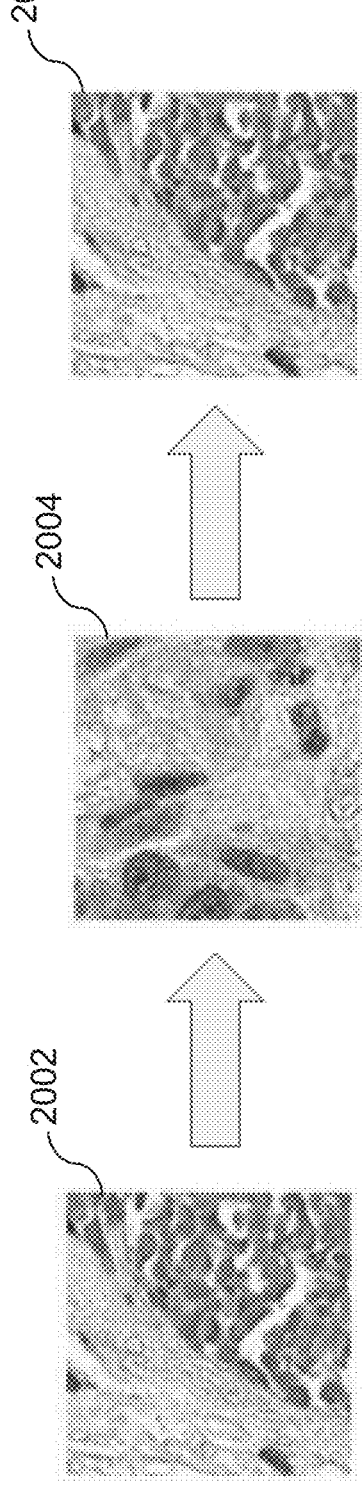
Figure 20B:
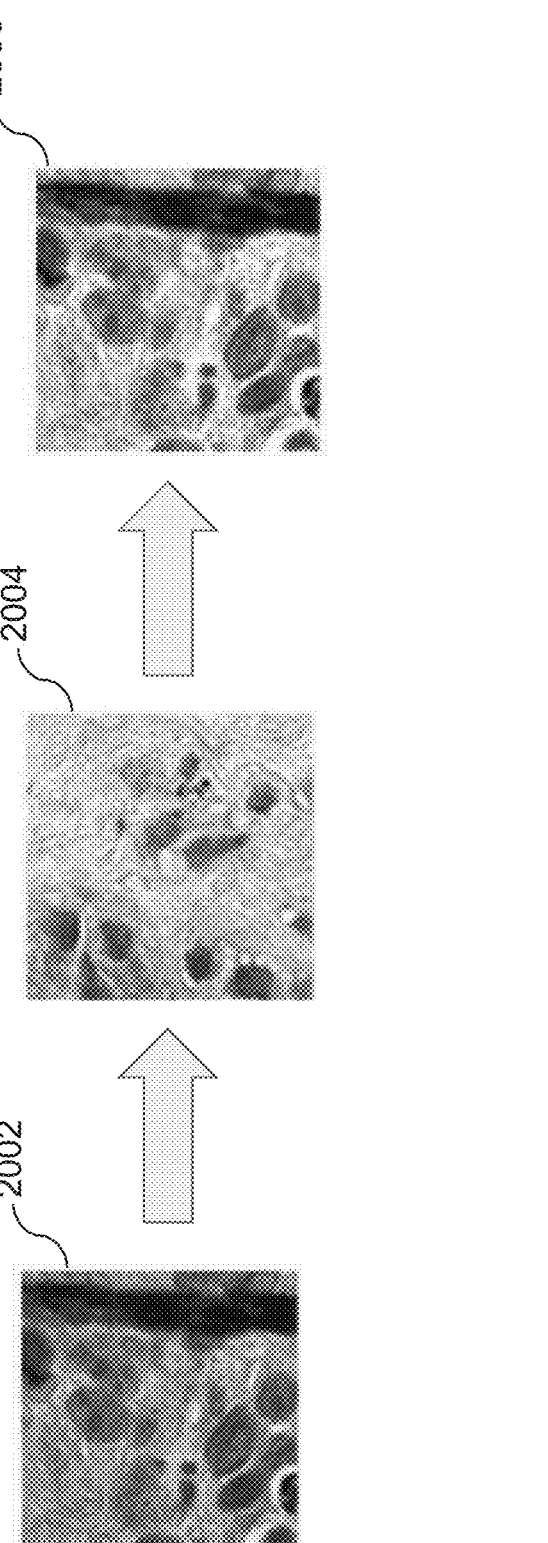

FIGS. 20A-20B illustrate examples of a custom color augmentation where tile color is modified to one that is similar to a random tile picked from the training set, in accordance with various embodiments. For instances, both augmentation processes 2000 and 2050 of FIGS. 20A-20B, respectively, show examples of a custom color augmentation process. One of the most fundamental challenges in AI in digital pathology is to train a model that is robust to color variation across different images. Different types of scanners may be configured in different ways, including various types of hardware and image acquisition qualities are factors that make this robustness a very challenging task. A whole slide image acquired by one scanner may have different lightness and colors compared to the same whole slide image when acquired with another scanner. This variation typically affects models that were trained on one type of scanner or a particular type of stain (e.g., H&E) and then tested on images captured using a different scanner or stained with a different type of stain. In addition, different laboratories may use different H&E stains. As a result, different stains might be chemically attached to different biological structures. Due to this substantial difference, a model will typically be sensitive to scanner types and staining types and may not generalize well.

In order to overcome the challenges introduced by color variation, some models incorporate color augmentations during training by modifying image color using random color translations where each RGB pixel is translated by a 3D random vector. However, random color translation may not simulate real-world whole slide images. For example, a tile that is mostly purple might be augmented to a tile that is mostly green, which is not a common color in H&E-stained slides.

Some embodiments may perform a custom color augmentation where the image color is translated and augmented to mimic an image with a color of one of the images from the training set. The augmentation is performed by first converting the tile a first color space. Some example color spaces that the first color space may refer to include the L*A*B* color space, the RGB color space, and the CMYK color space, however other color spaces may be included. The L*A*B* color space (CIELAB) is designed to approximate human vision. It expresses color as three values: L* for perceptual lightness, and a* and b* for the four unique colors of human vision: red, green, blue, and yellow. The Euclidean distance in the L*A*B* color space reflects differences in human vision well, in contrast to the RGB or CMYK color models. Images may be augmented and modified in the L*A*B* color space and then converted back to RGB.

In order to augment the image, a random tile may be picked from the training set and converted to a first color space, such as the L*A*B* space. This tile is referred to as a "connection tile," which may be used to augment the selected training image/tile. In some embodiments, the center of mass of the converted tile in the first color space may be computed. The center of mass of the training image (e.g., the randomly selected tile) may also be computed. For example, in the L*A*B* color space, the average L*, A*, and B* across pixels of an image may calculated for both the training image and the connection tile. In some embodiments, a distance vector between these two centers of mass may be calculated and the training image's pixel colors can be shifted by this vector.

Augmentation process 2000, for example, may include selecting a tile 2002 randomly from a training set of images, such as training data 254. Next, tile 2002 may be converted to a first color space, such as the L*A*B* color space, to obtain converted tile 2004. A center of mass of tile 2002 and converted tile 2004 may then be computed, and a distance vector between the center of mass of tile 2002 and the center of mass of converted tile 2004 may be calculated. The distance vector may then be used to shift the pixels of tile 2002 to obtain augmented view 2006.

As another example, augmentation process 2050 may include selecting a tile 2052 randomly from a training set of images, such as training data 254. Next, tile 2052 may be converted to a first color space, such as the L*A*B* color space, to obtain converted tile 2054. A center of mass of tile 2052 and converted tile 2054 may then be computed, and a distance vector between the center of mass of tile 2052 and the center of mass of converted tile 2054 may be calculated. The distance vector may then be used to shift the pixels of tile 2052 to obtain augmented view 2056.

Figure 21:
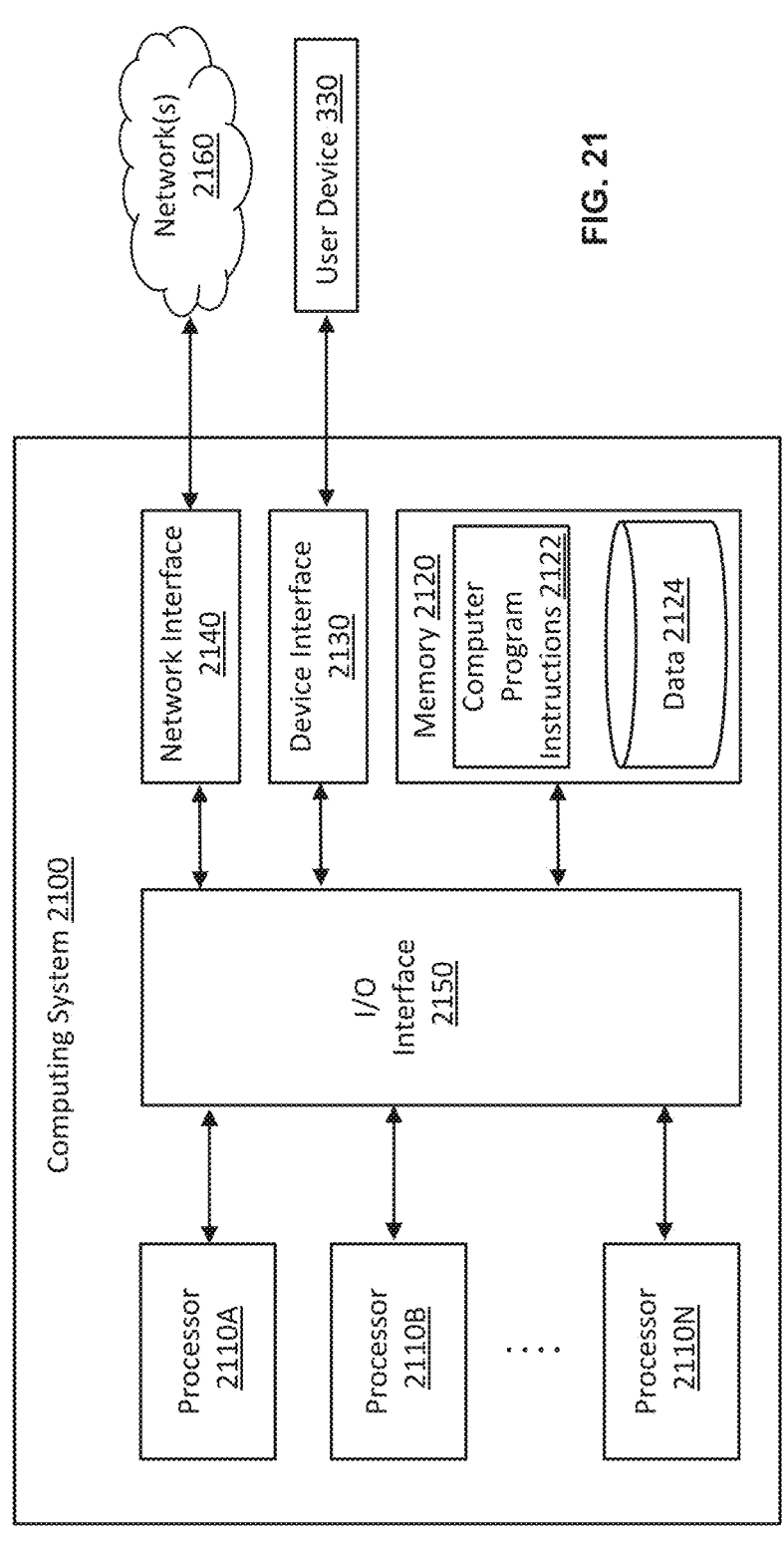
FIG. 21 illustrates an example computing system that can be used to implement various embodiments described herein.

FIG. 21 illustrates an example computing system 2100 that can be used to implement various embodiments described herein. In some cases, multiple instances of computing system 2100 may communicate via a network to implement the present techniques in a distributed fashion. In some cases, instances may include a mobile computing device (like a smartphone with a camera) that captures images upon which the present techniques operate. In some cases, the instances may include server-side instances (e.g., in a micro-services architecture or monolithic architecture) that execute training and analysis with trained models. Various portions of systems and methods described herein, may include or be executed on one or more computer systems similar to computing system 2100. Further, processes and modules described herein may be executed by one or more processing systems similar to that of computing system 2100.

Computing system 2100 may include one or more processors (e.g., 2110A-2110N) coupled to system memory 2120, an input/output I/O device interface 2130, and a network interface 2140 via an input/output (I/O) interface 2150. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 2100. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 2120). Computing system 2100 may be a uniprocessor system including one processor (e.g., processor 2110A), or a multi-processor system including any number of suitable processors (e.g., processors 2110A-2110N). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 2100 may include a plurality of computing devices (e.g., distributed computer systems) to implement various processing functions.

I/O device interface 2130 may provide an interface for connection of one or more I/O devices, such as user device 330 computing system 2100. I/O devices may include devices that receive input (e.g., from a user) or output information (e.g., to a user). I/O devices, e.g., user device 330, may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices may be connected to computing system 2100 through a wired or wireless connection. I/O devices may be connected to computing system 2100 from a remote location. I/O devices located on remote computer system, for example, may be connected to computing system 2100 via a network and network interface 2140.

Network interface 2140 may include a network adapter that provides for connection of computing system 2100 to a network. Network interface 2140 may facilitate data exchange between computing system 2100 and other devices connected to the network. Network interface 2140 may support wired or wireless communication. The network may include an electronic communication network, such as the Internet, a local area network (LAN), a wide area network (WAN), a cellular communications network, or the like.

System memory 2120 may be configured to store program instructions 2122 or data 2124. Program instructions 2122 may be executable by a processor (e.g., one or more of 2110A-2110N) to implement one or more embodiments of the present techniques. Instructions 2122 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 2120 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 2120 may include a non-transitory computer readable storage medium that may have program instructions stored thereon that are executable by a computer processor (e.g., one or more of 2110A-2110N) to cause the subject matter and the functional operations described herein. A memory (e.g., system memory 2120) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 2150 may be configured to coordinate I/O traffic between 2110A-2110N, system memory 2120, network interface 2140, I/O devices (e.g., user device 330), and/or other peripheral devices. I/O interface 2150 may perform protocol, timing, or other data transformations to convert data signals from one component (e.g., system memory 2120) into a format suitable for use by another component (e.g., processors 2110A-2110N). I/O interface 2150 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 2100 or multiple computing systems 2100 configured to host different portions or instances of embodiments. Multiple computing systems 2100 may provide for parallel or sequential processing/execution of one or more portions of the techniques described herein.

Those skilled in the art will appreciate that computing system 2100 is merely illustrative and is not intended to limit the scope of the techniques described herein. Computing system 2100 may include any combination of devices or software that may perform or otherwise provide for the performance of the techniques described herein. For example, computing system 2100 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computing system 2100 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computing system 2100 may be transmitted to computing system 2100 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y," "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the conversation management techniques as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The present techniques will be better understood with reference to the following enumerated embodiments:

1. A method comprising: receiving a plurality of whole slide images; dividing each of the whole slide images into a plurality of tiles; for each of the whole slide images: selecting a random subset of the tiles; generating a plurality of augmented views of each of the selected tiles; and for each of the selected tiles, training a first convolutional neural network (CNN) to: generate, using a first one of the augmented views corresponding to the selected tile, a first representation of the selected tile; and predict a second representation of the selected tile to be generated by a second CNN, wherein the second representation is generated based on a second one of the augmented views of the selected tile.

2. The method of embodiment 1, wherein the whole slide images are of a plurality of types of tissue stained with hematoxylin and eosin.

3. The method of any one of embodiments 1-2, wherein the generating the augmented views comprises at least one of: generating a random color augmentation of the corresponding selected tile, randomly cropping the corresponding selected tile, randomly scaling the corresponding selected tile, randomly flipping the corresponding selected tile about a horizontal or vertical axis, randomly rotating and translating the corresponding selected tile, generating random Gaussian blurring of the corresponding selected tile, randomly changing color to grayscale in the corresponding selected tile, or normalizing the corresponding selected tile.

4. The method of embodiment 3, wherein the random color augmentation is limited to a certain range to preserve color information.

5. The method of any one of embodiments 3-4, wherein generating the random color augmentation further comprises a color of the corresponding selected tile being translated and augmented to mimic an image with a color of one of the whole slide images, wherein the whole slide images comprise a training set of images.

6. The method of any one of embodiments 3-5, wherein generating the random color augmentation further comprises: converting the corresponding selected tile to a first color space; modifying the converted tile in the first color space; and converting the modified tile to a second color space.

7. The method of embodiment 6, wherein generating the random color augmentation further comprises: randomly selecting a connection tile; converting the connection tile to the first color space; calculating a first center of mass for the corresponding selected tile; calculating a second center of mass for the connection tile; calculating a distance vector between the first center of mass and the second center of mass; and shifting pixel colors of the corresponding selected tile by the distance vector.

8. The method of any one of embodiments 6-7, wherein the first color space and the second color space comprise the L*A*B color space, the RGB color space, or the CMYK color space, and the first color space and the second color space differ.

9. The method of any one of embodiments 3-8, wherein randomly scaling the corresponding selected tile is limited to certain types of augmentation to preserve scale information.

10. The method of any one of embodiments 1-9, further comprising: projecting an image representation of each tile of the random selected subset of tiles to two-dimensional space.

11. The method of embodiment 10, wherein the two-dimensional space is represented as a t-distributed stochastic neighbor embedding plot.

12. The method of any one of embodiments 10-11, wherein projecting the image representation comprises: generating an embedding of each tile of the random selected subset of tiles in a feature embedding space, wherein the embedding is represented as an array of numbers each corresponding to a feature of the tile.

13. The method of any one of embodiments 1-12, wherein a quantity of tiles selected comprises a predefined percentage of a total number of the tiles in the whole slide image.

14. The method of embodiment 13, wherein at least some of the random subset of tiles selected overlap.

15. The method of any one of embodiments 1-14, wherein training the first CNN comprises: minimizing a loss function based on the generated first representation and the predicted second representation.

16. The method of any one of embodiments 1-15, wherein the whole slide images are acquired using a scanner.

17. The method of embodiment 16, further comprising: preparing a biological sample to be scanned by the scanner; producing a set of sections of the prepared biological sample; causing one or more sections of the produced sections to be stained via a staining agent; providing the one or more stained sections to the scanner to obtain a digital image of each stained section; and classifying, based on the digital image and the first CNN, the biological sample as depicting at least one of a plurality of candidate results.

18. The method of embodiment 17, wherein the candidate results represent a plurality of tissue abnormalities.

19. The method of embodiment 18, wherein the tissue abnormalities comprise: inflammation, pigmentation, degeneration, anisokaryosis, hypertrophy, mitotic increase, mononuclear cell infiltration, inflammatory cell infiltration, inflammatory cell foci, decreased glycogen, glycogen accumulation, extramedullary myelopoiesis, extramedullary hematopoiesis, extramedullary erythropoiesis, single-cell necrosis, diffuse necrosis, marked necrosis, coagulative necrosis, apoptosis, karyomegaly, peribiliary, increased cellularity, glycogen deposits, lipid deposits, microgranuloma, congestion, Kupffer cell pigmentation, increased hemosiderin, histiocytosis, hyperplasia, or vacuolation.

20. The method of any one of embodiments 17-19, wherein the biological sample is at least one of a solid sample or a biopsy sample.

21. The method of any one of embodiments 16-20, further comprising: receiving a liquid biological sample slide; providing the liquid biological sample slide to the scanner to capture an image of the liquid biological sample slide; and classifying, based on the digital image and the trained first CNN, the liquid biological sample as depicting at least one of a plurality of candidate results.

22. The method of any one of embodiments 18-21, wherein the candidate results represent a plurality of tissue abnormalities, the tissue abnormalities comprise: inflammation, pigmentation, degeneration, anisokaryosis, hypertrophy, mitotic increase, mononuclear cell infiltration, inflammatory cell infiltration, inflammatory cell foci, decreased glycogen, glycogen accumulation, extramedullary myelopoiesis, extramedullary hematopoiesis, extramedullary erythropoiesis, single-cell necrosis, diffuse necrosis, marked necrosis, coagulative necrosis, apoptosis, karyomegaly, peribiliary, increased cellularity, glycogen deposits, lipid deposits, microgranuloma, congestion, Kupffer cell pigmentation, increased hemosiderin, histiocytosis, hyperplasia, or vacuolation.

23. The method of any one of embodiments 16-22, further comprising: obtaining an image of a biological sample from the scanner via a user device.

24. The method of embodiment 23, wherein the trained first CNN is configured to classify the image of the biological sample based on additional information provided by a user of the user device.

25. The method of embodiment 24, wherein the additional information comprises a type of tissue of the biological sample.

26. The method of any one of embodiments 1-25, further comprising: steps for classifying a digital image depicting a biological sample using the trained first CNN.

27. The method of any one of embodiments 1-26, further comprising: obtaining a digital image depicting a biological sample; dividing the digital image into a set of tiles; generating, using the first CNN, an embedding of each tile of the set of tiles in a feature embedding space; and generating, based on each embedding, an output corresponding to a result tile, the result tile being one of the set of tiles.

28. The method of embodiment 27, wherein the set of tiles are overlapping or non-overlapping.

29. The method of embodiment 28, wherein a data set used for analysis of the biological sample includes a feature indicating that the set of tiles are overlapping or non-overlapping.

30. The method of any one of embodiments 28-29, wherein a data set used for analysis of the biological sample includes a feature indicating a size of each of the set of tiles.

31. The method of embodiment 30, wherein the size of each tile is determined based on one or more performance metrics and a predetermined threshold associated with a respective performance metric.

32. The method of any one of embodiments 28-31, wherein a data set used for analysis of the biological sample includes a feature indicating an offset between tiles.

33. The method of embodiment 32, wherein the offset is determined based on one or more performance metrics and a predetermined threshold associated with a respective performance metric.

34. The method of any one of embodiments 27-33, wherein the digital image is divided into a plurality of sets of tiles, the set of tiles being one of the plurality of sets of tiles.

35. The method of any one of embodiments 27-34, wherein a size of each tile of the set of tiles is determined based on a type of abnormality that the biological sample is to be analyzed for.

36. The method of any one of embodiments 27-35, wherein the digital image is a multi-color channel image including pixel color values for each pixel of the image for a plurality of color channels.

37. The method of embodiment 36, wherein the set of tiles are divided based on the color channels of the digital image.

38. The method of any one of embodiments 36-37, wherein at least one of: a color specification of at least some of the color channels is converted to another color specification; or a copy of the set of tiles is generated using multiple color specifications.

39. The method of any one of embodiments 27-38, wherein the embedding is represented as a feature vector of each tile in the feature embedding space.

40. The method of any one of embodiments 27-39, wherein the first CNN is trained based, at least in part, on non-medical images.

41. The method of any one of embodiments 27-40, wherein the embedding is further generated based on contextual information associated with at least one of: (i) each tile or (ii) content depicted by each tile.

42. The method of embodiment 41, wherein the embedding includes at least one of: (i) a feature indicating a size of an object depicted within the digital image or (ii) a feature indicating a density of an objected depicted within the digital image.

43. The method of embodiment 42, wherein the at least one of the size of the object or the density of the object is measured based on a width of the object in pixels.

44. The method of any one of embodiments 42-43, wherein the at least one of the size of the object or the density of the object is measured relative to other tiles of the set of tiles from the digital image.

45. The method of any one of embodiments 42-44, wherein a classification of each tile is computed prior to the embedding of each tile being generated, wherein the embedding of each tile is generated based on the respective classification.

46. The method of any one of embodiments 27-45, wherein the embedding of each tile has a predefined size.

47. The method of embodiment 46, wherein the predefined size is a vector comprising 512 elements.

48. The method of any one of embodiments 27-27, further comprising: receiving a request to identify a whole slide image based on a tile, an identifier of a tile, or an identifier of the whole slide image, wherein the digital image comprises the whole slide image, and the digital image is obtained based on the request.

49. The method of any one of embodiments 27-48, wherein the output comprises at least one of a visualization, an interactive graphic, or a report based on a request received to classify the digital image.

50. The method of embodiment 49, further comprising: providing, to a user device, the at least one of the visualization, the interactive graphic, or the report.

51. The method of any one of embodiments 1-50, further comprising: receiving a request to identify a whole slide image based on a tile, an identifier of a tile, or an identifier of the whole slide image; and generating an output indicating a classification of the whole slide image.

52. The method of any one of embodiments 1-51, wherein each of the augmented views are generated to emphasize features relevant in digital pathology.

53. A non-transitory computer-readable medium storing computer program instructions that, when executed by one or more processors, effectuate the method of any one of embodiments 1-52.

54. A system comprising: memory storing computer program instructions; and one or more processor that execute the computer program instructions to effectuate the method of any one of embodiments 1-52.

What is claimed is:

1. A computer-implemented method for training machine-learning models customized for digital pathology, the method comprising:

receiving a plurality of whole slide images;

dividing each of the whole slide images into a plurality of tiles;

for each of the whole slide images:

selecting a random subset of the tiles;

generating a plurality of augmented views of each of the selected tiles based on the selected random subset of the tiles by:

creating a plurality of random crops of each of the selected tiles, and identifying a structural feature relevant in digital pathology that is present in the selected random subset of the tiles; and selecting based on the identified structural feature relevant in digital pathology, from the plurality of random crops, at least two random crops such that the at least two random crops share the feature relevant in digital pathology, and augmenting the at least two random crops, wherein each of the at least two random crops is augmented based on shifting pixel values of the respective random crop in accordance with a distance vector between a first center of mass of the respective random crop and a second center of mass of a randomly selected tile in a predetermined color space; and for each of the selected tiles, training a first convolutional neural network (CNN) to learn the structural feature relevant in digital pathology by:

generating, using a first one of the augmented views corresponding to the selected tile, a first representation of the selected tile;

predicting a second representation of the selected tile to be generated by a second CNN, wherein the second representation is generated based on a second one of the augmented views of the selected tile; and updating one or more weights of the first CNN based on the first representation and the second representation.

2. The method of claim 1, wherein the whole slide images are of a plurality of types of tissue stained with hematoxylin and eosin.

3. The method of claim 1, wherein augmenting the at least two random crops further comprises at least one of:

randomly cropping the random crop of the at least two random crop, randomly scaling the random crop of the at least two random crop, randomly flipping the random crop of the at least two random crop about a horizontal or vertical axis, randomly rotating and translating the random crop of the at least two random crop, generating random Gaussian blurring of the random crop of the at least two random crop, randomly changing color to grayscale in the random crop of the at least two random crop, or normalizing the random crop of the at least two random crop.

4. The method of claim 1, wherein the pixel values of the respective random crop are shifted within a certain range to preserve color information.

5. The method of claim 1, wherein a color of the at least two random crops is being translated and augmented to mimic an image with a color of one of the whole slide images, wherein the whole slide images comprise a training set of images.

6. The method of claim 1, further comprising:

projecting an image representation of each tile of the random selected subset of tiles to two-dimensional space.

7. The method of claim 6, wherein projecting the image representation comprises:

generating an embedding of each tile of the random selected subset of tiles in a feature embedding space, wherein the embedding is represented as an array of numbers each corresponding to a feature of the tile.

8. The method of claim 1, wherein at least some of the random subset of tiles selected overlap.

9. The method of claim 1, wherein training the first CNN comprises:

minimizing a loss function based on the generated first representation and the predicted second representation.

10. The method of claim 1, further comprising:

preparing a biological sample to be scanned by a scanner;

producing a set of sections of the prepared biological sample;

causing one or more sections of the produced sections to be stained via a staining agent;

providing the one or more stained sections to the scanner to obtain a digital image of each stained section; and classifying, based on the digital image and the first CNN, the biological sample as depicting at least one of a plurality of candidate results, wherein the candidate results represent a plurality of tissue abnormalities.

11. The method of claim 1, further comprising:

receiving a liquid biological sample slide;

providing the liquid biological sample slide to a scanner to capture an image of the liquid biological sample slide; and classifying, based on the digital image and the trained first CNN, the liquid biological sample as depicting at least one of a plurality of candidate results.

12. The method of claim 1, further comprising:

obtaining an image of a biological sample from a scanner via a user device, wherein the trained first CNN is configured to classify the image of the biological sample based on additional information provided by a user of the user device.

13. The method of claim 1, further comprising:

classifying a digital image depicting a biological sample using the trained first CNN.

14. The method of claim 1, further comprising:

obtaining a digital image depicting a biological sample;

dividing the digital image into a set of tiles;

generating, using the first CNN, an embedding of each tile of the set of tiles in a feature embedding space; and generating, based on each embedding, an output corresponding to a result tile, the result tile being one of the set of tiles.

15. The method of claim 14, wherein the embedding is further generated based on contextual information associated with at least one of: (i) each tile or (ii) content depicted by each tile, and the embedding includes at least one of: (i) a feature indicating a size of an object depicted within the digital image or (ii) a feature indicating a density of an objected depicted within the digital image.

16. The method of claim 14, further comprising:

receiving a request to identify a whole slide image based on a tile, an identifier of a tile, or an identifier of the whole slide image, wherein the digital image comprises the whole slide image, and the digital image is obtained based on the request.

17. A non-transitory computer-readable medium storing computer program instructions for training machine-learning models customized for digital pathology, the program instructions that, when executed by one or more processors, effectuate operations comprising:

receiving a plurality of whole slide images;

dividing each of the whole slide images into a plurality of tiles;

for each of the whole slide images:

selecting a random subset of the tiles;

generating a plurality of augmented views of each of the selected tiles based on the selected random subset of the tiles by:

creating a plurality of random crops of each of the selected tiles, and identifying a structural feature relevant in digital pathology that is present in the selected random subset of the tiles; and selecting based on the identified structural feature relevant in digital pathology, from the plurality of random crops, at least two random crops such that the at least two random crops share the feature relevant in digital pathology, and augmenting the at least two random crops, wherein each of the at least two random crops is augmented based on shifting pixel values of the respective random crop in accordance with a distance vector between a first center of mass of the respective random crop and a second center of mass of a randomly selected tile in a predetermined color space; and for each of the selected tiles, training a first convolutional neural network (CNN) to learn the structural feature relevant in digital pathology by:

generating, using a first one of the augmented views corresponding to the selected tile, a first representation of the selected tile;

predicting a second representation of the selected tile to be generated by a second CNN, wherein the second representation is generated based on a second one of the augmented views of the selected tile; and updating one or more weights of the first CNN based on the first representation and the second representation.

18. A system for training machine-learning models customized for digital pathology, comprising:

memory storing computer program instructions;

one or more processors configured to execute the computer program instructions to:

receive a plurality of whole slide images;

divide each of the whole slide images into a plurality of tiles;

for each of the whole slide images:

select a random subset of the tiles;

generate a plurality of augmented views of each of the selected tiles based on the selected random subset of the tiles by:

creating a plurality of random crops of each of the selected tiles, and

identifying a structural feature relevant in digital pathology that is present in the selected random subset of the tiles; and selecting based on the identified structural feature relevant in digital pathology, from the plurality of random crops, at least two random crops such that the at least two random crops share the feature relevant in digital pathology, and augmenting the at least two random crops, wherein each of the at least two random crops is augmented based on shifting pixel values of the respective random crop in accordance with a distance vector between a first center of mass of the respective random crop and a second center of mass of a randomly selected tile in a predetermined color space; and for each of the selected tiles, train a first convolutional neural network (CNN) to learn the structural feature relevant in digital pathology by:

generating, using a first one of the augmented views corresponding to the selected tile, a first representation of the selected tile;

predicting a second representation of the selected tile to be generated by a second CNN, wherein the second representation is generated based on a second one of the augmented views of the selected tile; and updating one or more weights of the first CNN based on the first representation and the second representation.

* * * * *